United States Patent
Liu et al.

(10) Patent No.: US 11,898,118 B2
(45) Date of Patent: Feb. 13, 2024

(54) PHOTOLUMINESCENT LUBRICATING GREASE COMPOSITION, PHOTOLUMINESCENT MATERIAL AND THE PREPARATION METHODS THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Xinyang Liu, Beijing (CN); Yifeng He, Beijing (CN); Minyang Zhuang, Beijing (CN); Hui Zheng, Beijing (CN); Hongwei Sun, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 202 days.

(21) Appl. No.: 17/286,810

(22) PCT Filed: Oct. 17, 2019

(86) PCT No.: PCT/CN2019/111623
§ 371 (c)(1),
(2) Date: Apr. 19, 2021

(87) PCT Pub. No.: WO2020/078409
PCT Pub. Date: Apr. 23, 2020

(65) Prior Publication Data
US 2021/0355409 A1     Nov. 18, 2021

(30) Foreign Application Priority Data

Oct. 18, 2018 (CN) ............ 201811212649.4
Oct. 29, 2018 (CN) ............ 201811268771.3
Oct. 29, 2018 (CN) ............ 201811268774.7

(51) Int. Cl.
*C10M 139/04* (2006.01)
*C07F 7/08* (2006.01)
(Continued)

(52) U.S. Cl.
CPC ........... *C10M 139/04* (2013.01); *C07F 7/081* (2013.01); *C07F 7/0807* (2013.01);
(Continued)

(58) Field of Classification Search
CPC ...... C07F 7/0807; C07F 7/081; C07F 7/0812; C07F 7/0816; C09K 11/06; C09K 2211/1007; C09K 2211/1011; C09K 2211/1014; C09K 2211/1018; C10M 117/04; C10M 119/24; C10M 127/04; C10M 139/04; C10M 141/12;
(Continued)

(56) References Cited

U.S. PATENT DOCUMENTS 5,986,121 A * 11/1999 Uchida ............... H10K 85/40
556/404
8,357,829 B2 * 1/2013 Hanefeld ............ C08F 297/08
585/12
(Continued)

FOREIGN PATENT DOCUMENTS

| CN | 105586139 A | 5/2016 |
| EP | 1357173 A1 | 10/2003 |
| JP | H09194487 A | 7/1997 |

OTHER PUBLICATIONS (Boydston, A.J., Yin, Y., Pagenkopf, B.L., "Synthesis and Electronic Properties of Donor-Acceptor π-Conjugated Siloles", J. Am. Chem. Soc, 2004, 126, 3724-3725 (Year: 2004).*
Luo, Q., Wang, C., Li, Y., Ouyang, K., Gu, L., Uchiyama, M., Xi, Z., "Opening the silole ring: Efficient and specific cleavage of the endo-C(sp2)-Si bond with AcOH/ROH system", Chem. Sci. 2011, 2, 2271-2274 (Year: 2011).*
Boydston, A. J. et al.; Synthesis and Electronic Properties of Donor-Acceptor π-Conjugated Siloles; J, Am. Chem. Soc., vol. 126, No. 12, Mar. 9, 2004, pp. 3724 and 3725.
(Continued)

*Primary Examiner* — James C Goloboy
(74) *Attorney, Agent, or Firm* — NKL Law; Allen Xue

(57) ABSTRACT

A silole derivative is of formula (I):

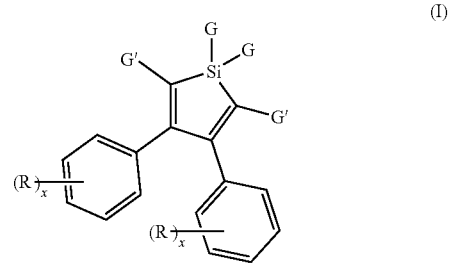

each of the groups in the above formula is defined as those in the description. The silole derivative of formula (I) has aggregation-induced emission performance, and is particularly applicable in luminescent parts and devices, fluorescent probes, biological imaging, lubricating oils and greases. A lubricating grease composition has photoluminescence performance, as well as one or more of advantageous anti-oxidation properties, anti-wear properties, extreme pressure properties and anti-rust properties. It is applicable in many mechanical equipment in electrical industry, metallurgical industry, food industry, paper industry, automobile industry and aircraft industry.

23 Claims, No Drawings

(51) Int. Cl.

| | | |
|---|---|---|
| *C09K 11/06* | (2006.01) | |
| *C10M 117/04* | (2006.01) | |
| *C10M 119/24* | (2006.01) | |
| *C10M 127/04* | (2006.01) | |
| *C10M 141/12* | (2006.01) | |
| *C10M 169/00* | (2006.01) | |
| *C10M 177/00* | (2006.01) | |
| *C10M 171/00* | (2006.01) | |
| *C10N 30/20* | (2006.01) | |
| *C10N 50/10* | (2006.01) | |
| *C10N 70/00* | (2006.01) | |

(52) U.S. Cl.
CPC .......... *C07F 7/0812* (2013.01); *C07F 7/0816* (2013.01); *C09K 11/06* (2013.01); *C10M 117/04* (2013.01); *C10M 119/24* (2013.01); *C10M 127/04* (2013.01); *C10M 141/12* (2013.01); *C10M 169/00* (2013.01); *C10M 171/007* (2013.01); *C10M 177/00* (2013.01); *C09K 2211/1007* (2013.01); *C09K 2211/1011* (2013.01); *C09K 2211/1014* (2013.01); *C09K 2211/1018* (2013.01); *C10M 2203/003* (2013.01); *C10M 2203/06* (2013.01); *C10M 2207/1296* (2013.01); *C10M 2217/0456* (2013.01); *C10M 2227/04* (2013.01); *C10N 2030/20* (2013.01); *C10N 2050/10* (2013.01); *C10N 2070/00* (2013.01)

(58) Field of Classification Search
CPC ............ C10M 169/00; C10M 171/007; C10M 177/00; C10M 2203/003; C10M 2203/06; C10M 2207/1296; C10M 2217/0456; C10M 2227/04; C10N 2030/20; C10N 2050/10; C10N 2070/00
See application file for complete search history.

(56) References Cited

U.S. PATENT DOCUMENTS

| | | |
|---|---|---|
| 2006/0240565 A1 | 10/2006 | Tang et al. |
| 2011/0257053 A1 | 10/2011 | Akao et al. |
| 2014/0051855 A1 | 2/2014 | Zhu et al. |
| 2020/0148965 A1* | 5/2020 | Rankin, Sr. ............ C09K 21/06 |

OTHER PUBLICATIONS

Luo, Qian et al.; Opening the silole ring: Efficient and specific cleavage of the endo-C(sp2)-Si bond with AcHO/ROH system; Chem, Sci, No. 2, Aug. 26, 2011, pp. 2271-2274.

Palmer, W. S. et al.; Synthesis of Silirenes by Palladium-Catalyzed Transfer of Silylene from Siliranes to Alkynes; Organometallics, vol. 16, No. 22, Dec. 31, 1997, pp. 4824-4827.

Chen, Ming et al.; Progress on Heterocycle-based Luminogens with Aggregation-induced Emission Characteristics; Science Bulletin, vol. 61, No. 3, Aug. 13, 2015, pp. 304-314.

* cited by examiner

PHOTOLUMINESCENT LUBRICATING GREASE COMPOSITION, PHOTOLUMINESCENT MATERIAL AND THE PREPARATION METHODS THEREOF

FIELD OF THE INVENTION

The present application is directed to a photoluminescent material. More particularly, the present application is directed to a photoluminescent material with aggregation-induced emission performance and a photoluminescent lubricating grease composition comprising the photoluminescent material with aggregation-induced emission performance.

BACKGROUND OF THE INVENTION

Traditional organic chromophore materials usually create strong luminescence at a low concentration, but weak or even no luminescence at a high concentration or in solid state, which is known as aggregation-caused quenching (ACQ). This is due to the fact that, when molecules are in the aggregated state, there are strong interactions between the molecules, which leads to enhancement in the non-radiative decay process from the excited state and significant decrease in fluorescence quantum yield. In practice, the aggregation-caused quenching substantially limits the application fields of organic luminescent materials. In recent years, some compounds have been found showing properties opposite to those of the traditional organic luminescent materials. Instead of showing aggregation-caused quenching, they exhibit aggregation-induced emission (AIE) performance. In the past decade, researchers have applied such materials in many fields such as luminescent devices, fluorescent probes, biological imaging and the like.

A lubricating grease is a solid or semi fluid product prepared by dispersing a thickener in a liquid lubricant. It has functions of lubrication, protection and sealing. It plays an important role in industrial machines, agricultural machines, transportation industry, aerospace industry, electronic information industry and military equipment.

In many cases, it is hard to directly observe the residual amount of lubricating greases with eyes. In some dark conditions, the monitoring of lubricating greases is more difficult. There are demands for a lubricating grease composition which can be easily monitored.

SUMMARY OF THE INVENTION

The present application provides a photoluminescent lubricating grease composition containing a luminescent material to solve the above problems in the art. The inventor develops a photoluminescent material with aggregation-induced emission performance, and uses the photoluminescent material in the photoluminescent lubricating grease composition.

In one aspect, provided in the present application is a photoluminescent material with aggregation-induced emission performance, which is a silole derivative of formula (I):

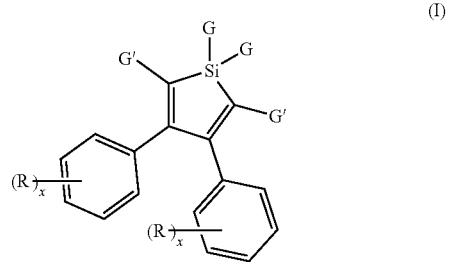

(I)

in the formula (I), each R is independently selected from the group consisting of hydrogen, and a linear or branched C1-6 alkyl; each x is independently an integer between 0 and 5;

each G is independently selected from the group consisting of hydrogen, a linear or branched C1-6 alkyl, an alkynyl of formula (I-1), an alkynyl of formula (I-2), an alkynyl of formula (I-3), an alkynyl of formula (I-4), and a group of formula (I-1');

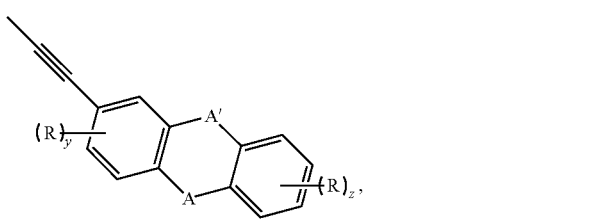

(I-1)

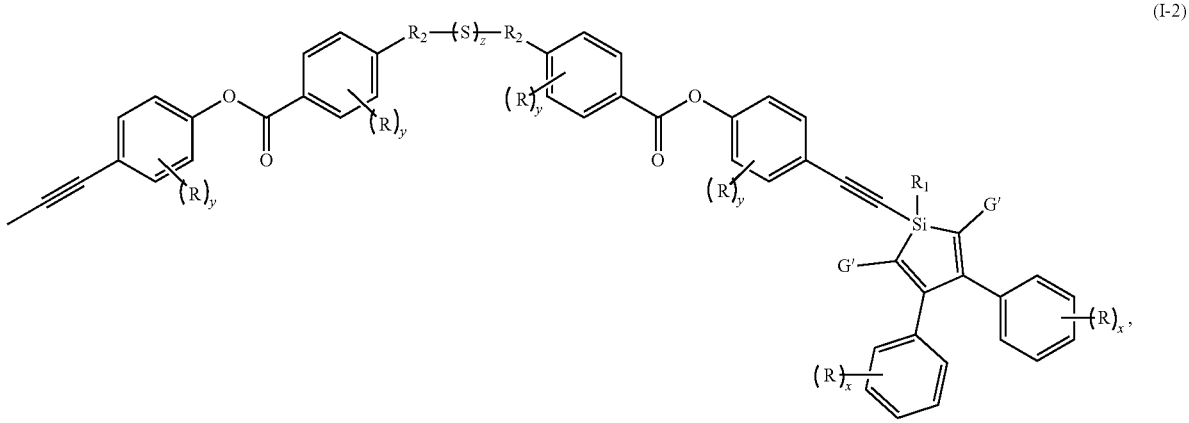

(I-2)

-continued

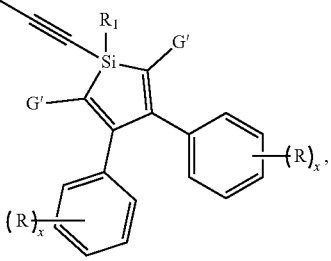
(I-3)

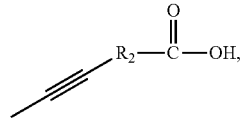
(I-4)

in the formula (I-1), formula (I-2), formula (I-3) and formula (I-4), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; and each z is independently an integer between 1 and 4;

in the formula (I-1), one of A and A' is NR, and the other is S, wherein R is selected from the group consisting of hydrogen, and a linear or branched C1-6 alkyl;

in the formula (I), formula (I-2) and formula (I-3), each G' is independently selected from the group consisting of hydrogen, a linear or branched C1-6 alkyl, a group of formula (I-1'), an alkynyl of formula (I-2'), and an alkynyl of formula (I-3');

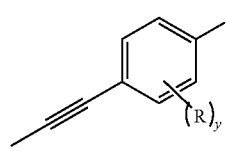
(I-1')

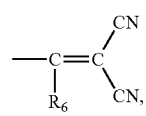
(I-2')

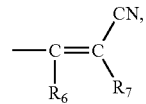
(I-3')

in the formula (I-1') and formula (I-2'), each R is independently selected from the group consisting of hydrogen, and a linear or branched C1-6 alkyl; each x is independently an integer between 0-5; each y' is independently an integer between 0-3; each z' is independently an integer between 0-3;

in the formula (I-3'), $R_3$, $R_4$ and $R_5$ are independently selected from the group consisting of hydrogen, a linear or branched C1-20 alkyl (preferably, a linear or branched C1-10 alkyl), a group of formula (II-1), a group of formula (II-2) and a group of formula (II-3), provided that at least one of $R_3$, $R_4$ and $R_5$ is a group of formula (II-1), a group of formula (II-2) or a group of formula (II-3) (preferably, $R_4$ is a group of formula (II-1), $R_3$ and $R_5$ are hydrogen; or $R_3$ and $R_5$ are a group of formula (II-3), $R_4$ is hydrogen);

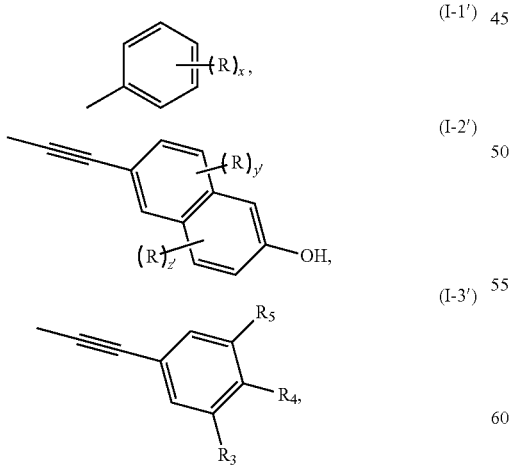

in the formula (II-1) and formula (II-2), $R_6$ is hydrogen, or a linear or branched C1-6 hydrocarbyl (preferably, hydrogen, or a linear or branched C1-4 alkyl), $R_7$ is hydrogen, or a linear or branched C1-6 hydrocarbyl (preferably, hydrogen, or a linear or branched C1-4 alkyl);

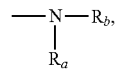
(II-3)

in the formula (II-3), $R_a$ is selected from the group consisting of hydrogen, and a linear or branched C1-20 alkyl (preferably, a linear or branched C1-10 alkyl); $R_b$ is selected from a groups consisting of hydrogen, and a linear or branched C1-20 alkyl; and in the formula (I), at least one G is selected from the group consisting of an alkynyl group of formula (I-1), an alkynyl group of formula (I-2), an alkynyl group of formula (I-3), and an alkynyl group of formula (I-4), or at least one G' is selected from a groups consisting of a group of formula (I-1'), an alkynyl group of formula (I-2'), and an alkynyl group of formula (I-3').

In another aspect, provided in the present application is a first method for preparing the silole derivative of formula (I), including the steps of: reacting a silole compound of formula (III-1) with one or more alkyne compounds of formula (III-1'), (III-2'), (III-3'), (III-4'), (III-5') and (III-6'),

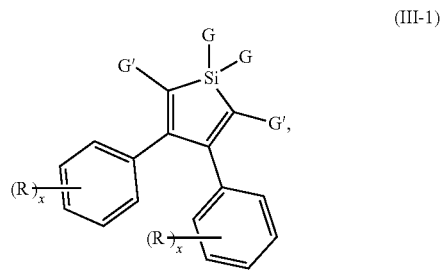
(III-1)

in the formula (III-1), each R is independently selected from the group consisting of hydrogen, and a linear or branched C1-6 alkyl; each x is independently an integer between 0 and 5; each G is independently selected from the group consisting of hydrogen, a linear or branched C1-6 alkyl, a group of formula (I-1') and the group X; and each G' is independently selected from the group consisting of hydrogen, a linear or branched C1-6 alkyl, a group of formula (I-1') and the group X;

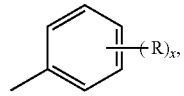
(I-1')

in the formula (I-1'), each R is independently selected from the group consisting of hydrogen, and a linear or branched C1-6 alkyl; and each x is independently an integer between 0 and 5;

the group X is selected from the group consisting of F, Cl, Br, I, and OH, preferably is Cl or Br at least one of G and G' is the group X;

(III-1')

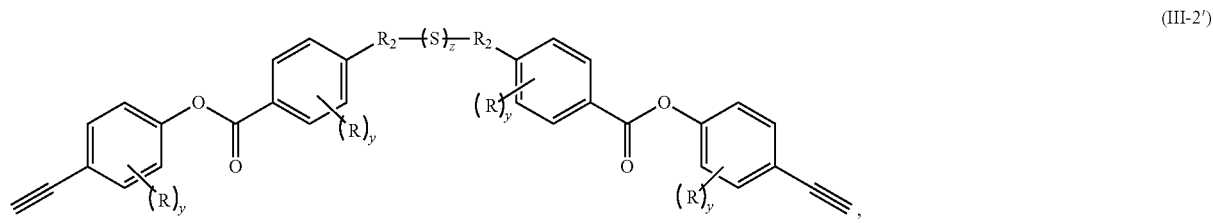
(III-2')

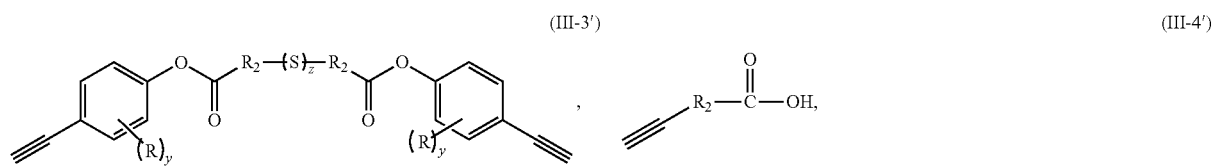
(III-3'), (III-4')

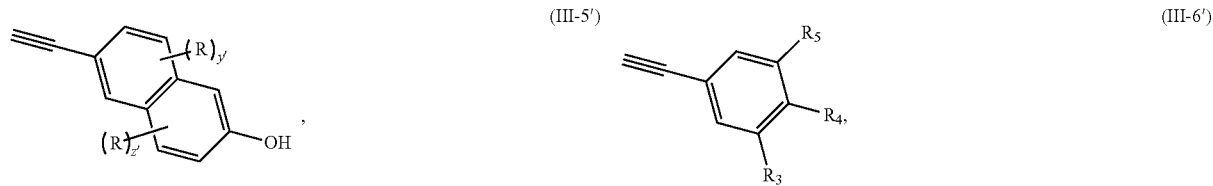
(III-5'), (III-6')

in the formula (III-1'), formula (III-2'), formula (III-3'), formula (III-4') and formula (III-5'), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; each z is independently an integer between 1 and 4; each y' is independently an integer between 0-3; and each z' is independently an integer between 0 and 3;

in the formula (III-1'), one of A and A' is NR, and the other is S, wherein R is selected from the group consisting of hydrogen, and a linear or branched C1-6 alkyl;

in the formula (III-6'), $R_3$, $R_4$ and $R_5$ are independently selected from the group consisting of hydrogen, a linear or branched C1-20 alkyl (preferably, a linear or branched C1-10 alkyl), a hydroxyl, a group of formula (II-1), a group of formula (II-2) and a group of formula (II-3), provided that at least one of $R_3$, $R_4$ and $R_5$ is a group of formula (II-1), a group of formula (II-2), a group of formula (II-3) or a hydroxyl (preferably, $R_4$ is a group of formula (II-1), $R_3$ and $R_5$ are hydrogen; or $R_3$ and $R_5$ are a group of formula (II-3), $R_4$ is hydrogen; or $R_3$ and $R_5$ are hydrogen, $R_4$ is a hydroxyl);

in the formula (II-3), $R_a$ is selected from the group consisting of hydrogen, and a linear or branched C1-20 alkyl (preferably, a linear or branched C1-10 alkyl); $R_b$ is selected from a groups consisting of hydrogen, and a linear or branched C1-20 alkyl.

In a further aspect, provided in the present application is a second method for preparing the silole derivative of formula (I), including the steps of: reacting a silole compound of formula (III-1-1) with one or more compounds of formula (III-1'-1), (III-2'-1), (III-3'-1), (III-4'-1), (III-5'-1) and (III-6'-1),

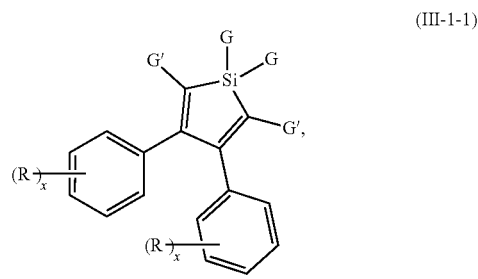
(III-1-1)

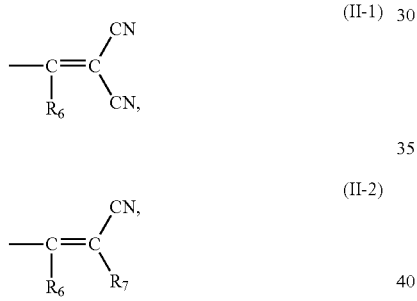

in the formula (III-1-1), each R is independently selected from the group consisting of hydrogen, and a linear or branched C1-6 alkyl; each x is independently an integer between 0 and 5; each G is independently selected from the group consisting of hydrogen, a linear or branched C1-6 alkyl, a group of formula (I-1') and ━━━ (i.e. —C≡CH); and each G' is independently selected from the group consisting of hydrogen, a linear or branched C1-6 alkyl, a group of formula (I-1') and ━━━;

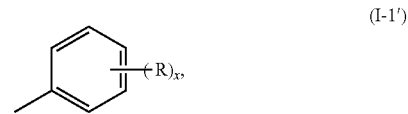
(I-1')

in the formula (II-1) and formula (II-2), $R_6$ is hydrogen, or a linear or branched C1-6 hydrocarbyl (preferably, hydrogen, or a linear or branched C1-4 alkyl), $R_7$ is hydrogen, or a linear or branched C1-6 hydrocarbyl (preferably, hydrogen, or a linear or branched C1-4 alkyl);

in the formula (I-1'), each R is independently selected from the group consisting of hydrogen, and a linear or branched C1-6 alkyl; and each x is independently an integer between 0 and 5;

at least one of G and G' is ━━━;

(III-1'-1)

-continued

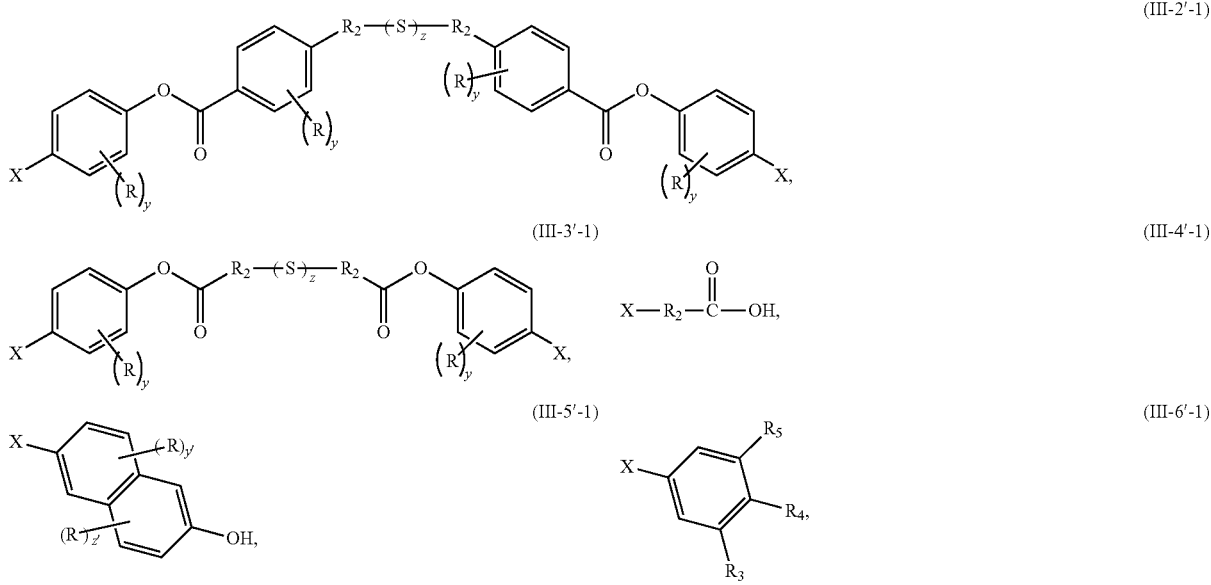

the group X is selected from the group consisting of F, Cl, Br, I, and OH, preferably is Cl or Br;

in the formula (III-1'-1), formula (III-2'-1), formula (III-3'-1), formula (III-4'-1) and formula (III-5'-1), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; each z is independently an integer between 1 and 4; each y' is independently an integer between 0-3; and each z' is independently an integer between 0 and 3;

in the formula (III-1'-1), one of A and A' is NR, and the other is S, wherein R is selected from the group consisting of hydrogen, and a linear or branched C1-6 alkyl;

in the formula (III-6'-1), $R_3$, $R_4$ and $R_5$ are independently selected from the group consisting of hydrogen, a linear or branched C1-20 alkyl (preferably, a linear or branched C1-10 alkyl), a hydroxyl, a group of formula (II-1), a group of formula (II-2) and a group of formula (II-3), provided that at least one of $R_3$, $R_4$ and $R_5$ is a group of formula (II-1), a group of formula (II-2), a group of formula (II-3) or a hydroxyl (preferably, $R_4$ is a group of formula (II-1), $R_3$ and $R_5$ are hydrogen; or $R_3$ and $R_5$ are a group of formula (II-3), $R_4$ is hydrogen; or $R_3$ and $R_5$ are hydrogen, $R_4$ is a hydroxyl);

(II-1)

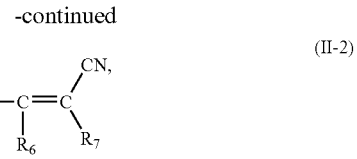

(II-2)

in the formula (II-1) and formula (II-2), $R_6$ is hydrogen, or a linear or branched C1-6 hydrocarbyl (preferably, hydrogen, or a linear or branched C1-4 alkyl), $R_7$ is hydrogen, or a linear or branched C1-6 hydrocarbyl (preferably, hydrogen, or a linear or branched C1-4 alkyl);

(II-3)

in the formula (II-3), $R_a$ is selected from the group consisting of hydrogen, and a linear or branched C1-20 alkyl (preferably, a linear or branched C1-10 alkyl); $R_b$ is selected from a groups consisting of hydrogen, and a linear or branched C1-20 alkyl.

In a further more aspect, provided in the present application is a photoluminescent lubricating grease composition comprising a luminescent material, a thickener and a lubricating base oil. Preferably, the luminescent material is a photoluminescent material with aggregation-induced emission performance, and more preferably, the photoluminescent material with aggregation-induced emission performance includes a tetraphenylethylene compound and a silole derivative. Preferably, the tetraphenylethylene compound includes tetraphenylethylene or its derivatives, and more preferably, the tetraphenylethylene compound has the following structure:

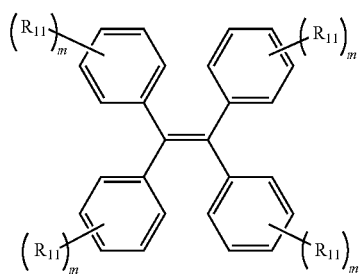

wherein each $R_{11}$ is the same or different from each other, and is independently selected from the group consisting of a linear or branched C1-6 alkyl; each m is the same or different, and is independently an integer between 0-5. Preferably, the silole derivative includes the silole derivative of formula (I) and a phenylsilole derivative of formula (XI):

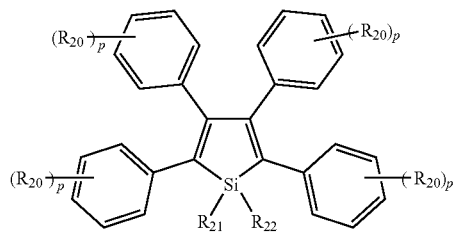

wherein each $R_{20}$ is the same or different from each other and is independently selected from the group consisting of a linear or branched C1-6 alkyl; each p is the same or different from each other and is independently an integer between 0 and 5; $R_{21}$ is selected from the group consisting of a linear or branched C1-6 alkyl and a C6-10 aryl; $R_{22}$ is selected from the group consisting of a linear or branched C1-6 alkyl and a C6-10 aryl.

In a still further aspect, provided in the present application is a method for preparing a photoluminescent lubricating grease composition, comprising the steps of: compounding a lubricating base oil, a thickener and a luminescent material, and grinding to form a grease.

The silole derivative of formula (I) in accordance with the present application has excellent photoluminescence performance, and can emit light under ultraviolet (UV) light. It is applicable in luminescent parts and devices, fluorescent probes, biological imaging, lubricating oils and greases. The lubricating grease composition in accordance with the present application has photoluminescence performance. The preferred lubricating grease composition in accordance with the present application further has one or more of advantageous anti-oxidation properties, anti-wear properties, extreme pressure properties and anti-rust properties. The lubricating grease composition in accordance with the present application is applicable in many mechanical equipments in electrical industry, metallurgical industry, food industry, paper industry, automobile industry and aircraft industry.

DETAILED DESCRIPTION

The present disclosure will be further described in detail by referring to specific embodiments. It should be understood that the embodiments described herein are only for illustrating and explaining the present disclosure, but not for limiting the invention in any way.

Any numerical value disclosed herein (including the endpoints of a numerical range) is not only limited to embodiments having exactly the value mentioned, but also should be understood to cover embodiments approaching to exactness in the value, such as all possible embodiments within ±5% from the exactness in the value. Moreover, for numerical ranges disclosed herein, one or more new numerical ranges can be obtained by mixing the endpoints of the ranges, combining one endpoint with a specific point within the ranges, or combining the specific points. Such new numerical ranges should be regarded as already disclosed herein.

Unless otherwise specified, the terms used herein have the same meanings as those commonly understood by those skilled persons in the art. If terms are defined herein and the definitions are different from those commonly understood in the art, the definitions herein shall prevail.

In this application, except for the contents clearly stated, any matters or elements not mentioned shall directly apply to those known in the art without any change. Moreover, any embodiment described herein may be freely combined with one or more other embodiments described herein. The resulting technical solutions or concepts shall be regarded as part of the initial specification or disclosure, and shall not be regarded as a new content which is not disclosed in or expectable from the present application, unless those skilled persons in the art regard such combination as obviously unreasonable.

The present application provides a photoluminescent material with aggregation-induced emission performance, which is a silole derivative of formula (I):

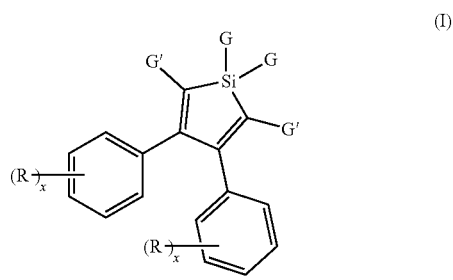

in the formula (I), each R is independently selected from the group consisting of hydrogen, and a linear or branched C1-6 alkyl, and each x is independently an integer between 0 and 5;

each G is independently selected from the group consisting of hydrogen, a linear or branched C1-6 alkyl, an alkynyl of formula (I-1), an alkynyl of formula (I-2), an alkynyl of formula (I-3), an alkynyl of formula (I-4), and a group of formula (I-1');

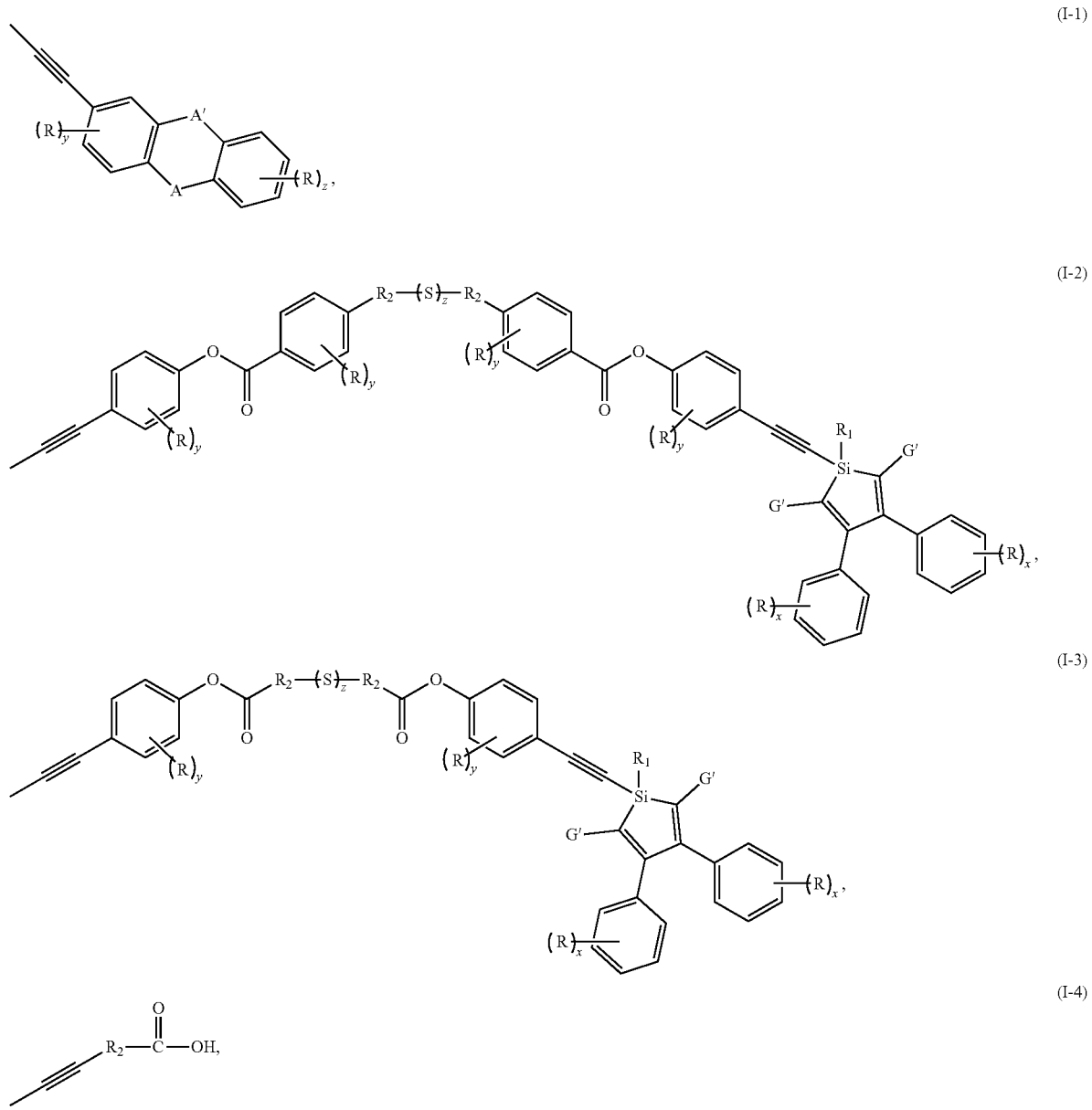

(I-1)

(I-2)

(I-3)

(I-4)

in the formula (I-1), formula (I-2), formula (I-3) and formula (I-4), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; and each z is independently an integer between 1 and 4;

in the formula (I-1), one of A and A' is NR, and the other is S, wherein R is selected from the group consisting of hydrogen, and a linear or branched C1-6 alkyl;

in the formula (I), formula (I-2) and formula (I-3), each G' is independently selected from the group consisting of hydrogen, a linear or branched C1-6 alkyl, a group of formula (I-1'), an alkynyl of formula (I-2'), and an alkynyl of formula (I-3');

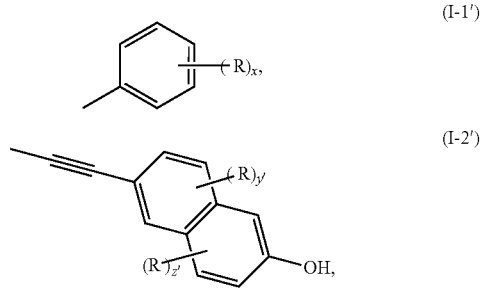

(I-1')

(I-2')

-continued

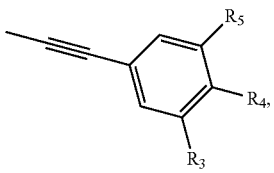
(I-3')

in the formula (I-1') and formula (I-2'), each R is independently selected from the group consisting of hydrogen, and a linear or branched C1-6 alkyl; each x is independently an integer between 0-5; each y' is independently an integer between 0-3; each z' is independently an integer between 0-3;

in the formula (I-3'), $R_3$, $R_4$ and $R_5$ are independently selected from the group consisting of hydrogen, a linear or branched C1-20 alkyl (preferably, a linear or branched C1-10 alkyl), a group of formula (II-1), a group of formula (II-2) and a group of formula (II-3), provided that at least one of $R_3$, $R_4$ and $R_5$ is a group of formula (II-1), a group of formula (II-2) or a group of formula (II-3) (preferably, $R_4$ is a group of formula (II-1), $R_3$ and $R_5$ are hydrogen; or $R_3$ and $R_5$ are a group of formula (II-3), $R_4$ is hydrogen);

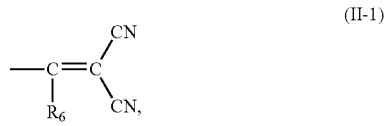
(II-1)

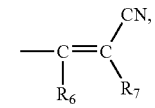
(II-2)

in the formula (II-1) and formula (II-2), $R_6$ is hydrogen, or a linear or branched C1-6 hydrocarbyl (preferably, hydrogen, or a linear or branched C1-4 alkyl), $R_7$ is hydrogen, or a linear or branched C1-6 hydrocarbyl (preferably, hydrogen, or a linear or branched C1-4 alkyl);

(II-3)

in the formula (II-3), $R_a$ is selected from the group consisting of hydrogen, and a linear or branched C1-20 alkyl (preferably, a linear or branched C1-10 alkyl); $R_b$ is selected from a groups consisting of hydrogen, and a linear or branched C1-20 alkyl; and in the formula (I), at least one G is selected from the group consisting of an alkynyl group of formula (I-1), an alkynyl group of formula (I-2), an alkynyl group of formula (I-3), and an alkynyl group of formula (I-4), or at least one G' is selected from a groups consisting of a group of formula (I-1'), an alkynyl group of formula (I-2'), and an alkynyl group of formula (I-3').

An example of the silole derivative of formula (I) may include the following compounds:

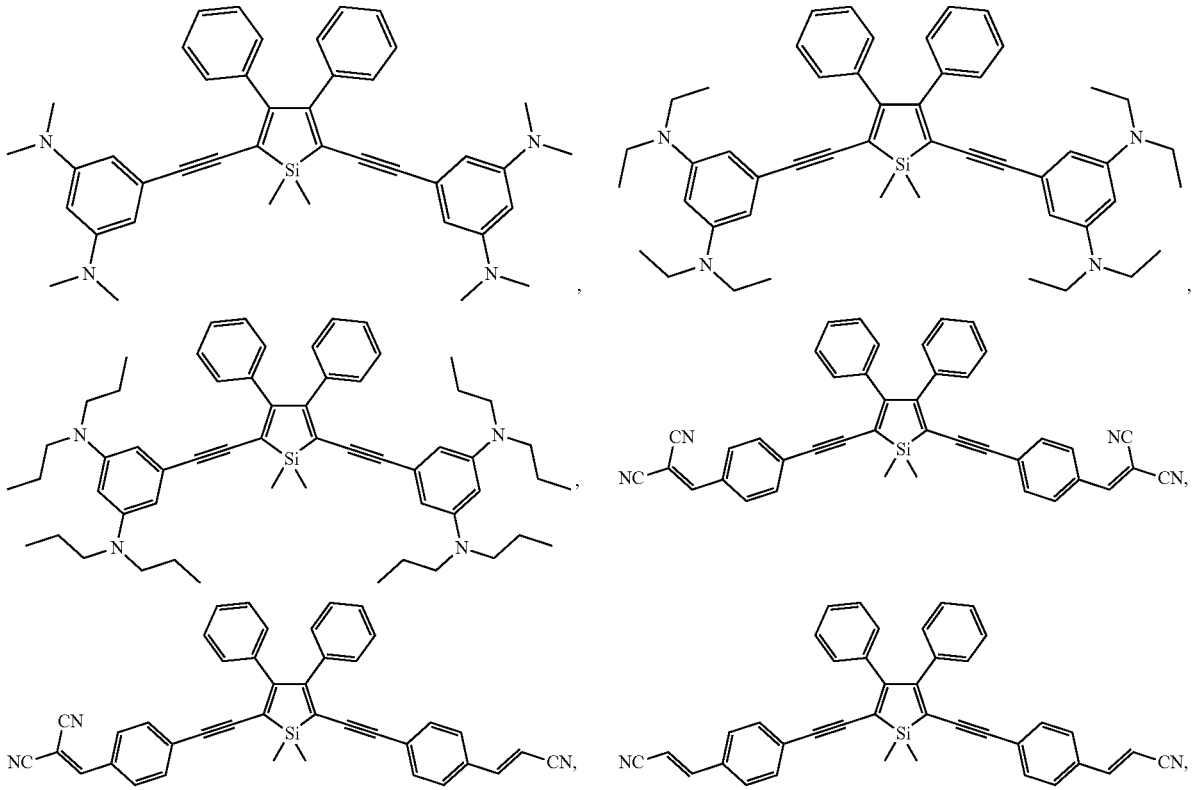

17
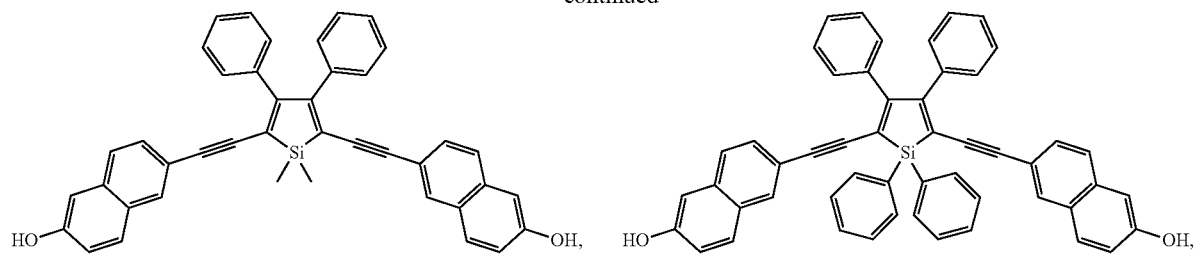
18
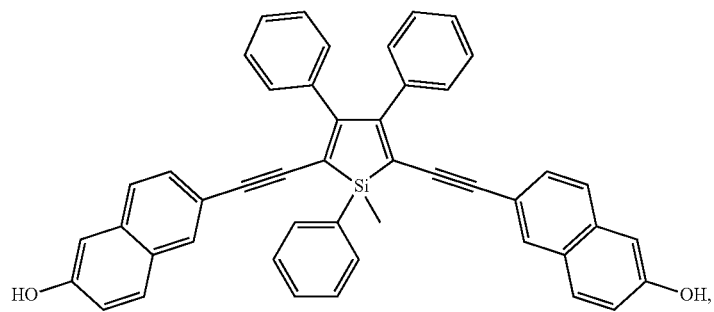
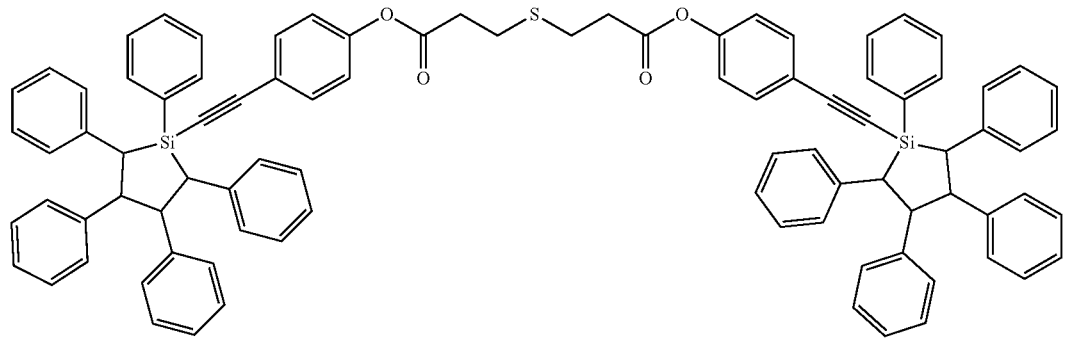
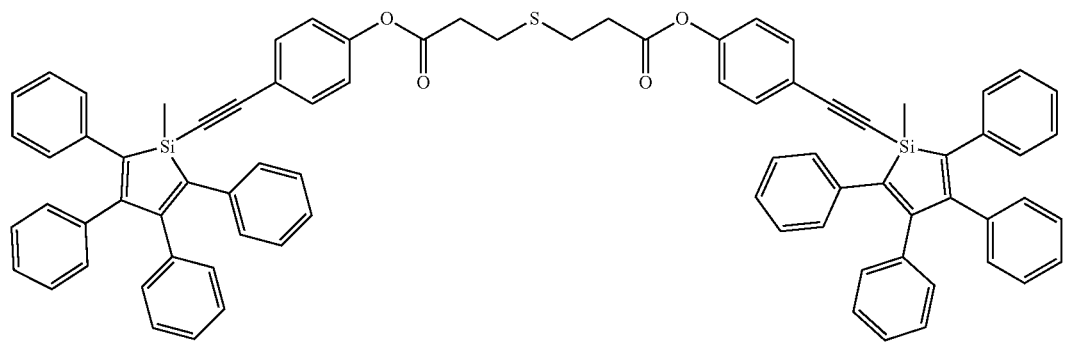
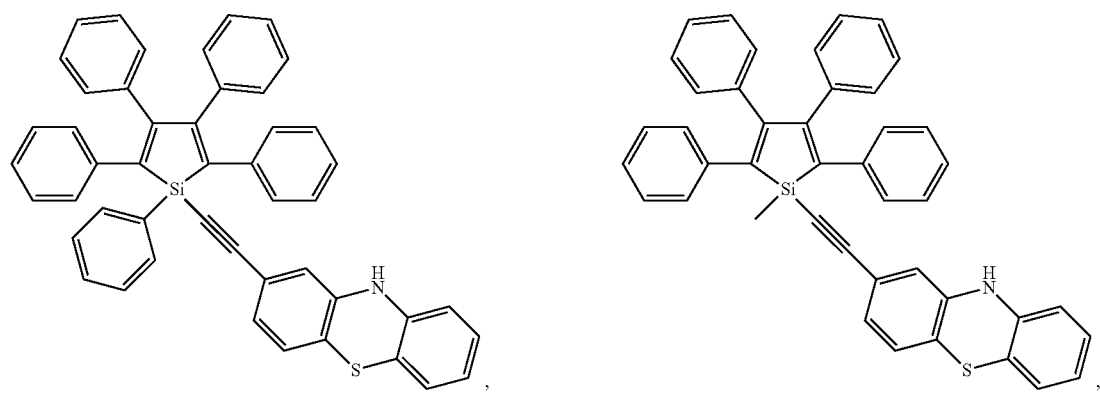

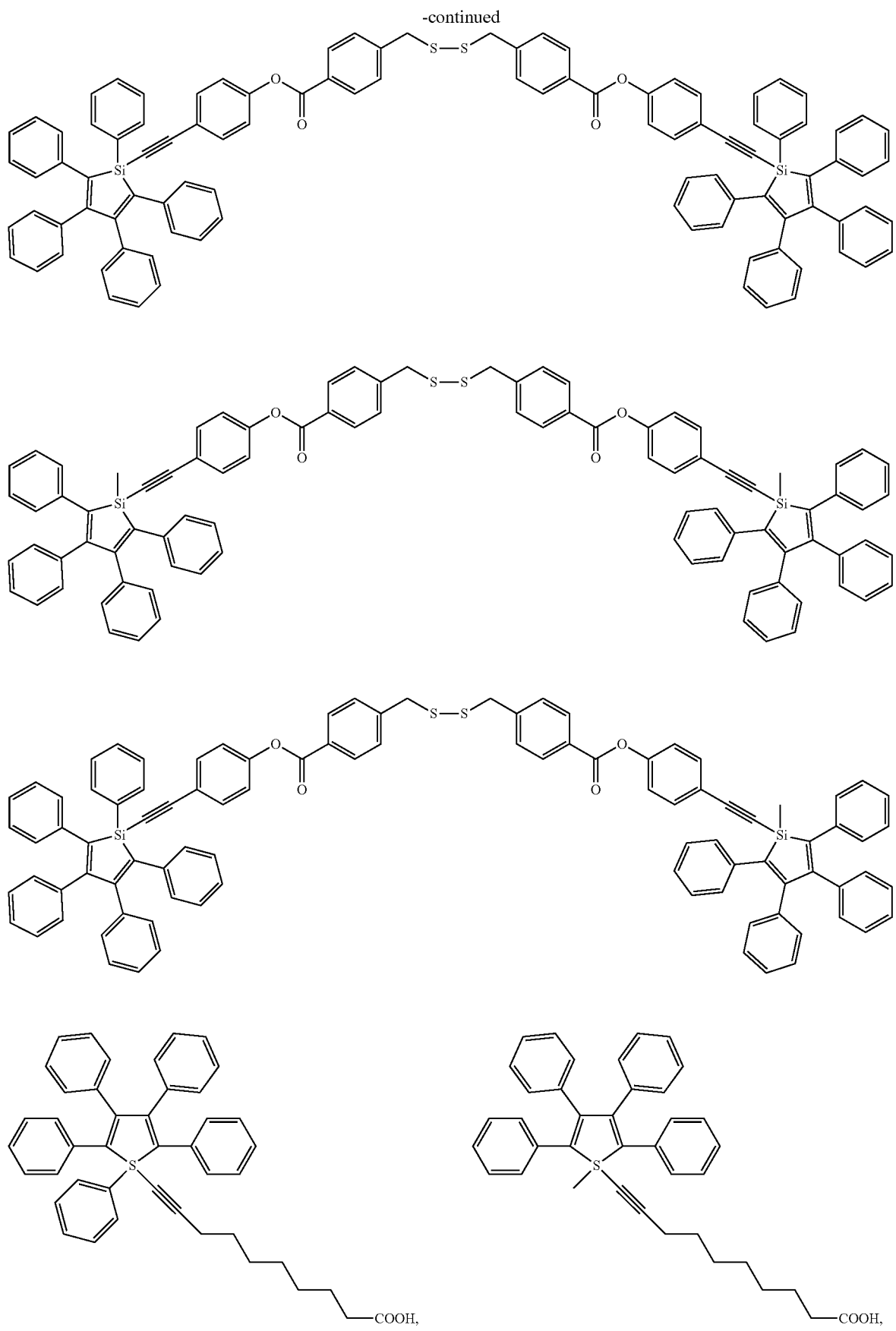

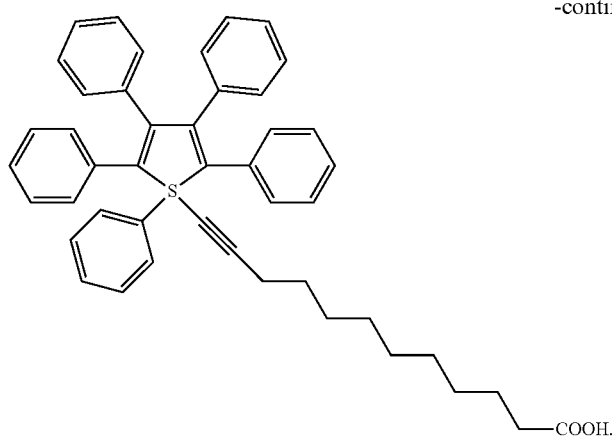

The present application provides a first method for preparing the silole derivative of formula (I), including the steps of: reacting a silole compound of formula (III-1) with one or more alkyne compounds of formula (III-1'), (III-2'), (III-3'), (III-4'), (III-5') and (III-6'),

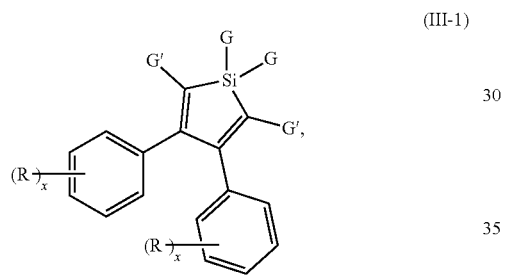

in the formula (III-1), each R is independently selected from the group consisting of hydrogen, and a linear or branched C1-6 alkyl; each x is independently an integer between 0 and 5; each G is independently selected from the group consisting of hydrogen, a linear or branched C1-6 alkyl, a group of formula (I-1') and the group X; and each G' is independently selected from the group consisting of hydrogen, a linear or branched C1-6 alkyl, a group of formula (I-1') and the group X;

in the formula (I-1'), each R is independently selected from the group consisting of hydrogen, and a linear or branched C1-6 alkyl; and each x is independently an integer between 0 and 5;

the group X is selected from the group consisting of F, Cl, Br, I, and OH, preferably is Cl or Br at least one of G and G' is the group X;

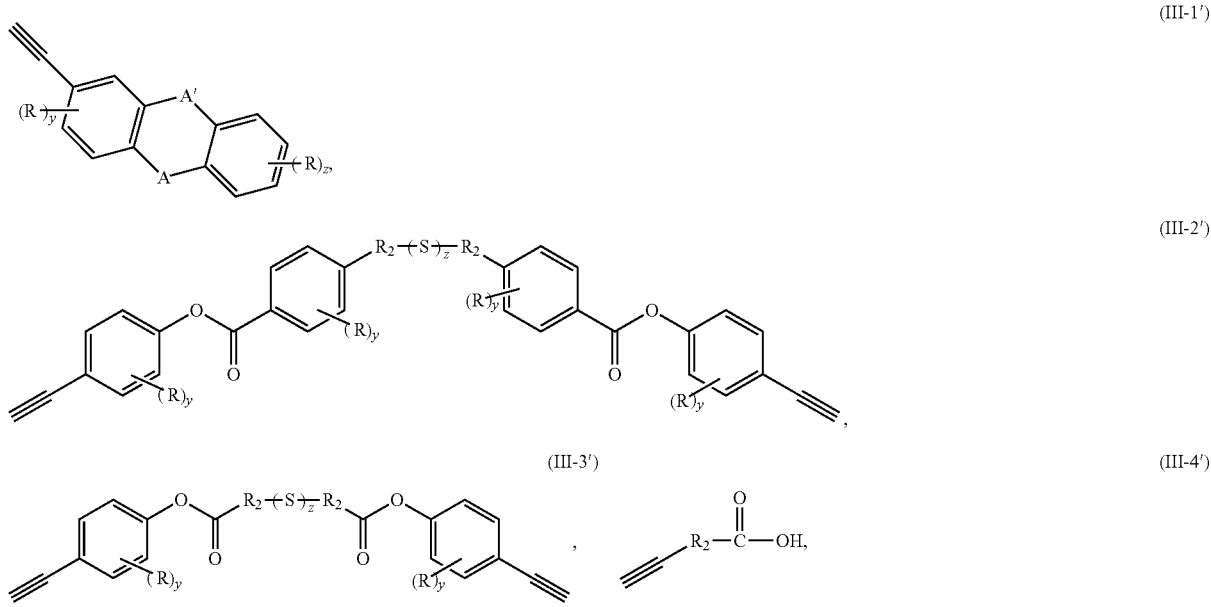

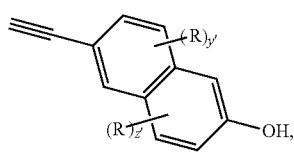
(III-5')

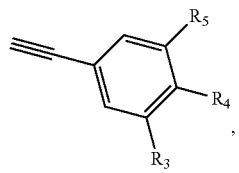
(III-6')

in the formula (III-1'), formula (III-2'), formula (III-3'), formula (III-4') and formula (III-5'), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; each z is independently an integer between 1 and 4; each y' is independently an integer between 0-3; and each z' is independently an integer between 0 and 3;

in the formula (III-1'), one of A and A' is NR, and the other is S, wherein R is selected from the group consisting of hydrogen, and a linear or branched C1-6 alkyl;

in the formula (III-6'), $R_3$, $R_4$ and $R_5$ are independently selected from the group consisting of hydrogen, a linear or branched C1-20 alkyl (preferably, a linear or branched C1-10 alkyl), a hydroxyl, a group of formula (II-1), a group of formula (II-2) and a group of formula (II-3), provided that at least one of $R_3$, $R_4$ and $R_5$ is a group of formula (II-1), a group of formula (II-2), a group of formula (II-3) or a hydroxyl (preferably, $R_4$ is a group of formula (II-1), $R_3$ and $R_5$ are hydrogen; or $R_3$ and $R_5$ are a group of formula (II-3), $R_4$ is hydrogen; or $R_3$ and $R_5$ are hydrogen, $R_4$ is a hydroxyl);

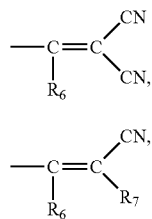
(II-1)

(II-2)

in the formula (II-1) and formula (II-2), $R_6$ is hydrogen, or a linear or branched C1-6 hydrocarbyl (preferably, hydrogen, or a linear or branched C1-4 alkyl), $R_7$ is hydrogen, or a linear or branched C1-6 hydrocarbyl (preferably, hydrogen, or a linear or branched C1-4 alkyl);

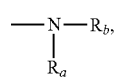
(II-3)

in the formula (II-3), $R_a$ is selected from the group consisting of hydrogen, and a linear or branched C1-20 alkyl (preferably, a linear or branched C1-10 alkyl); $R_b$ is selected from a groups consisting of hydrogen, and a linear or branched C1-20 alkyl.

Preferably, in the steps of the first method, the molar ratio between the silole compound of formula (III-1) and the one or more alkyne compounds of formula (III-1'), (II-2'), (III-3'), (III-4'), (III-5') and (III-6') is preferably 0.1-10:1, most preferably 0.2-5:1. The reaction temperature is 0-50° C., preferably 15-35° C. In general, the longer the reaction time, the better. The reaction time is preferably 12-96 h, more preferably 24-72 h.

Preferably, in the first method, a catalyst is added to the reaction of the silole compound of formula (III-1) with the one or more alkyne compounds of formula (III-1'), (III-2'), (III-3'), (III-4'), (III-5') and (III-6'). The catalyst is preferably one or more of metal phosphine complexes, metal halides, hydrocarbyl phosphine compounds and azo compounds, more preferably a mixture of metal phosphine complexes, metal halides and hydrocarbyl phosphine compounds, wherein the molar ratio of the three is 1:0.1-10:0.1-10, more preferably 1:0.2-5:0.2-5.

Preferably, in the first method, the metal phosphine complexes has a structure of

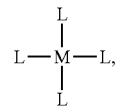

wherein M is Pd, Ru or Rh, and L is selected from the group consisting of triphenylphosphine (PPh₃), phenyl (Ph), F, Cl, Br, and I. The metal phosphine complexes may be one or more selected from the group consisting of palladium tetra (triphenylphosphine), palladium tri(triphenylphosphine) chloride, palladium bis(triphenylphosphine) dichloride, palladium (triphenylphosphine) trichloride, ruthenium tetra(triphenylphosphine), ruthenium tri(triphenylphosphine) chloride, ruthenium bis(triphenylphosphine) dichloride, ruthenium (triphenylphosphine) trichloride, rhodium tetra (triphenylphosphine), rhodium tri(triphenylphosphine) chloride, rhodium bis(triphenylphosphine) dichloride, and rhodium (triphenylphosphine) trichloride, preferably one or more selected from the group consisting of palladium tetra (triphenylphosphine), palladium tri(triphenylphosphine) chloride, palladium bis(triphenylphosphine) dichloride, and palladium (triphenylphosphine) trichloride.

Preferably, in the first method, the metal halides may be one or more selected from the group consisting of halides of copper, iron and zinc. For example, it may be one or more selected from the group consisting of copper chloride, cuprous chloride, copper bromide, cuprous bromide, copper iodide, cuprous iodide, ferric chloride, ferrous chloride, ferric bromide, ferrous bromide, ferric iodide, ferrous iodide, $ZnCl_2$, $Zn_2Cl_2$, $ZnBr_2$, $Zn_2Br_2$, $ZnI_2$, and $Zn_2I_2$. More preferably, they may be one or more selected from the group consisting of copper chloride, cuprous chloride, copper bromide, cuprous bromide, copper iodide and cuprous iodide.

Preferably, in the first method, the hydrocarbyl phosphine compound has a structure of

wherein each R is independently selected from the group consisting of a C6-C10 aryl and a linear or branched C1-C6 alkyl, and wherein at least one R is a C6-C10 aryl. The C6-C10 aryl may be selected from the groups consisting of phenyl and naphthyl; the linear or branched C1-C6 alkyl may be selected from the group consisting of methyl, ethyl, propyl, isopropyl, butyl, isobutyl, pentyl, isopentyl, hexyl and isohexyl. The hydrocarbyl phosphine compound may be selected from the group consisting of triphenylphosphine and diphenyl butyl phosphine.

Preferably, in the first method, the azo compounds preferably have a structure of

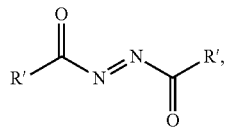

wherein each R' is the same or different from each other, and each R' is independently selected from the group consisting of hydrogen, a linear or branched C1-6 alkyl, a C3-10 cycloalkyl, a C6-10 aryl and a C1-6 alkoxyl. The azo compounds preferably may be one or more selected from the group consisting of dimethyl azodicarboxylate, diethyl azodicarboxylate, dipropyl azodicarboxylate and dibutyl azodicarboxylate.

Preferably, in the first method, the catalyst is added in amount of preferably 0.1%-100% by weight basing on the weight of the silole compound of formula (III-1).

The present application provides a second method for preparing the silole derivative of formula (I), including the steps of: reacting a silole compound of formula (III-1-1) with one or more compounds of formula (III-1'-1), (III-2'-1), (III-3'-1), (III-4'-1), (III-5'-1) and (III-6'-1), (III-1-1)

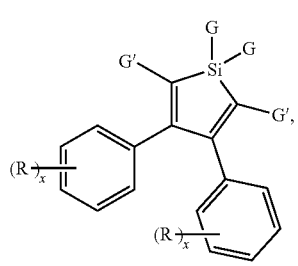

in the formula (III-1-1), each R is independently selected from the group consisting of hydrogen, and a linear or branched C1-6 alkyl; each x is independently an integer between 0 and 5; each G is independently selected from the group consisting of hydrogen, a linear or branched C1-6 alkyl, a group of formula (I-1') and —≡ (i.e. —C≡CH); and each G' is independently selected from the group consisting of hydrogen, a linear or branched C1-6 alkyl, a group of formula (I-1') and —≡;

(I-1')

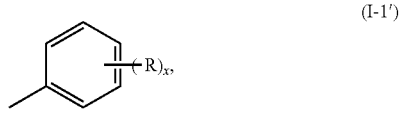

in the formula (I-1'), each R is independently selected from the group consisting of hydrogen, and a linear or branched C1-6 alkyl; and each x is independently an integer between 0 and 5;

at least one of G and G' is —≡;

(III-1'-1)

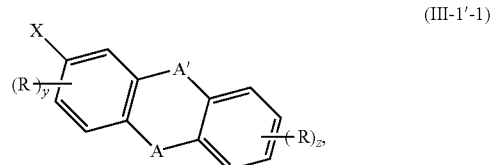

(III-2'-1)

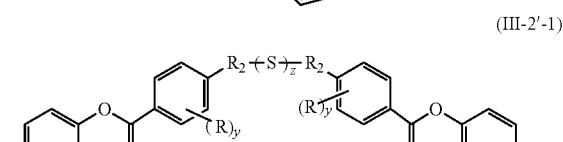

(III-3'-1)

(III-4'-1)

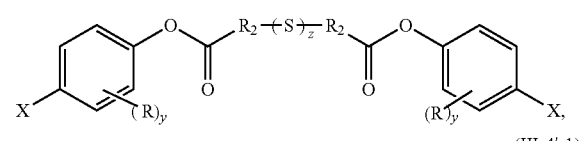

(III-5'-1)

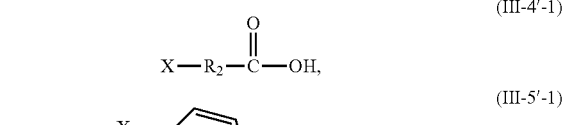

(III-6'-1)

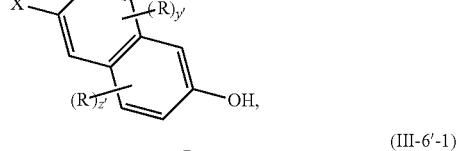

the group X is selected from the group consisting of F, Cl, Br, I, and OH, preferably is Cl or Br;

in the formula (III-1'-1), formula (III-2'-1), formula (III-3'-1), formula (III-4'-1) and formula (III-5'-1), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; each z is independently an integer between 1 and 4; each y' is independently an integer between 0-3; and each z' is independently an integer between 0 and 3;

in the formula (III-1'-1), one of A and A' is NR, and the other is S, wherein R is selected from the group consisting of hydrogen, and a linear or branched C1-6 alkyl;

in the formula (III-6'-1), $R_3$, $R_4$ and $R_5$ are independently selected from the group consisting of hydrogen, a linear or branched C1-20 alkyl (preferably, a linear or branched C1-10 alkyl), a hydroxyl, a group of formula (II-1), a group of formula (II-2) and a group of formula (II-3), provided that at least one of $R_3$, $R_4$ and $R_5$ is a group of formula (II-1), a group of formula (II-2), a group of formula (II-3) or a hydroxyl (preferably, $R_4$ is a group of formula (II-1), $R_3$ and $R_5$ are hydrogen; or $R_3$ and $R_5$ are a group of formula (II-3), $R_4$ is hydrogen; or $R_3$ and $R_5$ are hydrogen, $R_4$ is a hydroxyl);

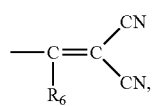
(II-1)

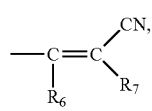
(II-2)

in the formula (II-1) and formula (II-2), $R_6$ is hydrogen, or a linear or branched C1-6 hydrocarbyl (preferably, hydrogen, or a linear or branched C1-4 alkyl), $R_7$ is hydrogen, or a linear or branched C1-6 hydrocarbyl (preferably, hydrogen, or a linear or branched C1-4 alkyl);

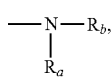
(II-3)

in the formula (II-3), $R_a$ is selected from the group consisting of hydrogen, and a linear or branched C1-20 alkyl (preferably, a linear or branched C1-10 alkyl); $R_b$ is selected from a groups consisting of hydrogen, and a linear or branched C1-20 alkyl.

Preferably, in the second method, the molar ratio between the silole compound of formula (III-1-1) and the one or more compounds of formula (III-1'-1), (III-2'-1), (III-3'-1), (III-4'-1), (III-5'-1) and (III-6'-1) in the reacting is preferably 0.1-10:1, most preferably 0.2-5:1. The reaction temperature is 0-50° C., preferably 15-35° C. In general, the longer the reaction time, the better. The reaction time is preferably 12-96 h, more preferably 24-72 h.

Preferably, in the second method, a catalyst is added to the reaction of the silole compound of formula (III-1-1) with the one or more compounds of formula (III-1'-1), (III-2'-1), (III-3'-1), (III-4'-1), (III-5'-1) and (III-6'-1). The catalyst is preferably one or more of metal phosphine complexes, metal halides, hydrocarbyl phosphine compounds and azo compounds, more preferably a mixture of metal phosphine complexes, metal halides and hydrocarbyl phosphine compounds, wherein the molar ratio of the three is 1:0.1-10:0.1-10, more preferably 1:0.2-5:0.2-5.

Preferably, in the second method, the metal phosphine complexes has a structure of

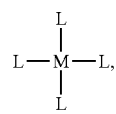

wherein m is Pd, Ru or Rh, and L is selected from the group consisting of $PPh_3$, pH, F, Cl, Br, and I. The metal phosphine complexes may be one or more selected from the group consisting of palladium tetra(triphenylphosphine), palladium tri(triphenylphosphine) chloride, palladium bis(triphenylphosphine) dichloride, palladium (triphenylphosphine) trichloride, ruthenium tetra(triphenylphosphine), ruthenium tri(triphenylphosphine) chloride, ruthenium bis(triphenylphosphine) dichloride, ruthenium (triphenylphosphine) trichloride, rhodium tetra(triphenylphosphine), rhodium tri (triphenylphosphine) chloride, rhodium bis(triphenylphosphine) dichloride, and rhodium (triphenylphosphine) trichloride, preferably one or more selected from the group consisting of palladium tetra(triphenylphosphine), palladium tri(triphenylphosphine) chloride, palladium bis(triphenylphosphine) dichloride, and palladium (triphenylphosphine) trichloride.

Preferably, in the second method, the metal halide may be one or more selected from the group consisting of halides of copper, iron and zinc. For example, it may be one or more selected from the group consisting of copper chloride, cuprous chloride, copper bromide, cuprous bromide, copper iodide, cuprous iodide, ferric chloride, ferrous chloride, ferric bromide, ferrous bromide, ferric iodide, ferrous iodide, $ZnCl_2$, $Zn_2Cl_2$, $ZnBr_2$, $Zn_2Br_2$, $ZnI_2$, and $Zn_2I_2$. More preferably, it may be one or more selected from the group consisting of copper chloride, cuprous chloride, copper bromide, cuprous bromide, copper iodide and cuprous iodide.

Preferably, in the second method, the hydrocarbyl phosphine compounds have a structure of

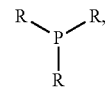

wherein each R is independently selected from the group consisting of a C6-C10 aryl and a linear or branched C1-C6 alkyl, and wherein at least one R is a C6-C10 aryl. The C6-C10 aryl may be selected from the groups consisting of phenyl and naphthyl; the linear or branched C1-C6 alkyl may be selected from the group consisting of methyl, ethyl, propyl, isopropyl, butyl, isobutyl, pentyl, isopentyl, hexyl and isohexyl. The hydrocarbyl phosphine compounds may be selected from the group consisting of triphenylphosphine and diphenyl butyl phosphine.

Preferably, in the second method, the azo compounds preferably have a structure of

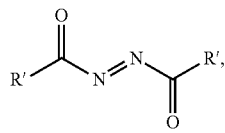

wherein each R' is the same or different from each other, and each R' is independently selected from the group consisting of hydrogen, a linear or branched C1-6 alkyl, a C3-10 cycloalkyl, a C6-10 aryl and a C1-6 alkoxyl. The azo compounds preferably may be one or more selected from the group consisting of dimethyl azodicarboxylate, diethyl azodicarboxylate, dipropyl azodicarboxylate and dibutyl azodicarboxylate.

Preferably, in the second method, the catalyst is added in amount of preferably 0.1%-100% by weight basing on the weight of the silole compound of formula (III-1-1).

The present application provides a photoluminescent lubricating grease composition comprising a luminescent material (and more particularly a photoluminescent material with aggregation-induced emission performance), a thickener and a lubricating base oil. The luminescent material comprises 0.0005%-5%, preferably 0.001%-2% by weight of the total weight of the lubricating grease composition; the thickener comprises 5%-30%, preferably 10%-20% by weight of the total weight of the lubricating grease composition; and the lubricating base oil constitutes the main part of the lubricating grease composition.

Preferably, the photoluminescent material with aggregation-induced emission performance includes a tetraphenylethylene compound and a silole derivative.

Preferably, the tetraphenylethylene compound includes tetraphenylethylene or its derivatives, and more preferably, the tetraphenylethylene compound has the following structure:

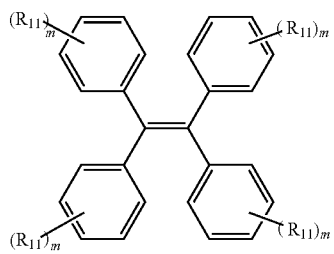

wherein each $R_{11}$ is the same or different from each other, and is independently selected from the group consisting of a linear or branched C1-6 alkyl (preferably, a linear or branched C1-4 alkyl); each m is the same or different, and is independently an integer between 0-5 (preferably, is 0, 1, 2, or 3).

Preferably, the tetraphenylethylene compound includes the following compounds or a mixture thereof:

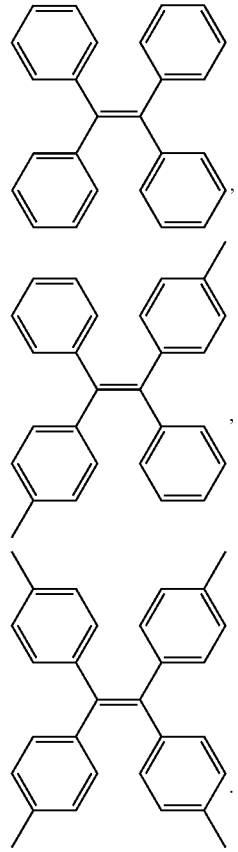

Preferably, the silole derivative includes the silole derivative of formula (I) and a phenylsilole derivative of formula (XI):

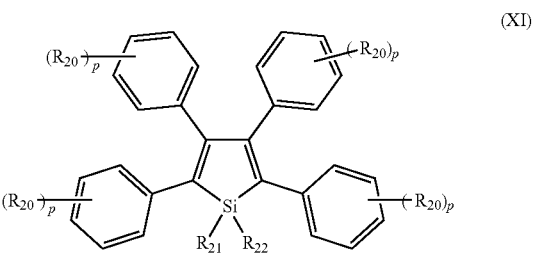

wherein each $R_{20}$ is the same or different from each other and is independently selected from the group consisting of a linear or branched C1-6 alkyl (preferably, a linear or branched C1-4 alkyl); each p is the same or different from each other and is independently an integer between 0 and 5 (preferably, is 0, 1, 2, or 3); $R_{21}$ is selected from the group consisting of a linear or branched C1-6 alkyl and a C6-10 aryl (preferably, a linear or branched C1-4 alkyl, phenyl and naphthyl); $R_{22}$ is selected from the group consisting of a linear or branched C1-6 alkyl and a C6-10 aryl (preferably, a linear or branched C1-4 alkyl, phenyl and naphthyl).

Preferably, the silole derivative of formula (XI) includes the following compounds or a mixture thereof:

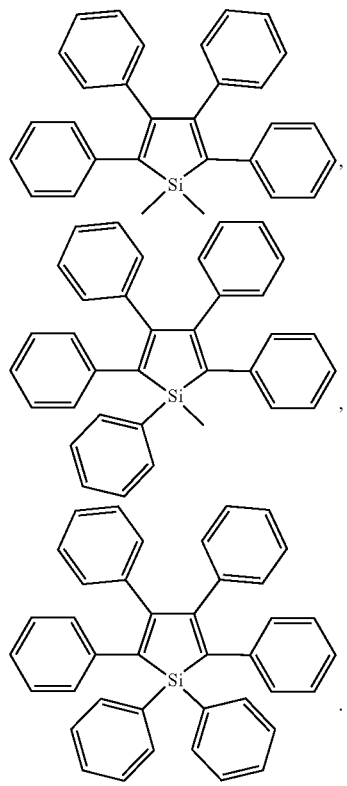

The thickener includes one or more selected from the group consisting of a polyurea thickener, a calcium-basing thickener and an aluminum composite-basing thickener, preferably is a polyurea thickener or an aluminum composite-basing thickener.

The thickener may be a soap-basing thickener or a non-soap-basing thickener. The soap-basing thickener preferably is a metal soap, which may be a single metallic soap or a composite metallic soap. The metal may be one or more selected from the group consisting of lithium, sodium, calcium, aluminum, zinc, potassium, barium, lead and manganese. The non-soap-basing thickener preferably is one or more selected from the group consisting of graphite, carbon black, asbestos, polyurea, bentonite and organic clay.

The lubricating base oil may be one or more selected from the group consisting of mineral oil, vegetable oil and synthetic oil, preferably is mineral oil or synthetic oil.

The present application provides a method for preparing a photoluminescent lubricating grease composition, comprising the steps of: compounding a lubricating base oil, a thickener and a luminescent material (and more particularly a photoluminescent material with aggregation-induced emission performance), and grinding to form a grease. The temperature of the compounding is 160-240° C., preferably 180-220° C.; the time of the compounding is 10-240 min, preferably 20-60 min. All of the lubricating base oils, the photoluminescent materials with aggregation-induced emission performance and the thickeners may be compounded together. Alternatively, part of the lubricating base oils, part of the photoluminescent materials with aggregation-induced emission performance may be compounded with the thickener first, and then compounded with the remained lubricating base oils and the remained photoluminescent materials with aggregation-induced emission performance.

The lubricating grease composition preferably is a polyurea lubricating grease composition, a lithium-basing lubricating grease composition or an aluminum composite-basing lubricating grease composition.

The method for preparing the polyurea lubricating grease composition in accordance with the present application includes the steps of: mixing part of the lubricating base oil, the photoluminescent material with aggregation-induced emission performance, amines and isocyanates; reacting at 65-95° C. for 10-60 min; at the end of the reaction, heating to 190-220° C. for high-temperature compounding, then adding the remained base oil, cooling to 60-120° C. and grinding to form a grease. The amine is C2-C20 alkyl amines and/or C6-C20 aryl amines. For example, it may be one or more selected from the group consisting of octadecylamine, cyclohexylamine and aniline. The isocyanate is C2-C20 isocyanate. It may be one or more selected from the group consisting of toluene diisocyanate (TDI) and 4,4'-diphenylmethane diisocyanate (MDI).

The method for preparing the lithium-basing lubricating grease composition in accordance with the present application includes the steps of: mixing part of the lubricating base oil with a fatty acid in a reactor, heating to a temperature of 40-90° C., adding the photoluminescent material with aggregation-induced emission performance and an aqueous solution of lithium hydroxide; heating for dehydration, and further heating to 190-220° C. for high-temperature compounding, adding the remained lubricating base oil, cooling to 60-120° C., and grinding to form a grease. The fatty acid is C12-C20 fatty acids and/or C12-C20 hydroxy fatty acids. It may be one or more selected from the group consisting of lauric acid, palmitic acid, stearic acid and 12-hydroxystearic acid.

The method for preparing the aluminum composite-basing lubricating grease composition in accordance with the present application includes the steps of: mixing part of the lubricating base oil, a fatty acid and an acid of low molecular weight in a reactor; heating to a temperature of 40-90° C.; adding the photoluminescent material with aggregation-induced emission performance; mixing the other part of lubricating base oil with aluminum alkoxide compound and heating to 40-100° C.; after aluminum alkoxide compound is completely dissolved, adding the obtained solution into the reactor, then heating to 190-220° C. for high-temperature compounding, adding the remained lubricating base oil, cooling to 60-120° C. and grinding to form a grease. The fatty acid is C12-C20 fatty acids and/or C12-C20 hydroxy fatty acids. It may be one or more selected from the group consisting of lauric acid, palmitic acid, stearic acid and 12-hydroxystearic acid. The acid of low molecular weight is C2-C11 organic acids. It may be one or more selected from the group consisting of acetic acid, propionic acid, oxalic acid, adipic acid, azelaic acid, sebacic acid and terephthalic acid. The aluminum alcohol compound is preferably selected from the group consisting of aluminum isopropoxide, aluminum isopropoxide dimer, and aluminum isopropoxide trimer.

In the method for preparing the lubricating grease composition in accordance with the present application, it is preferred that the photoluminescent material with aggregation-induced emission performance is dissolved in a solvent in advance. The solvent is preferably an aromatic solvent, such as benzene, toluene and xylene. The solvent is in an amount of 0.5-1000 times, preferably 1-100 times and more preferably 5-50 times of the weight of the photoluminescent material with aggregation-induced emission performance.

EXAMPLES

The following examples were used to further illustrate the present disclosure, but not to limit the present disclosure.

The First Embodiment

In the first embodiment in accordance with the present application, the silole derivative of formula (I) had a structure of:

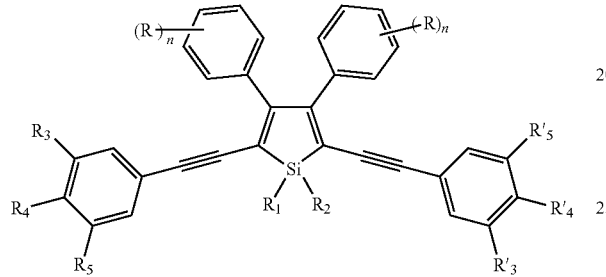

(I-I)

in the formula (I-I), each R was independently selected from the group consisting of hydrogen, and a linear or branched C1-6 alkyl; each n was independently an integer between 0-5; $R_1$ and $R_2$ were the same or different from each other, and independently selected from the group consisting of hydrogen, and a linear or branched C1-6 alkyl; $R_3$, $R_4$, $R_5$, $R'_3$, $R'_4$ and $R'_5$ were the same or different from each other, and independently selected from the group consisting of hydrogen, a linear or branched C1-300 alkyl (preferably, a linear or branched C1-10 alkyl or a polyolefin group with Mn of 300-3000) and a group of formula (II-I), provided that at least one of $R_3$, $R_4$, and $R_5$ was the group of formula (II-I), and at least one of $R'_3$, $R'_4$ and $R'_5$ was the group of formula (II-I);

(II-I)

each $R_a$ was the same or different from each other, and was independently selected from the group consisting of hydrogen, a linear or branched C1-20 alkyl (preferably, a linear or branched C1-10 alkyl) and a group of formula (II-I); each $R_b$ was the same or different from each other, and was independently selected from the group consisting of hydrogen, a linear or branched C1-20 alkyl and a group of formula (II-I);

In the first embodiment in accordance with the present application, $R_3$ and $R_5$ were preferably a group of formula (II-I); $R'_3$ and $R'_5$ were preferably a group of formula (II-I); $R_4$ and $R'_4$ were preferably hydrogen or a group of formula (II-I). In accordance with the present application, the silole derivative of formula (I-I) included the following compounds:

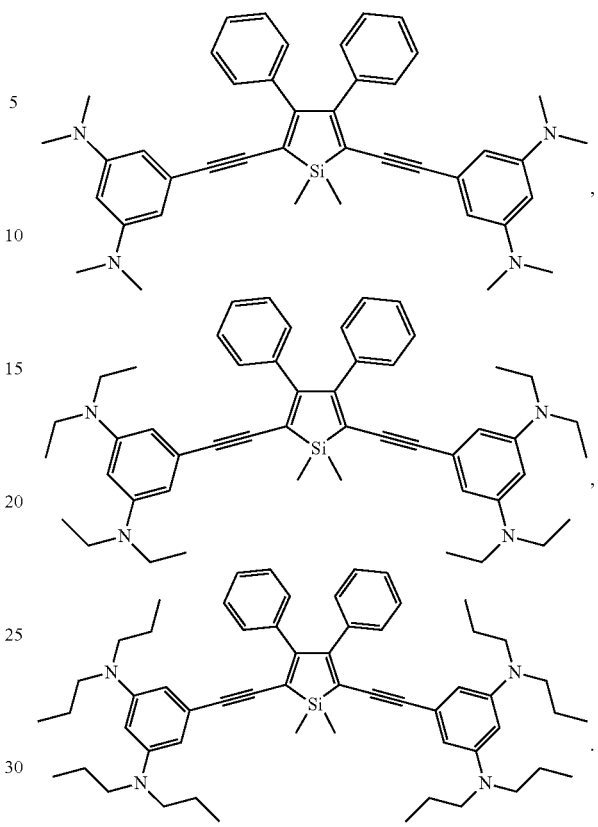

The second method in accordance with the present application was for preparing the silole derivative of formula (I-I), comprising the steps of: reacting a silole compound of formula (III-I) with an alkyne compound of formula (IV-I),

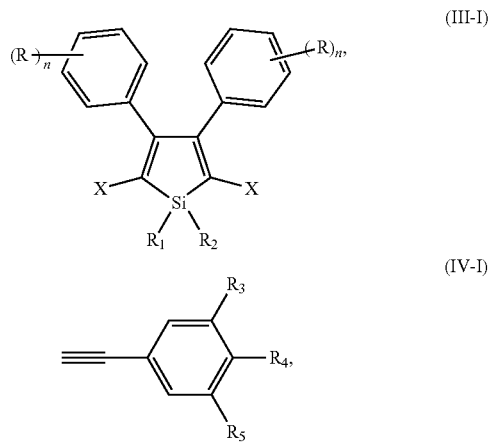

(III-I)

(IV-I)

in the formula (III-I), each R was independently selected from the group consisting of hydrogen, and a linear or branched C1-6 alkyl; each n was independently an integer between 0 and 5; each of the group X was the same or different from each other, and was independently selected from the group consisting of F, Cl, Br, I, and OH, preferably was Cl or Br; $R_1$ and $R_2$ were the same or different from each other, and independently selected from the group consisting of hydrogen, and a linear or branched C1-6 alkyl; $R_3$, $R_4$, and $R_5$, were the same or different from each other, and independently selected from the group consisting of hydrogen, a linear or branched C1-300 alkyl (preferably, a linear or branched C1-10 alkyl or a polyolefin group with Mn of 300-3000) and a group of formula (V-I), provided that at least one of $R_3$, $R_4$, and $R_5$ was the group of formula (V-I);

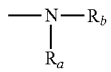
(V-I)

each $R_a$ was the same or different from each other, and was independently selected from the group consisting of hydrogen, a linear or branched C1-20 alkyl (preferably, and a linear or branched C1-10 alkyl); each $R_b$ was the same or different from each other, and was independently selected from the group consisting of hydrogen, and a linear or branched C1-20 alkyl.

The suitable silole compound of formula (III-I) included the following compounds:

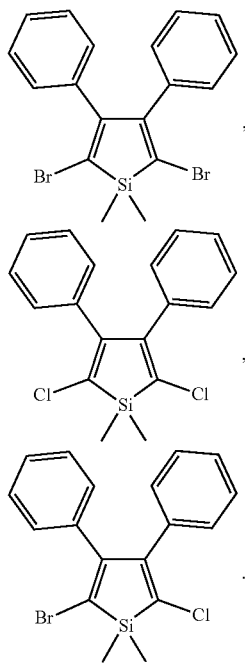

The suitable alkyne compound of formula (IV-I) included the following compounds:

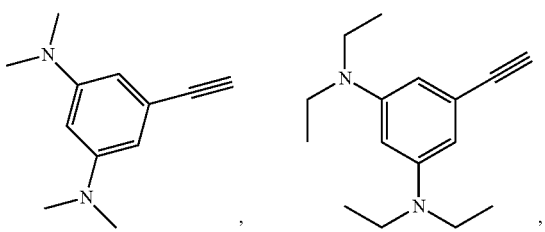

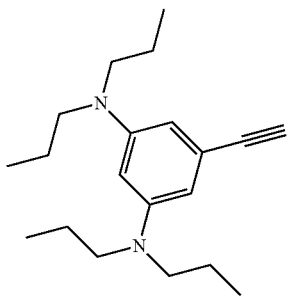

Preferably, a catalyst was added in the above reaction. The type and amount of the catalyst were those as mentioned above. In the first embodiment in accordance with the present application, preferably, the molar ratio between the silole compound of formula (III-1) and the alkyne compound of formula (IV-I) in the reaction was preferably 1-6:1, most preferably 2-4:1. The reaction temperature was 0-50° C., preferably 15-35° C. The reaction time was preferably 12-96 h, more preferably 24-72 h.

The sources of the materials used in the examples were listed as follows:

1,1-dimethyl-2,5-dibromo-3,4-diphenylsilole, 3,5-bis(dimethylamino)phenylacetylene, 3,5-bis(diethylamino)phenylacetylene, 3,5-bis(dipropylamino)phenylacetylene, cuprous iodide, triphenylphosphine, palladium tetra(triphenylphosphine), octadecylamine, MDI, stearic acid, benzoic acid, aluminum isopropoxide trimer, tetrahydrofuran, triethylamine, dichloromethane, methanol and the like were agents in analytically pure obtained from J&K scientific Ltd., Beijing innoChem Science & Technology Co., Ltd. and Sigma-Aldrich; PAO10 base oil was obtained from Exxon Mobil Corporation, and 500SN was obtained from SK Chemicals Co., Ltd.

Example I-1

To a 100 mL Schlenk reaction flask, 420 mg (1 mmol) of 1,1-dimethyl-2,5-dibromo-3,4-diphenylsilole, 733 mg (3 mmol) of 3,5-bis(diethylamino)phenylacetylene, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/methanol (20/1, V/V) as eluent. 460 mg of yellow solid product was obtained in a yield of 62%. The product had a NMR result as follow: $^1$H NMR (400 MHz, CDCl$_3$), δ(TMS, ppm): 7.11-6.85 (m, 10H), 6.57 (m, 4H), 6.36 (m, 2H), 3.43 (m, 16H), 1.27 (m, 24H), 0.49 (s, 6H); MS (MALDI-TOF): m/z calcd: 746.5 [M]+, found: 746.5.

The illustrated reaction equation was shown as follow:

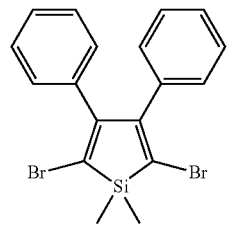

+

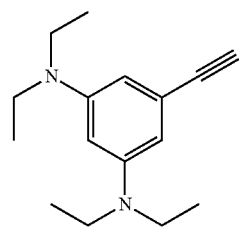

→

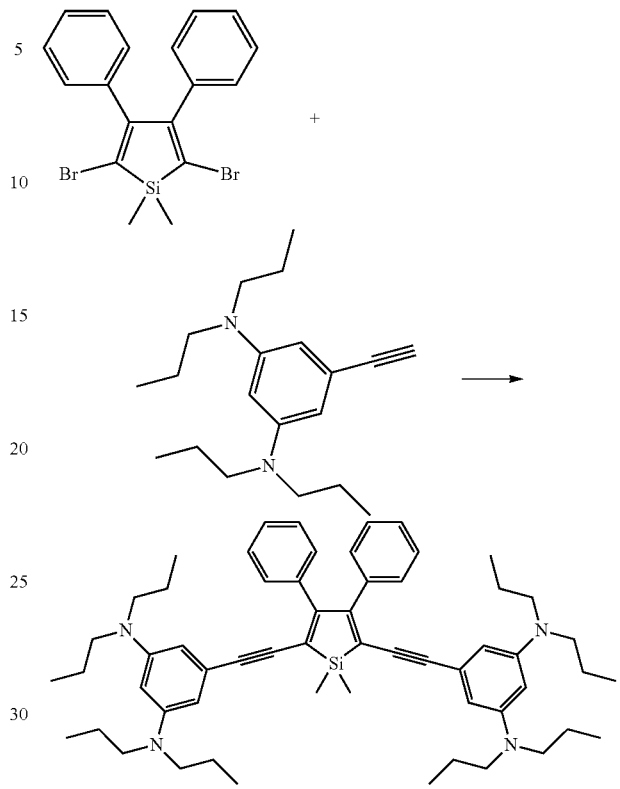

Example I-2

To a 100 mL Schlenk reaction flask, 420 mg (1 mmol) of 1,1-dimethyl-2,5-dibromo-3,4-diphenylsilole, 901 mg (3 mmol) of 3,5-bis(dipropylamino)phenylacetylene, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/methanol (20/1, V/V) as eluent. 507 mg of yellow solid product was obtained in a yield of 59%. The product had a NMR result as follow: $^1$H NMR (400 MHz, CDCl$_3$), δ(TMS, ppm): 7.12-6.84 (m, 10H), 6.55 (m, 4H), 6.34 (m, 2H), 3.42 (m, 16H), 1.62 (m, 16H), 0.83 (m, 24H), 0.49 (s, 6H); MS (MALDI-TOF): m/z calcd: 858.6 [M]+, found: 858.6.

The illustrated reaction equation was shown as follow:

Example I-3

To a 100 mL Schlenk reaction flask, 420 mg (1 mmol) of 1,1-dimethyl-2,5-dibromo-3,4-diphenylsilole, 565 mg (3 mmol) of 3,5-bis(dimethylamino)phenylacetylene, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/methanol (20/1, V/V) as eluent. 406 mg of yellow solid product was obtained in a yield of 64%. The product had a NMR result as follow: $^1$H NMR (400 MHz, CDCl$_3$), δ(TMS, ppm): 7.10-6.84 (m, 10H), 6.55 (m, 4H), 6.35 (m, 2H), 3.12 (m, 24H), 0.49 (s, 6H); MS (MALDI-TOF): m/z calcd: 634.4 [M]+, found: 634.4.

The illustrated reaction equation was shown as follow:

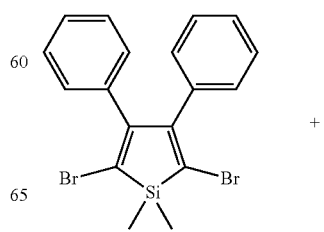 +

-continued

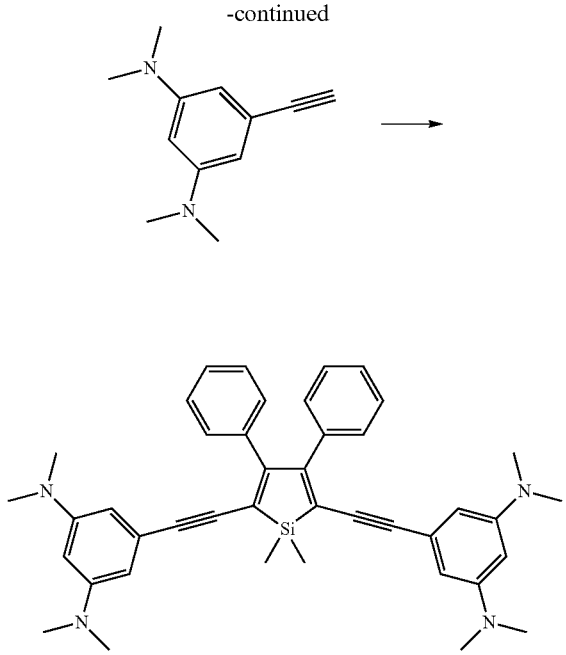

Example I-4

60 g 500SN base oil and 7.84 g 12-hydroxystearic acid were mixed in a reactor and heated to 85° C. 0.2 g 1,1-dimethyl-2,5-bis(3,5-diethylaminophenylethynyl)-3,4-diphenylsilole was dissolved in 5 g toluene and also added to the reactor. 1.21 g lithium hydroxide monohydrate was mixed with 8 g distilled water and heated to 95° C. After all lithium hydroxide was dissolved, the solution was also added to the reactor to carry out saponification reaction for 20 min. The mixture was stirred and heated to 110-150° C. for dehydration and toluene removal. Then, it was heated to 210° C. for 10 min to carry out high-temperature compounding. 32 g 500SN base oil was added to the mixture. After cooling the mixture to 110° C., 0.5 g of barium petroleum sulfonate and 1 g of dialkyldithiocarbamate were added. Then the mixture was cooled to room temperature and ground to form a grease.

Example I-5

60 g 500SN base oil and 7.84 g 12-hydroxystearic acid were mixed in a reactor and heated to 85° C. 0.5 g 1,1-dimethyl-2,5-bis(3,5-diethylaminophenylethynyl)-3,4-diphenylsilole was dissolved in 5 g toluene and also added to the reactor. 1.21 g lithium hydroxide monohydrate was mixed with 8 g distilled water and heated to 95° C. After all lithium hydroxide was dissolved, the solution was also added to the reactor to carry out saponification reaction for 20 min. The mixture was stirred and heated to 110-150° C. for dehydration and toluene removal. Then, it was heated to 210° C. for 10 min to carry out high-temperature compounding. 32 g 500SN base oil was added to the mixture. After cooling the mixture to 110° C., 0.5 g of barium petroleum sulfonate and 1 g of dialkyldithiocarbamate were added. Then the mixture was cooled to room temperature and ground to form a grease.

Example I-6

60 g PAO10 base oil and 7.84 g 12-hydroxystearic acid were mixed in a reactor and heated to 85° C. 0.2 g 1,1-dimethyl-2,5-bis(3,5-diethylaminophenylethynyl)-3,4-diphenylsilole was dissolved in 5 g toluene and also added to the reactor. 1.21 g lithium hydroxide monohydrate was mixed with 8 g distilled water and heated to 95° C. After all lithium hydroxide was dissolved, the solution was also added to the reactor to carry out saponification reaction for 20 min. The mixture was stirred and heated to 110-150° C. for dehydration and toluene removal. Then, it was heated to 210° C. for 10 min to carry out high-temperature compounding. 32 g PAO10 base oil was added to the mixture. After cooling the mixture to 110° C., 0.5 g of barium dinonylnaphthalene sulfonate and 1 g of dialkyldithiocarbamate were added. Then the mixture was cooled to room temperature and ground to form a grease.

Example I-7

60 g PAO10 base oil and 7.84 g 12-hydroxystearic acid were mixed in a reactor and heated to 85° C. 0.5 g 1,1-dimethyl-2,5-bis(3,5-diethylaminophenylethynyl)-3,4-diphenylsilole was dissolved in 5 g toluene and also added to the reactor. 1.21 g lithium hydroxide monohydrate was mixed with 8 g distilled water and heated to 95° C. After all lithium hydroxide was dissolved, the solution was also added to the reactor to carry out saponification reaction for 20 min. The mixture was stirred and heated to 110-150° C. for dehydration and toluene removal. Then, it was heated to 210° C. for 10 min to carry out high-temperature compounding. 32 g PAO10 base oil was added to the mixture. After cooling the mixture to 110° C., 0.5 g of barium dinonylnaphthalene sulfonate and 1 g of dialkyldithiocarbamate were added. Then the mixture was cooled to room temperature and ground to form a grease.

Example I-8

60 g PAO10 base oil and 7.84 g 12-hydroxystearic acid were mixed in a reactor and heated to 85° C. 1.21 g lithium hydroxide monohydrate was mixed with 8 g distilled water and heated to 95° C. After all lithium hydroxide was dissolved, the solution was also added to the reactor to carry out saponification reaction for 20 min. The mixture was stirred and heated to 110-150° C. to finish dehydration. Then, it was heated to 210° C. for 10 min to carry out high-temperature compounding. 32 g PAO10 base oil was added to the mixture. After cooling the mixture to 110° C., 0.5 g 1,1-dimethyl-2,5-bis(3,5-diethylaminophenylethynyl)-3,4-diphenylsilole, 0.5 g of barium dinonylnaphthalene sulfonate and 1 g of dialkyldithiocarbamate were added. Then the mixture was cooled to room temperature and ground to form a grease.

Comparative Example I-1

60 g 500SN base oil and 7.84 g 12-hydroxystearic acid were mixed in a reactor and heated to 85° C. 1.21 g lithium hydroxide monohydrate was mixed with 8 g distilled water and heated to 95° C. After all lithium hydroxide was dissolved, the solution was also added to the reactor to carry out saponification reaction for 20 min. The mixture was stirred and heated to 110-150° C. to finish dehydration. Then, it was heated to 210° C. for 10 min to carry out high-temperature compounding. 160 g 500SN base oil was added to the mixture. After cooling the mixture to 110° C., 0.5 g diphenylamine, 0.5 g of barium petroleum sulfonate and 1 g of dialkyldithiocarbamate were added. Then the mixture was cooled to room temperature and ground to form a grease.

Comparative Example I-2

60 g PAO10 base oil and 7.84 g 12-hydroxystearic acid were mixed in a reactor and heated to 85° C. 1.21 g lithium hydroxide monohydrate was mixed with 8 g distilled water and heated to 95° C. After all lithium hydroxide was dissolved, the solution was also added to the reactor to carry out saponification reaction for 20 min. The mixture was stirred and heated to 110-150° C. to finish dehydration. Then, it was heated to 210° C. for 10 min to carry out high-temperature compounding. 32 g PAO10 base oil was added to the mixture. After cooling the mixture to 110° C., 0.5 g diphenylamine, 0.5 g of barium dinonylnaphthalene sulfonate and 1 g of dialkyldithiocarbamate were added. Then the mixture was cooled to room temperature and ground to form a grease.

Tests were carried out to measure the performances of the greases obtained in the examples I-4 to I-8 and the comparative examples I-1 to I-2, respectively. The tests covered the dropping point of the greases in a wide temperature range as measured according to GB/T3498, cone penetration of the grease and a petroleum grease as measured according to GB/T269, oxidation stability of the grease as measured according to SH/T0325, steel mesh separation of the grease as measured according to SH/T0324, extreme pressure performance of the grease as measured according to SH/T0202, anti-wear performance of the grease as measured according to SH/T0204 and copper corrosion of the grease as measured according to GB/T7326. The results were shown in tables I-1 and I-2.

The Second Embodiment

In the second embodiment in accordance with the present application, the silole derivative of formula (I) had a structure of:

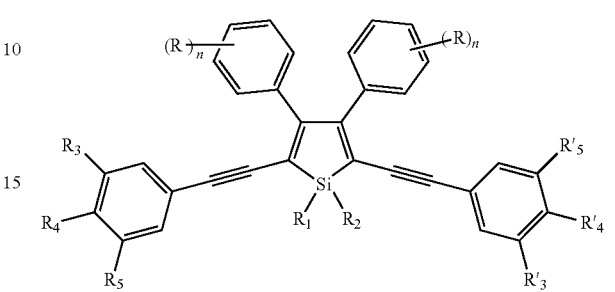

(I-II)

in the formula (I-II), each R was independently selected from the group consisting of hydrogen, and a linear or branched C1-6 alkyl; each n was independently an integer between 0-5; $R_1$ and $R_2$ were the same or different from each other, and independently selected from the group consisting of hydrogen, and a linear or branched C1-6 alkyl; $R_3$, $R_4$, $R_5$, $R'_3$, $R'_4$ and $R'_5$ were the same or different from each other, and independently selected from the group consisting of hydrogen, a linear or branched C1-300 hydrocarbyl (preferably, a linear or branched C1-10 alkyl or a polyolefin group with Mn of 300-3000), a group of formula (II-II) and a group of formula (III-II), provided that at least one of $R_3$, $R_4$, and $R_5$ was the group of formula (II-II), and at least one of $R'_3$, $R'_4$ and $R'_5$ was the group of formula (II-II) or the group of formula (III-II);

TABLE I-1 test results of the greases

| test results | Ex. I-4 | Ex. I-5 | Ex. I-6 | Ex. I-7 | Ex. I-8 | Comp. Ex. I-1 | Comp. Ex. I-2 |
|---|---|---|---|---|---|---|---|
| base oil | 500SN | 500SN | PAO10 | PAO10 | PAO10 | 500SN | PAO10 |
| appearance | yellow | yellow | light yellow | light yellow | light yellow | yellow | light yellow |
| illumination under UV light radiation | yellow fluorescence | yellow fluorescence | yellow fluorescence | yellow fluorescence | yellow fluorescence | No fluorescence | No fluorescence |
| droppin gpoint/° C. | 202 | 203 | 202 | 202 | 200 | 198 | 198 |
| cone penetration/0.1 mm | 267 | 265 | 272 | 269 | 272 | 273 | 275 |
| oxidation stability, pressure drop(99° C., 100 h)/MPa | 0.010 | 0.009 | 0.009 | 0.008 | 0.014 | 0.032 | 0.029 |
| steel mesh separation (100° C., 24 h)/% | 3.4 | 3.3 | 3.6 | 3.4 | 3.8 | 4.3 | 4.4 |
| tests on a four ball tester | | | | | | | |
| $P_B$/N | 490 | 618 | 490 | 618 | 490 | 490 | 490 |
| $P_D$/N | 2452 | 2452 | 2452 | 2452 | 2452 | 1961 | 1961 |
| diameter of the wear spot/mm | 0.58 | 0.56 | 0.56 | 0.55 | 0.59 | 0.62 | 0.61 |
| copper corrosion (100° C., 24 h)/rank | 1b | 1b | 1b | 1b | 1b | 1b | 1b |

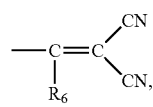  (II-II)

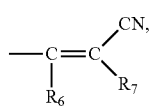  (III-II)

wherein R$_6$ was selected from the group consisting of hydrogen, and a linear or branched C1-6 hydrocarbyl (preferably, hydrogen, and a linear or branched C1-4 alkyl); R$_7$ was selected from the group consisting of hydrogen, and a linear or branched C1-6 hydrocarbyl (preferably, hydrogen, and a linear or branched C1-4 alkyl).

The second method in accordance with the present application was for preparing the silole derivative of formula (I-II), comprising the steps of: reacting a silole compound of formula (IV-II) with an alkyne compound of formula (V-II),

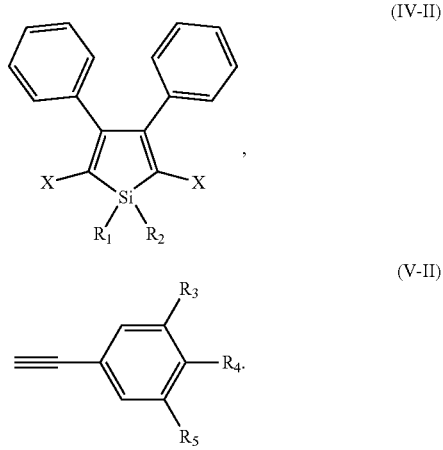

in the formula (IV-II), each of the group X was the same or different from each other, and was independently selected from the group consisting of F, Cl, Br, I, and OH, preferably was Cl or Br; R$_1$, R$_2$, R$_3$, R$_4$ and R$_5$ in the formula (IV-II) and formula (V-II) were those as mentioned above.

The suitable silole compound of formula (IV-II) included the following compounds:

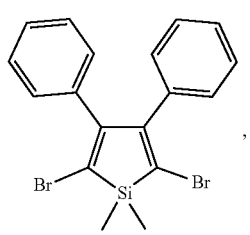

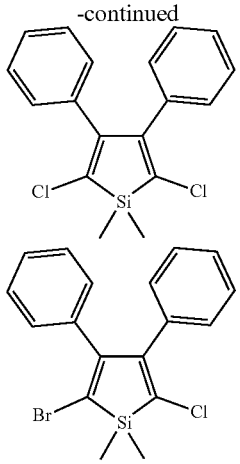

The suitable alkyne compound of formula (V-II) included the following compounds:

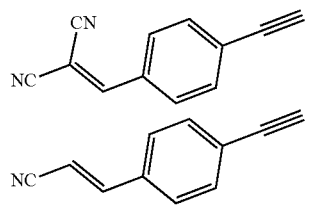

In the second embodiment in accordance with the present application, preferably, a catalyst was added into the above reaction. The type and amount of the catalyst were the same as mentioned in the first embodiment.

In the second embodiment in accordance with the present application, preferably, a solvent was added into the above reaction. The solvent was preferably C1-C10 organic amine or furan; for example, methylamine, dimethylamine, trimethylamine, ethylamine, diethylamine, triethylamine, propylamine, dipropylamine, tripropylamine or tetrahydrofuran; most preferably, a mixture of C1-C10 organic amine and furan, wherein the ratio by volume between the two was 1:0.1-10. The solvent might be added in an amount of 10-500 times of the weight of the silole compound of formula (IV-II).

In the second embodiment in accordance with the present application, preferably, the reaction was preferably carried out under an atmosphere of inert gas, most preferably under an atmosphere of nitrogen.

In the second embodiment in accordance with the present application, preferably, the molar ratio between the silole compound of formula (IV-II) and the alkyne compound of formula (V-II) in the reaction was preferably 1-6:1, most preferably 2-4:1. The reaction temperature was 0-50° C., preferably 15-35° C. The reaction time was preferably 12-96 h, more preferably 24-72 h.

In the second embodiment in accordance with the present application, preferably, the product of the reaction was purified. There was no special limitation on the method for purifying. One or more of filtration, washing, distillation, column chromatography and recrystallization could be considered. When the product of the reaction was purified by column chromatography, dichloromethane and/or methanol were preferred as eluant. A mixture of dichloromethane and methanol was more preferred as eluant, wherein the volume ratio between the two was preferably 5-50:1.

The sources of the materials used in the examples were listed as follows:

1,1-dimethyl-2,5-dibromo-3,4-diphenylsilole, 1,1-diphenyl-2,5-dibromo-3,4-diphenylsilole, 4-(dicyanovinyl)phenylacetylene, cuprous iodide, triphenylphosphine, palladium tetra(triphenylphosphine), octadecylamine, MDI, tetrahydrofuran, triethylamine, dichloromethane, methanol and the like were agents in analytically pure obtained from J&K scientific Ltd., Beijing innoChem Science & Technology Co., Ltd. and Sigma-Aldrich; PAO10 base oil was obtained from Exxon Mobil Corporation.

The methods for testing performances were clarified as follow.

The dropping point of the greases in a wide temperature range was measured according to GB/T3498, cone penetration of the grease and a petroleum grease was measured according to GB/T269, steel mesh separation of the grease was measured according to SH/T0324, extreme pressure performance of the grease was measured according to SH/T0202, anti-wear performance of the grease was measured according to SH/T0204 and copper corrosion of the grease was measured according to GB/T7326.

Example II-1

To a 100 mL Schlenk reaction flask, 420 mg (1 mmol) of 1,1-dimethyl-2,5-dibromo-3,4-diphenylsilole, 534 mg (3 mmol) of 4-(dicyanovinyl)phenylacetylene, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at 25° C. for 48 hours. At the end of the reaction, the reaction mixture was filtered and the filtrate was dried. The product was separated and purified by column chromatography with a mixture of dichloromethane/methanol (20/1, V/V) as eluent. 360 mg of red solid product was obtained in a yield of 59%. The product had a NMR result as follow: $^1$H NMR (400 MHz, CDCl$_3$), δ(TMS, ppm): 7.79 (s, 2H), 7.51 (d, 4H), 7.35 (d, 4H), 7.12-6.85 (m, 10H), 0.49 (s, 6H) MS (MALDI-TOF): m/z calcd: 614.2 [M]$^+$, found: 614.1.

The illustrated reaction equation was shown below:

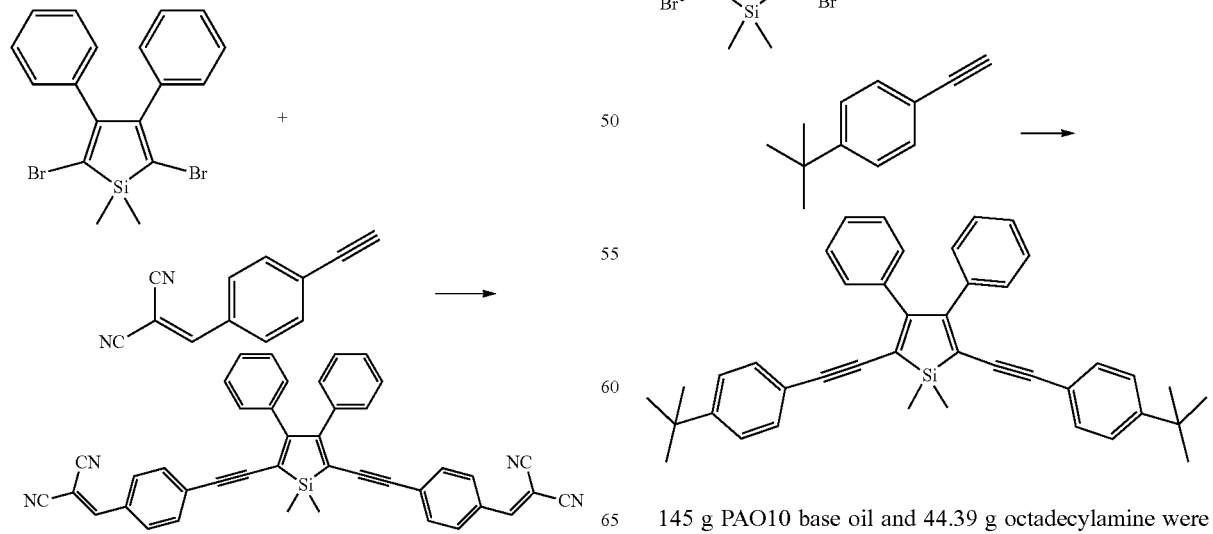

Example II-2

145 g PAO10 base oil and 44.39 g octadecylamine were mixed in a reactor and heated to 60° C. 2.5 g 1,1-dimethyl-2,5-bis(dicynaovinylphenylethynyl)-3,4-diphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, then further heated to 210° C. and further adding 145 g PAO10 base oil. After cooling to about 100° C., the mixture was ground to get a product.

Comparative Example II-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, then further heated to 210° C. and further adding 145 g PAO10 base oil. After cooling to about 100° C., the mixture was ground to get a product.

Comparative Example II-2

The example II-1 was repeated excepted that 4-(dicyanovinyl)phenylacetylene was replaced with 4-t-butylphenylacetylene. At the end of the reaction, the reaction mixture was filtered and the filtrate was dried. The product was separated and purified by column chromatography with a mixture of dichloromethane/methanol (20/1, V/V) as eluent. 290 mg of yellowish green solid product was obtained in a yield of 50%. The product had a NMR result as follow: $^1$H NMR (400 MHz, CDCl$_3$), δ(TMS, ppm): 7.35 (d, 4H), 7.24 (d, 4H), 7.12-6.85 (m, 10H), 1.32 (s, 18H), 0.49 (s, 6H) MS (MALDI-TOF): m/z calcd: 574.3 [M]$^+$, found: 574.3.

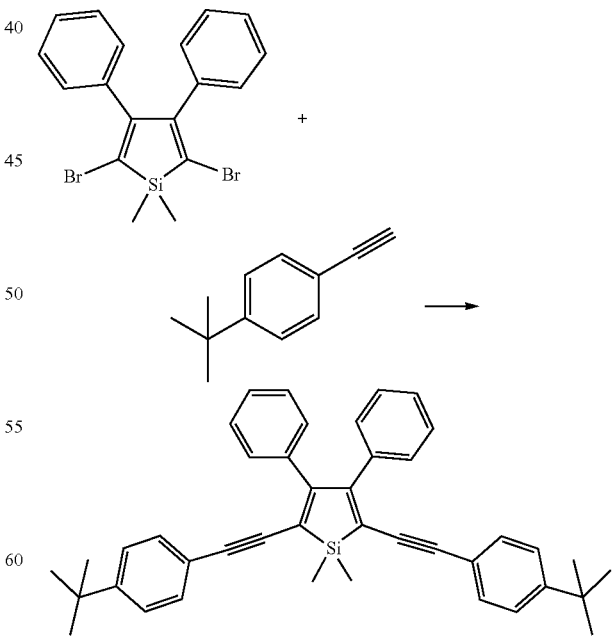

145 g PAO10 base oil and 44.39 g octadecylamine were mixed in a reactor and heated to 60° C. 2.5 g 1,1-dimethyl-2,5-bis(t-butylphenylethynyl)-3,4-diphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, then further heated to 210° C. and further adding 145 g PAO10 base oil. After cooling to about 100° C., the mixture was ground to get a product.

Tests were carried out on the grease products obtained in the examples II-2 and the comparative examples II-1 to II-2, respectively, to measure the physical-chemical properties thereof. The results were shown in table II-1.

TABLE II-1

| Test items | Example II-2 | Comparative example II-1 | Comparative example 11-2 |
|---|---|---|---|
| dropping point/° C. | 284 | 282 | 283 |
| appearance | brown | brown | brown |
| cone penetration/(0.1 mm) | 260 | 260 | 264 |
| steel mesh separation(100° C., 24 h)/% | 3.9 | 4.1 | 4.0 |
| tests on a four ball tester | | | |
| $P_B$/N | 784 | 490 | 618 |
| $P_D$/N | 2452 | 1961 | 1961 |
| diameter of the wear spot/mm | 0.51 | 0.69 | 0.61 |
| illumination under UV light radiation | red fluorescence | No fluorescence | yellowish green fluorescence |

The Third Embodiment

In the third embodiment in accordance with the present application, the silole derivative of formula (I) had a structure of formula (I-III):

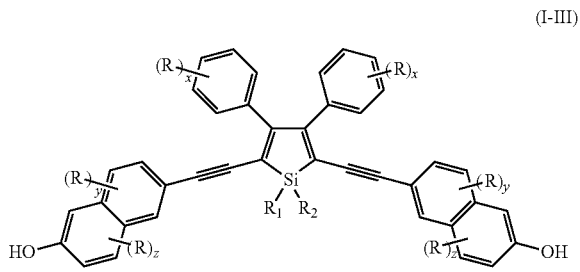

(I-III)

in the formula (I-III), $R_1$ and $R_2$ were the same or different from each other, and independently selected from the group consisting of hydrogen, a linear or branched C1-6 alkyl and an aryl; each R was independently selected from the group consisting of hydrogen, and a linear or branched C1-6 alkyl; x was an integer between 0-4; y was an integer between 0-3; z was an integer between 0-2.

In the third embodiment in accordance with the present application, preferably, $R_1$ and $R_2$ were the same or different from each other, and independently selected from the group consisting of hydrogen, a linear or branched C1-4 alkyl and phenyl; each R was independently selected from the group consisting of hydrogen, and a linear or branched C1-4 alkyl; x was an integer between 0-3; y was an integer between 0-2; z was 0 or 1.

The second method in accordance with the present application was for preparing the silole derivative of formula (I-III), comprising the steps of: reacting a silole compound of formula (II-III) with an alkyne compound of formula (III-III),

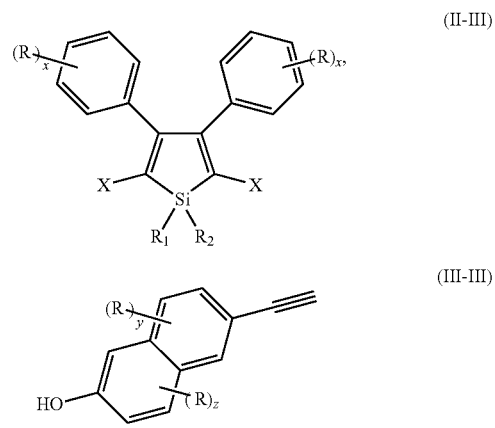

in the formula (II-III), $R_1$ and $R_2$ were the same or different from each other, and independently selected from the group consisting of hydrogen, a linear or branched C1-6 alkyl and an aryl; each of the group X was the same or different from each other, and was independently selected from the group consisting of F, Cl, Br, I, and OH; each R in the formula (II-III) and formula (III-III) was independently selected from the group consisting of hydrogen, and a linear or branched C1-6 alkyl; x was an integer between 0-5; y was an integer between 0-3; z was an integer between 0-2.

In the third embodiment in accordance with the present application, preferably, $R_1$ and $R_2$ were the same or different from each other, and independently selected from the group consisting of hydrogen, a linear or branched C1-4 alkyl and an aryl; each of the group X was independently Cl or Br; each R was independently selected from the group consisting of hydrogen, and a linear or branched C1-4 alkyl; x was an integer between 0-3; y was an integer between 0-2; z was 0 or 1.

The suitable silole compound of formula (II-III) included the following compounds:

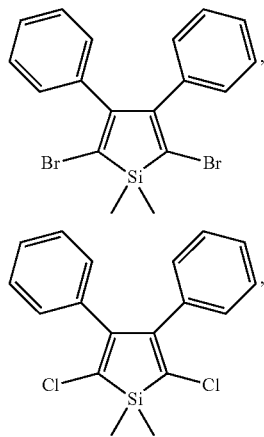

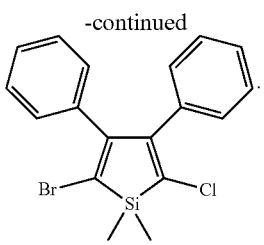

In the third embodiment in accordance with the present application, preferably, a catalyst was added into the above reaction. The type and amount of the catalyst were the same as mentioned in the first embodiment.

In the third embodiment in accordance with the present application, preferably, a solvent was added into the above reaction. The solvent was preferably C1-C10 organic amine or furan; for example, methylamine, dimethylamine, trimethylamine, ethylamine, diethylamine, triethylamine, propylamine, dipropylamine, tripropylamine or tetrahydrofuran; most preferably, a mixture of C1-C10 organic amine and furan, wherein the ratio by volume between the two was 1:0.1-10. The solvent might be removed by the method known in the art after the reaction. There was not any special limitation on the method for removing the solvent. The removal method might include distillation, evaporation and column chromatography. Preferably, column chromatography was used to separate and purify the silole derivatives. A mixture of dichloromethane and petroleum ether might be used as eluent, wherein the volume ratio of dichloromethane to petroleum ether was preferably 1:0.5-5.

In the third embodiment in accordance with the present application, preferably, the molar ratio between the alkyne compound of formula (III-III) and the silole compound of formula (II-III) in the reaction was preferably 1-6, most preferably 2-4. The reaction temperature was 0-50° C., preferably 15-35° C. The reaction time was preferably 12-96 h, more preferably 24-72 h.

In the third embodiment in accordance with the present application, preferably, the product of the reaction might be preferably purified at the end of the reaction. There was no special limitation on the method for purifying. One or more of washing, distillation, filtration, drying and recrystallization could be considered.

The sources of the materials used in the examples were listed as follows:

1,1-dimethyl-2,5-dibromo-3,4-diphenylsilole, 1,1-diphenyl-2,5-dibromo-3,4-diphenylsilole, 2-hydroxy-6-ethynylnaphthol, cuprous iodide, triphenylphosphine, palladium tetra(triphenylphosphine), octadecylamine, MDI, tetrahydrofuran, triethylamine, dichloromethane, methanol and the like were agents in analytically pure obtained from J&K scientific Ltd., Beijing innoChem Science & Technology Co., Ltd. and Sigma-Aldrich; PAO10 base oil was obtained from Exxon Mobil Corporation.

Example III-1

To a 100 mL Schlenk reaction flask, 420 mg (1 mmol) of 1,1-dimethyl-2,5-dibromo-3,4-diphenylsilole, 505 mg (3 mmol) of 2-hydroxy-6-ethynylnaphthol, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (2/1, V/V) as eluent. 410 mg of yellow solid product was obtained in a yield of 69%. The product had a NMR result as follow: $^1$H NMR (400 MHz, CDCl$_3$), δ(TMS, ppm): 7.83-7.75 (m, 6H), 7.45 (m, 2H), 7.18 (m, 2H), 7.11-6.85 (m, 10H), 0.48 (s, 6H); MS (MALDI-TOF): m/z calcd: 594.2 [M]$^+$, found: 594.2.

The product of the Example III-1 was obtained by the following reaction equation:

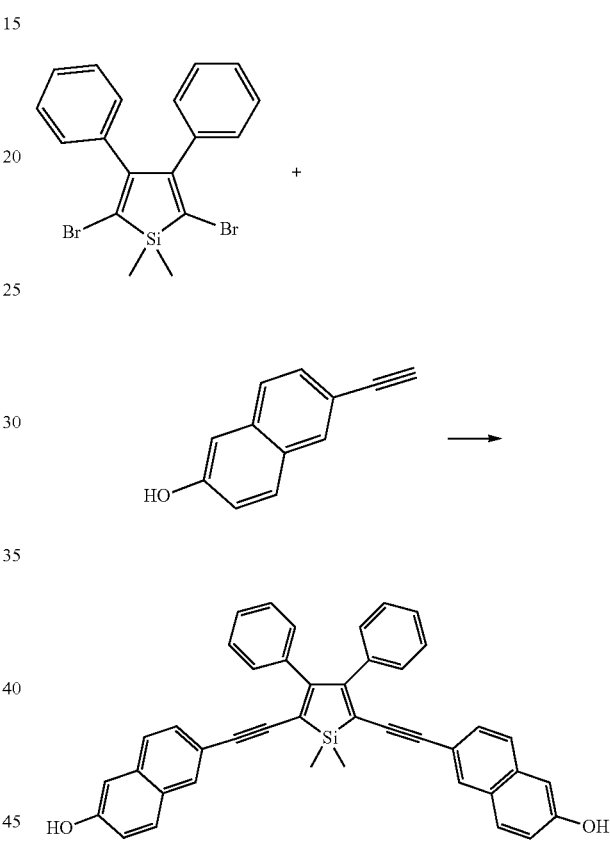

Example III-2

To a 100 mL Schlenk reaction flask, 544 mg (1 mmol) of 1,1-diphenyl-2,5-dibromo-3,4-diphenylsilole, 505 mg (3 mmol) of 2-hydroxy-6-ethynylnaphthol, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (2/1, V/V) as eluent. 460 mg of yellow solid product was obtained in a yield of 64%. The product had a NMR result as follow: $^1$H NMR (400 MHz, CDCl$_3$), δ(TMS, ppm): 7.85-7.75 (m, 6H), 7.46 (m, 2H), 7.18 (m, 2H), 7.13-6.85 (m, 20H); MS (MALDI-TOF): m/z calcd: 718.2 [M]$^+$, found: 718.2.

The product of the Example III-2 was obtained by the following reaction equation:

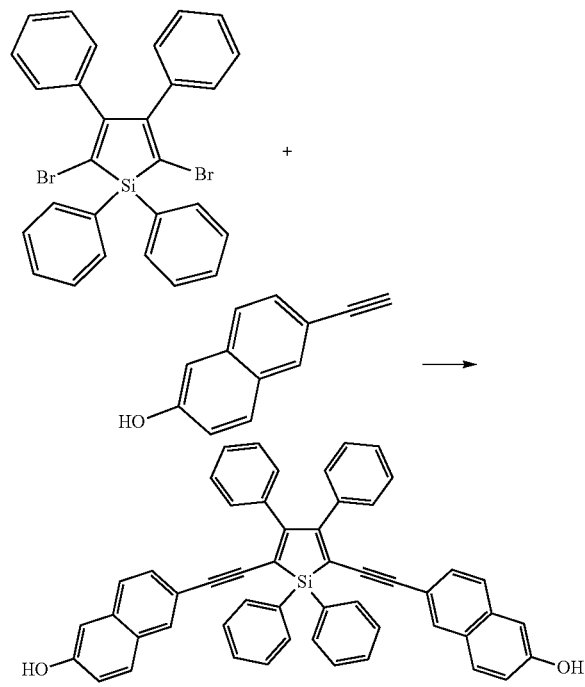

Example III-3

145 g PAO10 base oil and 44.39 g octadecylamine were mixed in a reactor and heated to 60° C. 2.5 g 1,1-dimethyl-2,5-bis(2-hydroxy-6-ethynylnaphthol)-3,4-diphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, then further heated to 210° C. and further adding 145 g PAO10 base oil. After cooling to about 100° C., the mixture was ground to form a grease.

Example III-4

145 g PAO10 base oil and 44.39 g octadecylamine were mixed in a reactor and heated to 60° C. 2.5 g 1,1-diphenyl-2,5-bis(2-hydroxy-6-ethynylnaphthol)-3,4-diphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, then further heated to 210° C. and further adding 145 g PAO10 base oil. After cooling to about 100° C., the mixture was ground to form a grease.

Example III-5

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C., further adding 145 g PAO10 base oil, cooled to about 100° C., adding 2.5 g 1,1-diphenyl-2,5-bis(2-hydroxy-6-ethynylnaphthol)-3,4-diphenylsilole and ground to form a grease.

Comparative Example III-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C., further adding 145 g PAO10 base oil and cooling to about 100° C., and then ground to form a grease.

Tests were carried out to measure the performances of the greases obtained in the examples III-3 to III-5 and the comparative example III-1 respectively. The tests covered the dropping point of the greases in a wide temperature range as measured according to GB/T3498, cone penetration of the grease and a petroleum grease as measured according to GB/T269, oxidation induction period of the grease as measured according to SH/T0719, oxidation stability of the grease as measured according to SH/T0325, and steel mesh separation of the grease as measured according to SH/T0324. The results were shown in tables III-1.

TABLE III-1

| | test results | | | |
|---|---|---|---|---|
| the grease | Example III-3 | Example III-4 | Example III-5 | Comparative example III-1 |
| droping point/° C. | 282 | 283 | 285 | 282 |
| appearance | brown | brown | brown | brown |
| cone penetration/ (0.1 mm) | 259 | 261 | 266 | 260 |
| oxidation induction period (200° C.)/min | 96 | 104 | 76 | 18 |
| oxidation stability, pressure drop (99° C., 100 h)/MPa | 0.010 | 0.010 | 0.012 | 0.080 |
| steel mesh separation (100° C., 24 h)/% | 3.9 | 3.7 | 4.2 | 4.1 |
| illumination under UV light radiation | yellowish green fluorescence | yellowish green fluorescence | yellowish green fluorescence | No fluorescence |

The Fourth Embodiment

In the fourth embodiment in accordance with the present application, the silole derivative of formula (I) had a structure of formula (I-IV):

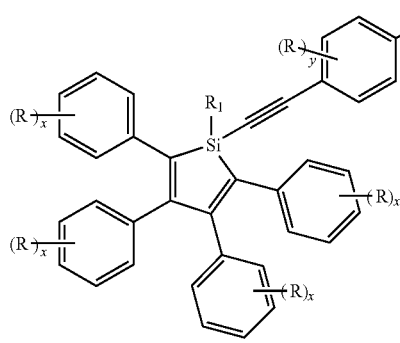
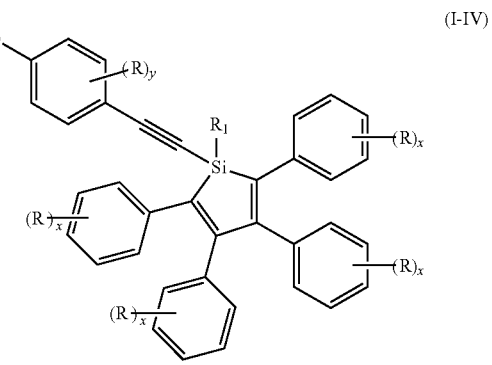

in the formula (I-IV), each $R_1$ was independently selected from the group consisting of hydrogen, a linear or branched C1-6 alkyl and a C6-10 aryl; each $R_2$ was independently selected from the group consisting of a linear or branched C1-6 alkylene; each R was independently selected from the group consisting of hydrogen, and a linear or branched C1-6 alkyl; x was an integer between 0-5; y was an integer between 0-4; z was an integer between 1-4.

In the fourth embodiment in accordance with the present application, preferably, each $R_1$ was independently selected from the group consisting of hydrogen, a linear or branched C1-4 alkyl and phenyl; each $R_2$ was independently selected from the group consisting of a linear or branched C1-4 alkylene; each R was independently selected from the group consisting of hydrogen, and a linear or branched C1-4 alkyl; x was an integer between 0-3; y was 0, 1 or 2.

The first method in accordance with the present application was for preparing the silole derivative of formula (I-IV), comprising the steps of: reacting a silole compound of formula (II-IV) with a phenol compound of formula (III-IV) and a compound of formula (IV-IV),

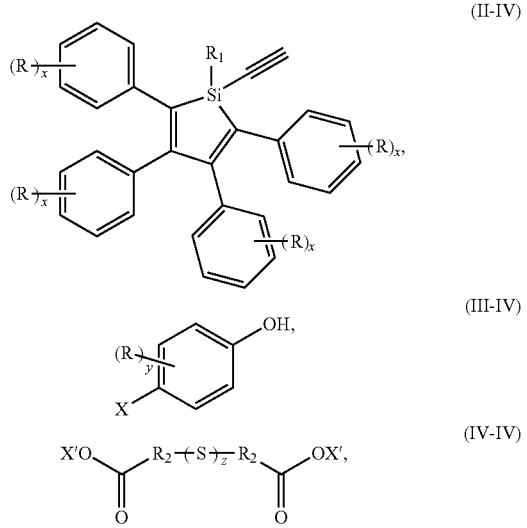

in the formula (II-IV), $R_1$ was selected from the group consisting of hydrogen, a linear or branched C1-6 alkyl and a C6-10 aryl; each R was independently selected from the group consisting of hydrogen, and a linear or branched C1-6 alkyl; x was an integer between 0-5;

in the formula (III-IV), R was independently selected from the group consisting of hydrogen, and a linear or branched C1-6 alkyl; y was an integer between 0-4; the group X was selected from the group consisting of F, Cl, Br, I, and OH;

in the formula (IV-IV), $R_2$ was independently selected from the group consisting of a linear or branched C1-6 alkylene; the group X' was selected from the group consisting of F, Cl, Br, I, and OH; z was an integer between 1-4.

In the fourth embodiment in accordance with the present application, preferably, in the formula (II-IV), $R_1$ was selected from the group consisting of hydrogen, a linear or branched C1-4 alkyl and phenyl; each R was independently selected from the group consisting of hydrogen, and a linear or branched C1-4 alkyl; x was an integer between 0-3;

in the formula (III-IV), R was independently selected from the group consisting of hydrogen, and a linear or branched C1-4 alkyl; y was 0, 1 or 2; the group X was selected from the group consisting of Cl, Br, I, and OH;

in the formula (IV-IV), $R_2$ was independently selected from the group consisting of a linear or branched C1-4 alkylene; the group X' was selected from the group consisting of Cl, Br, I, and OH.

The suitable silole compound of formula (II-IV) included the following specific compounds:

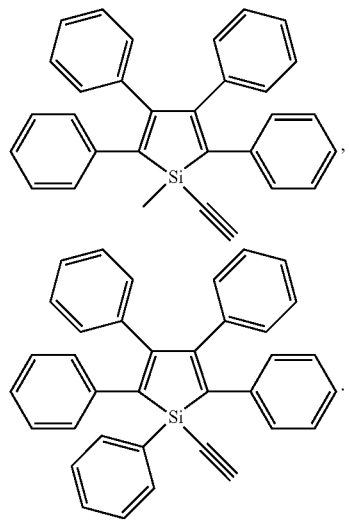

The suitable phenol compound of formula (III-IV) included the following specific compounds:

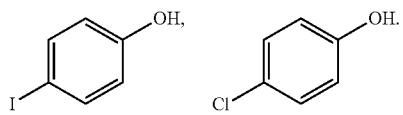

In the fourth embodiment in accordance with the present application, preferably, the suitable compound of formula (IV-IV) included the following specific compounds:

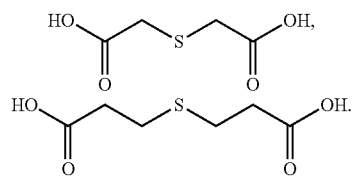

In the fourth embodiment in accordance with the present application, preferably, a catalyst was added into the above reaction. The type and amount of the catalyst were the same as mentioned in the first embodiment.

In the fourth embodiment in accordance with the present application, preferably, the molar ratio of the silole compound of formula (II-IV), the phenol compound of formula (III-IV) and the compound of formula (IV-IV) in the reaction was preferably 1:0.5-5:0.2-5, most preferably 1:0.8-3:0.3-3. The reaction temperature was 0-50° C., preferably 15-35° C.

In the fourth embodiment in accordance with the present application, preferably, the reaction time was preferably 6-96 h, more preferably 12-72 h.

In the fourth embodiment in accordance with the present application, preferably, a solvent was added into the above reaction. The solvent was preferably C1-C10 organic amine or furan; for example, methylamine, dimethylamine, triethylamine, ethylamine, diethylamine, triethylamine, propylamine, dipropylamine, tripropylamine or tetrahydrofuran; most preferably, a mixture of C1-C10 organic amine and furan, wherein the ratio by volume between the two was 1:0.1-10. The solvent might be removed by the method known in the art at the end of the reaction. There was not any special limitation on the method for removing the solvent. The removal method may include distillation, evaporation and column chromatography. Preferably, column chromatography was used to separate and purify the silole derivatives. A mixture of dichloromethane and petroleum ether might be used as eluent, wherein the volume ratio of dichloromethane to petroleum ether was preferably 1:0.5-5.

In the fourth embodiment in accordance with the present application, preferably, the silole compound of formula (II-IV) might be reacted with the phenol compound of formula (III-IV), and then the obtained product might be reacted with the compound of formula (IV-IV).

In the fourth embodiment in accordance with the present application, preferably, in the reaction between the silole compound of formula (II-IV) and the phenol compound of formula (III-IV), the molar ratio between the silole compound of formula (II-IV) and the phenol compound of formula (III-IV) was preferably 1:0.5-5, most preferably 1:0.8-3. The reaction temperature was 0-50° C., preferably 15-35° C. In general, the longer the reaction time was, the higher the yield was. The reaction time meight be 6-96 h, preferably 12-72 h.

In the fourth embodiment in accordance with the present application, preferably, a catalyst was added in the reaction between the silole compound of formula (II-IV) and the phenol compound of formula (III-IV). The type and amount of the catalyst were the same as mentioned in the first embodiment.

In the fourth embodiment in accordance with the present application, preferably, in the reaction between the product of the reaction of the silole compound of formula (II-IV) with the phenol compound of formula (III-IV) and the compound of formula (IV-IV), the molar ratio between the silole compound of formula (II-IV) and the compound of formula (IV-IV) was preferably 1:0.2-5, most preferably 1:0.3-3. The reaction temperature was 0-50° C., preferably 15-35° C. In general, the longer the reaction time was, the higher the yield was. The reaction time meight be 6-96 h, preferably 12-72 h.

In the fourth embodiment in accordance with the present application, preferably, a catalyst was added in the reaction between the product of the reaction of the silole compound of formula (II-IV) with the phenol compound of formula (III-IV) and the compound of formula (IV-IV). The catalyst was preferably hydrocarbyl phosphine compounds and/or azo compounds, more preferably a mixture of hydrocarbyl phosphine compounds and azo compounds, wherein the molar ratio of the two was 1:0.1-10, more preferably 1:0.2-5. The hydrocarbyl phosphine compounds preferably had a structure of

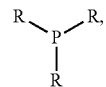

wherein each R was independently selected from the group consisting of a C6-C10 aryl and a linear or branched C1-C6 alkyl, and wherein at least one R was a C6-C10 aryl. The C6-C10 aryl meight be selected from the groups consisting of phenyl and naphthyl; the linear or branched C1-C6 alkyl meight be selected from the group consisting of methyl, ethyl, propyl, isopropyl, butyl, isobutyl, pentyl, isopentyl, hexyl and isohexyl. The hydrocarbyl phosphine compound meight be selected from the group consisting of triphenylphosphine and diphenyl butyl phosphine. The azo compounds preferably had a structure of

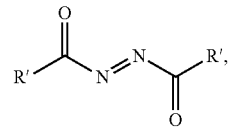

wherein each R' was the same or different from each other, and each R' was independently selected from the group consisting of hydrogen, a linear or branched C1-6 alkyl, a C3-10 cycloalkyl, a C6-10 aryl and a C1-6 alkoxyl. The azo compounds preferably meight be one or more selected from the group consisting of dimethyl azodicarboxylate, diethyl azodicarboxylate, dipropyl azodicarboxylate and dibutyl azodicarboxylate.

In the fourth embodiment in accordance with the present application, in the reaction between the product of the reaction of the silole compound of formula (II-IV) with the phenol compound of formula (III-IV) and the compound of formula (IV-IV), the catalyst was added in an amount of 0.1%-100% by weight of the total weight of the silole compound of formula (II-IV).

The sources of the materials used in the examples were listed as follows:

1-alkynyl-1,2,3,4,5-pentaphenylsilole, 1-methyl-1-alkynyl-2,3,4,5-tetraphenylsilole, p-iodophenol, cuprous iodide, triphenylphosphine, palladium tetra(triphenylphosphine), diethyl azodicarboxylate, octadecylamine, MDI, tetrahydrofuran, triethylamine, dichloromethane, petroleum ether and the like were agents in analytically pure obtained from J&K scientific Ltd., Beijing innoChem Science & Technology Co., Ltd. and Sigma-Aldrich; PAO10 base oil was obtained from Exxon Mobil Corporation.

Example IV-1

To a 100 mL Schlenk reaction flask, 487 mg (1 mmol) of 1-alkynyl-1,2,3,4,5-pentaphenylsilole, 264 mg (1.2 mmol) of p-iodophenol, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (1/1, V/V) as eluent. 430 mg of yellow solid product was obtained in a yield of 74%. The product had a NMR result as follow: $^1$H NMR (400 MHz, CDCl$_3$), δ(TMS, ppm): 7.74 (m, 2H), 7.36 (m, 3H), 7.15-6.85 (m, 24H); MS (MALDI-TOF): m/z calcd: 578.2 [M]$^+$, found: 578.2.

The reaction equation of the Example IV-1 was shown as follow:

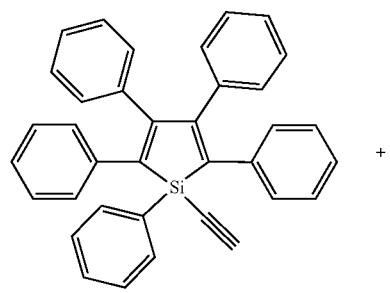
+
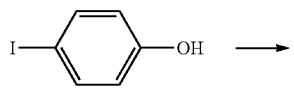
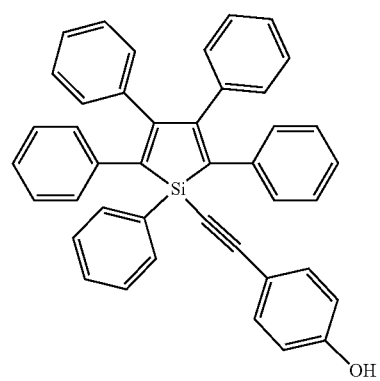

Example IV-2

To a 100 mL Schlenk reaction flask, 1158 mg (2 mmol) of 1-(4-hydroxyphenylalkynyl)-1,2,3,4,5-pentaphenylsilole, 178 mg (1 mmol) of thiodipropionic acid, 630 mg (2.4 mmol) of triphenylphosphine and 30 mL of tetrahydrofuran were added. 418 mg (2.4 mmol) of diethyl azodicarboxylate was further added by slow dropping at 0° C. The reaction was carried out at room temperature for 18 hours. At the end of the reaction, the reaction mixture was filtered and the filtrate was dried. The product was separated and purified by column chromatography with a mixture of dichloromethane/petroleum ether (1/2, V/V) as eluent. 960 mg of yellow solid product was obtained in a yield of 78%. The product had a NMR result as follow: $^1$H NMR (400 MHz, CDCl$_3$), δ(TMS, ppm): 7.72 (m, 4H), 7.35 (m, 6H), 7.13-6.85 (m, 48H), 2.92 (m, 4H), 2.78 (m, 4H); MS (MALDI-TOF): m/z calcd: 1298.4 [M]+, found: 1298.4.

The reaction equation of the Example IV-2 was shown as follow:

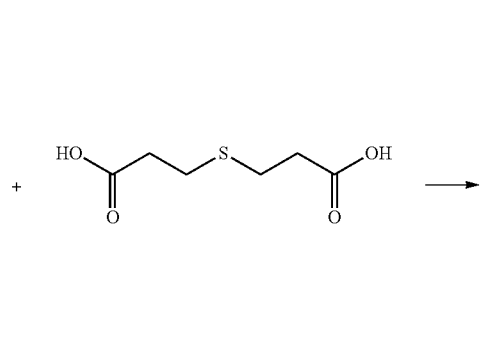

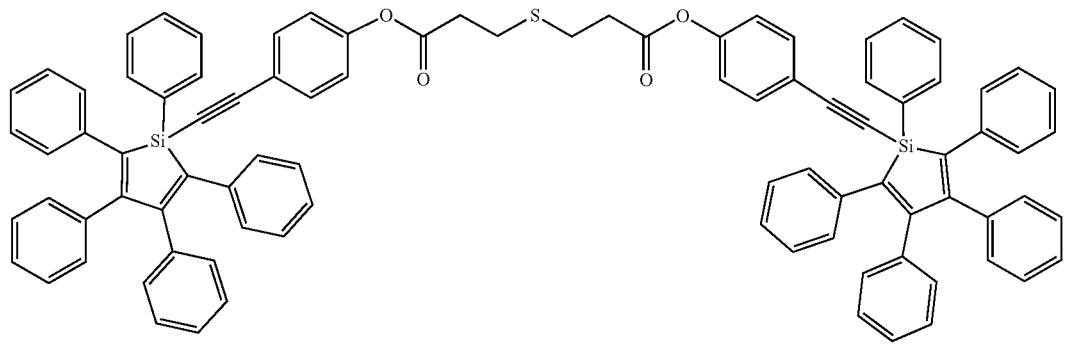

Example IV-3

To a 100 mL Schlenk reaction flask, 425 mg (1 mmol) of 1-methyl-1-alkynyl-2,3,4,5-tetraphenylsilole, 264 mg (1.2 mmol) of p-iodophenol, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (1/1, V/V) as eluent. 400 mg of yellow solid product was obtained in a yield of 78%. The product had a NMR result as follow: $^1$H NMR (400 MHz, CDCl$_3$), δ(TMS, ppm): 7.15-6.85 (m, 24H), 0.22 (s, 3H); MS (MALDI-TOF): m/z calcd: 516.2 [M]$^+$, found: 516.2.

The reaction equation of the Example IV-3 was shown as follow:

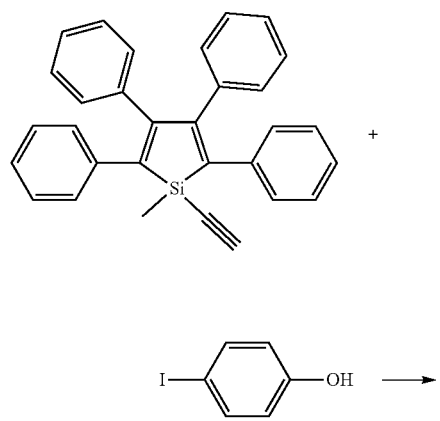

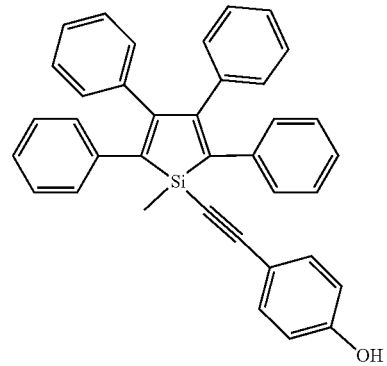

Example IV-4

To a 100 mL Schlenk reaction flask, 949 mg (2 mmol) of 1-(4-hydroxyphenylalkynyl)-1,2,3,4,5-pentaphenylsilole, 178 mg (1 mmol) of thiodipropionic acid, 630 mg (2.4 mmol) of triphenylphosphine and 30 mL of tetrahydrofuran were added. 418 mg (2.4 mmol) of diethyl azodicarboxylate was further added by slow dropping at 0° C. The reaction was carried out at room temperature for 18 hours. At the end of the reaction, the reaction mixture was filtered and the filtrate was dried. The product was separated and purified by column chromatography with a mixture of dichloromethane/petroleum ether (1/2, V/V) as eluent. 870 mg of yellow solid product was obtained in a yield of 74%. The product had a NMR result as follow: $^1$H NMR (400 MHz, CDCl$_3$), δ(TMS, ppm): 7.13-6.85 (m, 48H), 2.92 (m, 4H), 2.78 (m, 4H), 0.22 (s, 6H); MS (MALDI-TOF): m/z calcd: 1174.4 [M]$^+$, found: 1174.4.

The reaction equation of the Example IV-4 was shown as follow:

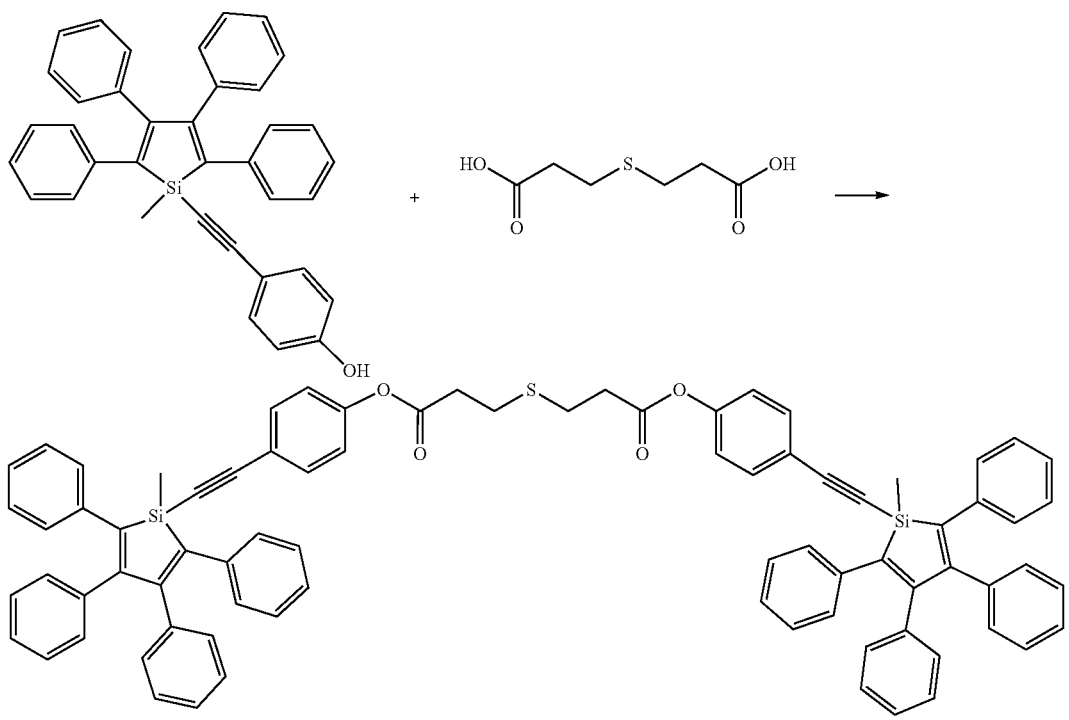

Example IV-5

145 g PAO10 base oil and 44.39 g octadecylamine were mixed in a reactor and heated to 60° C. 2.5 g bis(4-(1,2,3,4,5-pentaphenylsilolealkynyl))phenyl thiodipropionate was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Example IV-6

145 g PAO10 base oil and 44.39 g octadecylamine were mixed in a reactor and heated to 60° C. 2.5 g bis(4-(1-methyl-2,3,4,5-tetraphenylsilolealkynyl))phenyl thiodipropionate was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Example IV-7

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C., further adding 145 g PAO10 base oil, then cooled to about 100° C., and adding 2.5 g bis(4-(1,2,3,4,5-pentaphenylsilolealkynyl))phenyl thiodipropionate. The mixture was ground to form a grease.

Comparative Example IV-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Tests were carried out to measure the performances of the greases obtained in the examples IV-5 to IV-7 and the comparative example IV-1 respectively. The tests covered the dropping point of the greases in a wide temperature range as measured according to GB/T3498, cone penetration of the grease and a petroleum grease as measured according to GB/T269, oxidation induction period of the grease as measured according to SH/T0719, oxidation stability of the grease as measured according to SH/T0325, and steel mesh separation of the grease as measured according to SH/T0324. The results were shown in tables IV-1.

TABLE IV-1

| the grease | test results | | | |
| --- | --- | --- | --- | --- |
|  | Example IV-5 | Example IV-6 | Example IV-7 | Comparative example IV-1 |
| droping point/° C. | 285 | 286 | 286 | 282 |
| appearance | brown | brown | brown | brown |
| cone penetration/ (0.1 mm) | 261 | 261 | 263 | 260 |

TABLE IV-1-continued

| the grease | test results | | | |
|---|---|---|---|---|
| | Example IV-5 | Example IV-6 | Example IV-7 | Comparative example IV-1 |
| oxidation induction period(200° C.)/min | 100 | 100 | 80 | 18 |
| oxidation stability, pressure drop (99° C., 100 h)/MPa | 0.010 | 0.011 | 0.012 | 0.080 |
| steel mesh separation(100° C., 24 h)/% | 3.8 | 3.9 | 4.0 | 4.1 |
| illumination under UV light radiation | yellowish green fluorescence | yellowish green fluorescence | yellowish green fluorescence | No fluorescence |

The Fifth Embodiment

In the fifth embodiment in accordance with the present application, the silole derivative of formula (I) had a structure of formula (I-V):

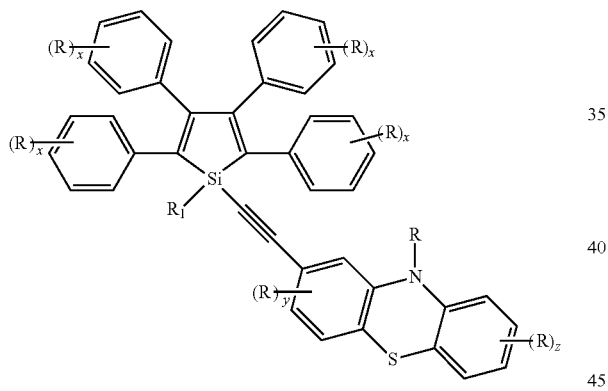
(I-V)

in the formula (I-V), each R was independently selected from the group consisting of hydrogen, and a linear or branched C1-6 alkyl; x was an integer between 0-5; y was an integer between 0-3; z was an integer between 0-4; $R_1$ was selected from the group consisting of hydrogen, a linear or branched C1-6 alkyl and a C6-10 aryl.

In the fifth embodiment in accordance with the present application, preferably, in the formula (I-V), each R was independently selected from the group consisting of hydrogen, and a linear or branched C1-4 alkyl; x was an integer between 0-3; y was 0, 1 or 2; z was 0, 1 or 2; $R_1$ was selected from the group consisting of hydrogen, a linear or branched C1-4 alkyl and phenyl.

The first method in accordance with the present application was for preparing the silole derivative of formula (I-V), comprising the steps of: reacting a silole compound of formula (II-V) with a phenothiazine compound of formula (III-V),

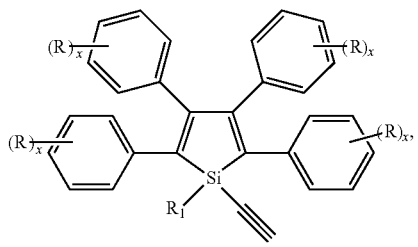
(II-V)

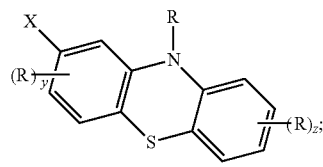
(III-V)

in the formula (II-V) and (III-V), each R was independently selected from the group consisting of hydrogen, and a linear or branched C1-6 alkyl; x was an integer between 0-5; y was an integer between 0-3; z was an integer between 0-4; $R_1$ was selected from the group consisting of hydrogen, a linear or branched C1-6 alkyl and a C6-10 aryl; the groups X was selected from the group consisting of F, Cl, Br, I, and OH.

In the fifth embodiment in accordance with the present application, preferably, in the formula (IV), each R was independently selected from the group consisting of hydrogen, and a linear or branched C1-4 alkyl; x was an integer between 0-3; y was 0, 1 or 2; z was 0, 1 or 2; $R_1$ was selected from the group consisting of hydrogen, a linear or branched C1-4 alkyl and phenyl; the groups X was selected from the group consisting of Cl, Br, I, and OH.

The suitable silole compound of formula (II-V) included the following compounds:

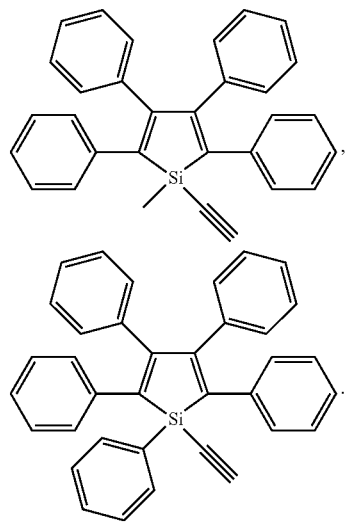

The suitable phenothiazine compound of formula (III-V) included the following compounds:

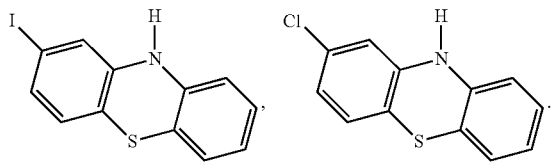 [SMILES: Ic1ccc2c(c1)Nc1ccccc1S2 ; Clc1ccc2c(c1)Nc1ccccc1S2]

In the fifth embodiment in accordance with the present application, preferably, a catalyst was added into the above reaction. The type and amount of the catalyst were the same as mentioned in the first embodiment.

In the fifth embodiment in accordance with the present application, preferably, the molar ratio between the silole compound of formula (II-V) and the phenothiazine compound of formula (III-V) in the reaction was preferably 1:0.5-5, most preferably 1:0.8-1.2. The reaction temperature was 0-50° C., preferably 15-35° C. The reaction time was 6-96 h, preferably 12-72 h.

In the fifth embodiment in accordance with the present application, preferably, a solvent was added into the above reaction. The solvent was preferably C1-C10 organic amine or furan; for example, methylamine, dimethylamine, trimethylamine, ethylamine, diethylamine, triethylamine, propylamine, dipropylamine, tripropylamine or tetrahydrofuran; most preferably, a mixture of C1-C10 organic amine and furan, wherein the ratio by volume between the two was 1:0.1-10. The solvent meight be removed by the method known in the art at the end of the reaction. There was not any special limitation on the method for removing the solvent. The removal method may include distillation, evaporation and column chromatography. Preferably, column chromatography was used to separate and purify the silole derivatives. A mixture of dichloromethane and petroleum ether meight be used as eluent, wherein the volume ratio of dichloromethane to petroleum ether was preferably 1:0.5-5.

The sources of the materials used in the examples were listed as follows:

1-alkynyl-1,2,3,4,5-pentaphenylsilole, 1-methyl-1-alkynyl-2,3,4,5-tetraphenylsilole, 2-iodophenothiazine, cuprous iodide, triphenylphosphine, palladium tetra(triphenylphosphine), octadecylamine, MDI, tetrahydrofuran, triethylamine, dichloromethane, petroleum ether and the like were agents in analytically pure obtained from J&K scientific Ltd., Beijing innoChem Science & Technology Co., Ltd. and Sigma-Aldrich; PAO10 base oil was obtained from Exxon Mobil Corporation.

Example V-1

To a 100 mL Schlenk reaction flask, 487 mg (1 mmol) of 1-alkynyl-1,2,3,4,5-pentaphenylsilole, 390 mg (1.2 mmol) of 2-iodophenothiazine, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (1/2, V/V) as eluent. 490 mg of yellow solid product was obtained in a yield of 72%.

The product had a NMR result as follow: $^1$H NMR (400 MHz, CDCl$_3$), δ(TMS, ppm): 7.74 (m, 2H), 7.36 (m, 3H), 7.20-6.82 (m, 27H); MS (MALDI-TOF): m/z calcd: 683.2 [M]$^+$, found: 683.2.

The reaction equation of the Example V-1 was shown as follow:

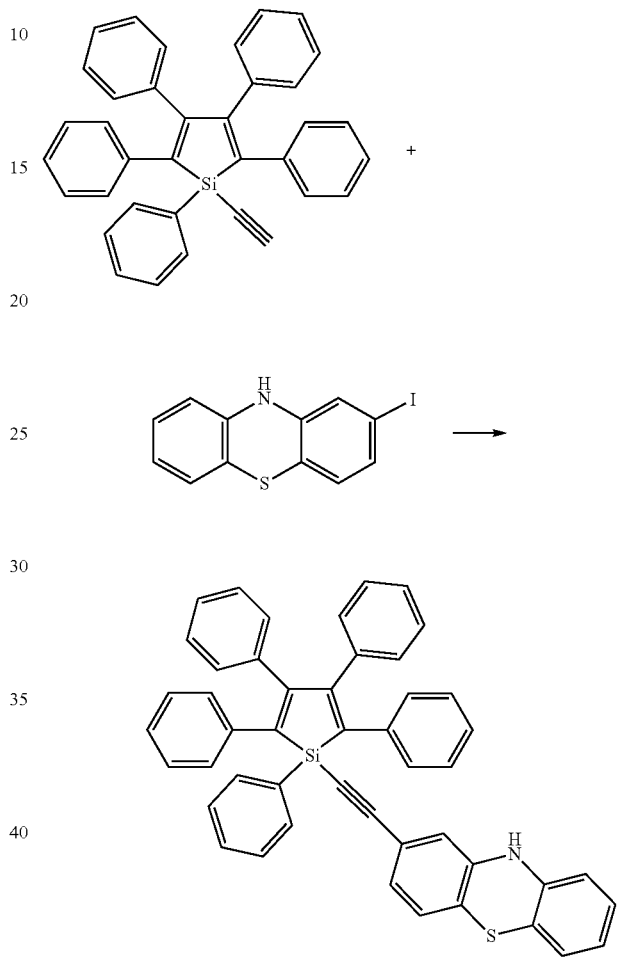

Example V-2

To a 100 mL Schlenk reaction flask, 425 mg (1 mmol) of 1-methyl-1-alkynyl-2,3,4,5-tetraphenylsilole, 390 mg (1.2 mmol) of 2-iodophenothiazine, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (1/2, V/V) as eluent. 460 mg of yellow solid product was obtained in a yield of 74%. The product had a NMR result as follow: $^1$H NMR (400 MHz, CDCl$_3$), δ(TMS, ppm): 7.18-6.84 (m, 27H), 0.24 (s, 3H); MS (MALDI-TOF): m/z calcd: 621.2 [M]$^+$, found: 621.2.

The reaction equation of the Example V-2 was shown as follow:

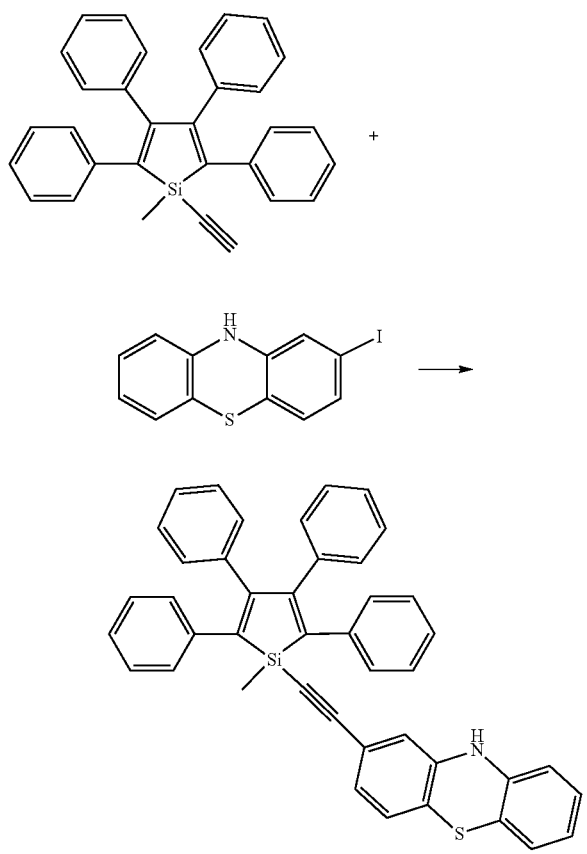

Example V-3

145 g PAO10 base oil and 44.39 g octadecylamine were mixed in a reactor and heated to 60° C. 2.5 g 1-(2-alkynylphenothiazine)-1,2,3,4,5-pentaphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Example V-4

145 g PAO10 base oil and 44.39 g octadecylamine were mixed in a reactor and heated to 60° C. 2.5 g 1-methyl-1-(2-alkynylphenothiazine)-2,3,4,5-tetraphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Example V-5

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil, then cooled to about 100° C., and adding 2.5 g 1-(2-alkynylphenothiazine)-1,2,3,4,5-pentaphenylsilole. The mixture was ground to form a grease.

Comparative Example V-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Tests were carried out to measure the performances of the greases obtained in the examples V-3 to V-5 and the comparative example V-1 respectively. The tests covered the dropping point of the greases in a wide temperature range as measured according to GB/T3498, cone penetration of the grease and a petroleum grease as measured according to GB/T269, oxidation induction period of the grease as measured according to SH/T0719, oxidation stability of the grease as measured according to SH/T0325, and steel mesh separation of the grease as measured according to SH/T0324. The results were shown in tables V-1.

TABLE V-1

| | test results | | | |
|---|---|---|---|---|
| the grease | Example V-3 | Example V-4 | Example V-5 | Comparative example V-1 |
| droping point/° C. | 283 | 285 | 283 | 282 |
| appearance | brown | brown | brown | brown |
| cone penetration/ (0.1 mm) | 264 | 263 | 265 | 260 |
| oxidation induction period(200° C.)/min | 88 | 92 | 76 | 18 |
| oxidation stability, pressure drop (99° C., 100 h)/MPa | 0.010 | 0.010 | 0.012 | 0.080 |
| steel mesh separation(100° C., 24 h)/% | 3.9 | 3.9 | 4.2 | 4.1 |
| illumination under UV light radiation | yellow fluorescence | yellow fluorescence | yellow fluorescence | No fluorescence |

The Sixth Embodiment

In the sixth embodiment in accordance with the present application, the silole derivative of formula (I) had a structure of formula (I-VI):

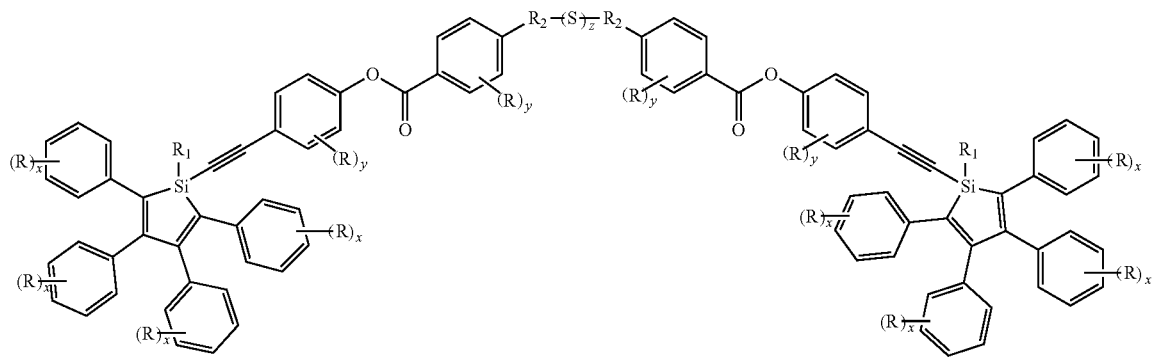
(I-VI)

in the formula (I-VI), each R was independently selected from the group consisting of hydrogen, and a linear or branched C1-6 alkyl; x was an integer between 0-5; y was an integer between 0-3; z was an integer between 1-4; $R_1$ was selected from the group consisting of hydrogen, a linear or branched C1-6 alkyl and a C6-10 aryl; $R_2$ was selected from the group consisting of a single bond, and a linear or branched C1-6 alkylene.

In the sixth embodiment in accordance with the present application, preferably, in the formula (I-VI), each R was independently selected from the group consisting of hydrogen, and a linear or branched C1-4 alkyl; x was an integer between 0-3; y was 0, 1 or 2; z was 1, 2 or 3; $R_1$ was selected from the group consisting of hydrogen, a linear or branched C1-4 alkyl and phenyl; $R_2$ was selected from the group consisting of a linear or branched C1-4 alkylene.

The first method in accordance with the present application was for preparing the silole derivative of formula (I-VI), comprising the steps of: reacting a silole compound of formula (II-VI) with a phenol compound of formula (III-VI) and a compound of formula (IV-VI),

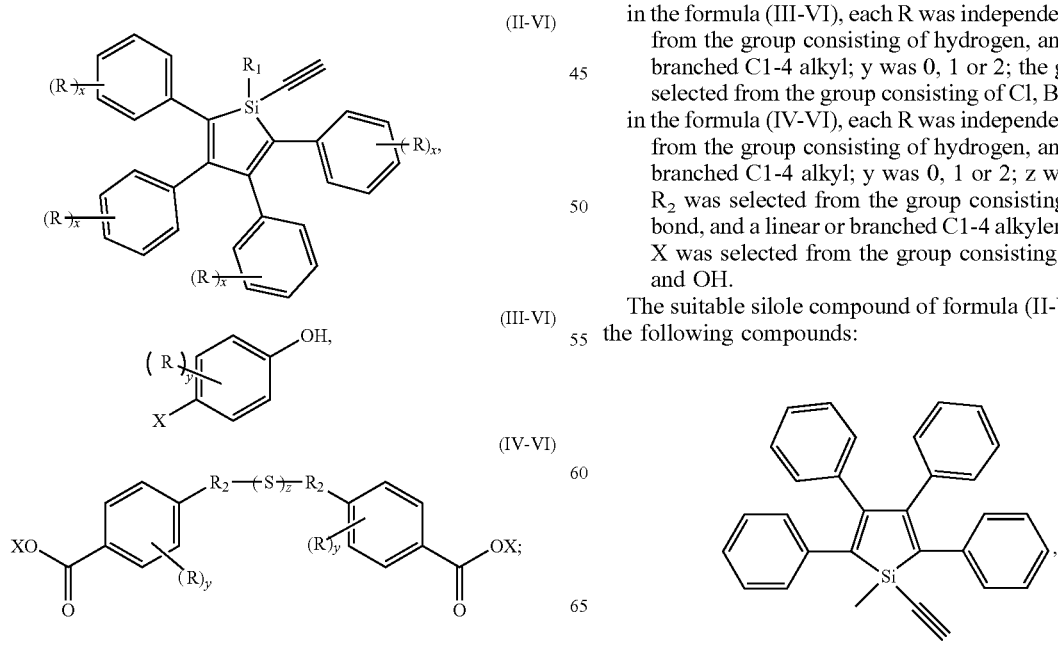

(II-VI)

(III-VI)

(IV-VI)

in the formula (II-VI), each R was independently selected from the group consisting of hydrogen, and a linear or branched C1-6 alkyl; x was an integer between 0-5; $R_1$ was selected from the group consisting of hydrogen, a linear or branched C1-6 alkyl and a C6-10 aryl;

in the formula (III-VI), each R was independently selected from the group consisting of hydrogen, and a linear or branched C1-6 alkyl; y was an integer between 0-3; the group X was selected from the group consisting of F, Cl, Br, I, and OH;

in the formula (IV-VI), each R was independently selected from the group consisting of hydrogen, and a linear or branched C1-6 alkyl; y was an integer between 0-3; z was an integer between 1-4; $R_2$ was selected from the group consisting of a single bond, and a linear or branched C1-6 alkylene; the group X was selected from the group consisting of F, Cl, Br, I, and OH.

In the sixth embodiment in accordance with the present application, preferably, in the formula (II-VI), each R was independently selected from the group consisting of hydrogen, and a linear or branched C1-4 alkyl; x was an integer between 0-3; $R_1$ was selected from the group consisting of hydrogen, a linear or branched C1-4 alkyl and phenyl;

in the formula (III-VI), each R was independently selected from the group consisting of hydrogen, and a linear or branched C1-4 alkyl; y was 0, 1 or 2; the group X was selected from the group consisting of Cl, Br, I, and OH;

in the formula (IV-VI), each R was independently selected from the group consisting of hydrogen, and a linear or branched C1-4 alkyl; y was 0, 1 or 2; z was 1, 2 or 3; $R_2$ was selected from the group consisting of a single bond, and a linear or branched C1-4 alkylene; the group X was selected from the group consisting of Cl, Br, I, and OH.

The suitable silole compound of formula (II-VI) included the following compounds:

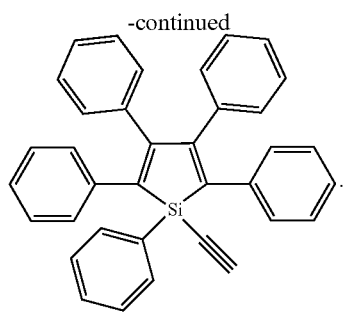

The suitable phenol compound of formula (III-VI) included the following compounds:

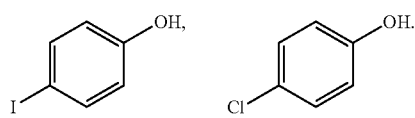 [SMILES: Oc1ccc(I)cc1 ; Oc1ccc(Cl)cc1]

In the sixth embodiment in accordance with the present application, preferably, a catalyst was added into the above reaction. The type and amount of the catalyst were the same as mentioned in the first embodiment.

In the sixth embodiment in accordance with the present application, preferably, the molar ratio of the silole compound of formula (II-VI), the phenol compound of formula (III-VI) and the compound of formula (IV-VI) in the reaction was preferably 1:0.5-5:0.2-5, most preferably 1:0.8-3:0.3-3.

In the sixth embodiment in accordance with the present application, preferably, the reaction temperature was 0-50° C., preferably 15-35° C. The reaction time was 6-96 h, preferably 12-72 h.

In the sixth embodiment in accordance with the present application, preferably, a solvent was added into the above reaction. The solvent was preferably C1-C10 organic amine or furan; for example, methylamine, dimethylamine, trimethylamine, ethylamine, diethylamine, triethylamine, propylamine, dipropylamine, tripropylamine or tetrahydrofuran; most preferably, a mixture of C1-C10 organic amine and furan, wherein the ratio by volume between the two was 1:0.1-10. The solvent meight be removed by the method known in the art at the end of the reaction. There was not any special limitation on the method for removing the solvent. The removal method may include distillation, evaporation and column chromatography. Preferably, column chromatography was used to separate and purify the silole derivatives. A mixture of dichloromethane and petroleum ether meight be used as eluent, wherein the volume ratio of dichloromethane to petroleum ether was preferably 1:0.5-5.

In the sixth embodiment in accordance with the present application, preferably, the silole compound of formula (II-VI) meight be reacted with the phenol compound of formula (III-VI), and then the obtained product meight be reacted with the compound of formula (IV-VI).

In the sixth embodiment in accordance with the present application, preferably, in the reaction between the silole compound of formula (II-VI) and the phenol compound of formula (III-VI), the molar ratio between the silole compound of formula (II-VI) and the phenol compound of formula (III-VI) was preferably 1:0.5-5, most preferably 1:0.8-3. The reaction temperature was 0-50° C., preferably 15-35° C. In general, the longer the reaction time was, the higher the yield was. The reaction time meight be 6-96 h, preferably 12-72 h.

In the sixth embodiment in accordance with the present application, preferably, a catalyst was added in the reaction between the silole compound of formula (II-VI) and the phenol compound of formula (III-VI). The type and amount of the catalyst were the same as mentioned in the first embodiment. Preferably, in the reaction between the product of the reaction of the silole compound of formula (II-VI) with the phenol compound of formula (III-VI) and the compound of formula (IV-VI), the molar ratio between the silole compound of formula (II-VI) and the compound of formula (IV-VI) was preferably 1:0.2-5, most preferably 1:0.3-3. The reaction temperature was 0-50° C., preferably 15-35° C. In general, the longer the reaction time was, the higher the yield was. The reaction time meight be 6-96 h, preferably 12-72 h.

In the sixth embodiment in accordance with the present application, preferably, a catalyst was added in the reaction between the product of the reaction of the silole compound of formula (II-VI) with the phenol compound of formula (III-VI) and the compound of formula (IV-VI). The catalyst was preferably hydrocarbyl phosphine compounds and/or azo compounds, more preferably a mixture of hydrocarbyl phosphine compounds and azo compounds, wherein the molar ratio of the two was 1:0.1-10, more preferably 1:0.2-5. The hydrocarbyl phosphine compounds preferably had a structure of

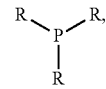

wherein each R was independently selected from the group consisting of a C6-C10 aryl and a linear or branched C1-C6 alkyl, and wherein at least one R was a C6-C10 aryl. The C6-C10 aryl meight be selected from the groups consisting of phenyl and naphthyl; the linear or branched C1-C6 alkyl meight be selected from the group consisting of methyl, ethyl, propyl, isopropyl, butyl, isobutyl, pentyl, isopentyl, hexyl and isohexyl. The hydrocarbyl phosphine compound meight be selected from the group consisting of triphenylphosphine and diphenyl butyl phosphine. The azo compounds preferably had a structure of

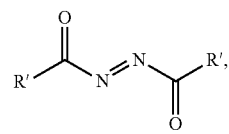

wherein each R' was the same or different from each other, and each R' was independently selected from the group consisting of hydrogen, a linear or branched C1-6 alkyl, a C3-10 cycloalkyl, a C6-10 aryl and a C1-6 alkoxyl. The azo compounds preferably meight be one or more selected from the group consisting of dimethyl azodicarboxylate, diethyl azodicarboxylate, dipropyl azodicarboxylate and dibutyl azodicarboxylate.

In the sixth embodiment in accordance with the present application, in the reaction between the product of the reaction of the silole compound of formula (II-VI) with the phenol compound of formula (III-VI) and the compound of formula (IV-VI), the catalyst was added in an amount of 0.1%-100% by weight of the total weight of the silole compound of formula (II-VI).

The sources of the materials used in the examples were listed as follows:

1-alkynyl-1,2,3,4,5-pentaphenylsilole, 1-methyl-1-alkynyl-2,3,4,5-tetraphenylsilole, p-iodophenol, cuprous iodide, triphenylphosphine, palladium tetra(triphenylphosphine), bis(4-formate benzyl) disulfide, diethyl azodicarboxylate, octadecylamine, MDI, tetrahydrofuran, triethylamine, dichloromethane, petroleum ether and the like were agents in analytically pure obtained from J&K scientific Ltd., Beijing innoChem Science & Technology Co., Ltd. and Sigma-Aldrich; PAO10 base oil was obtained from Exxon Mobil Corporation.

Example VI-1

To a 100 mL Schlenk reaction flask, 487 mg (1 mmol) of 1-alkynyl-1,2,3,4,5-pentaphenylsilole, 264 mg (1.2 mmol) of p-iodophenol, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (1/1, V/V) as eluent. 430 mg of yellow solid product was obtained in a yield of 74%. The product had a NMR result as follow: $^1$H NMR (400 MHz, CDCl$_3$), δ(TMS, ppm): 7.74 (m, 2H), 7.36 (m, 3H), 7.15-6.85 (m, 24H); MS (MALDI-TOF): m/z calcd: 578.2 [M]$^+$, found: 578.2.

The reaction equation of the Example VI-1 was shown as follow:

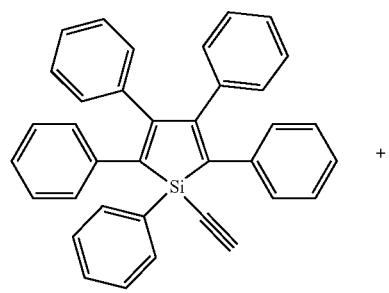

+

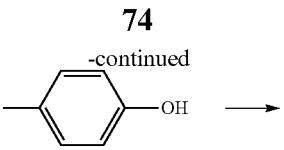

→

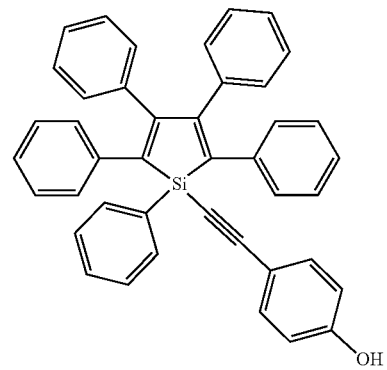

Example VI-2

To a 100 mL Schlenk reaction flask, 1158 mg (2 mmol) of 1-(4-hydroxyphenylalkynyl)-1,2,3,4,5-pentaphenylsilole, 334 mg (1 mmol) of bis(4-formate benzyl) disulfide, 630 mg (2.4 mmol) of triphenylphosphine and 30 mL of tetrahydrofuran were added. 418 mg (2.4 mmol) of diethyl azodicarboxylate was further added by slow dropping at 0° C. The reaction was carried out at room temperature for 18 hours. At the end of the reaction, the reaction mixture was filtered and the filtrate was dried. The product was separated and purified by column chromatography with a mixture of dichloromethane/petroleum ether (1/2, V/V) as eluent. 1080 mg of yellow solid product was obtained in a yield of 74%. The product had a NMR result as follow: $^1$H NMR (400 MHz, CDCl$_3$), δ(TMS, ppm): 7.92 (m, 4H), 7.72 (m, 4H), 7.43 (m, 4H), 7.35 (m, 6H), 7.15-6.87 (m, 48H), 3.38 (m, 4H); MS (MALDI-TOF): m/z calcd: 1455.4 [M]$^+$, found: 1455.4.

The reaction equation of the Example VI-2 was shown as follow:

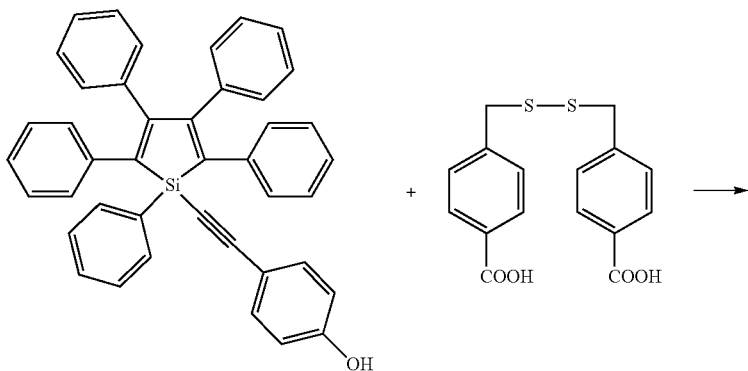

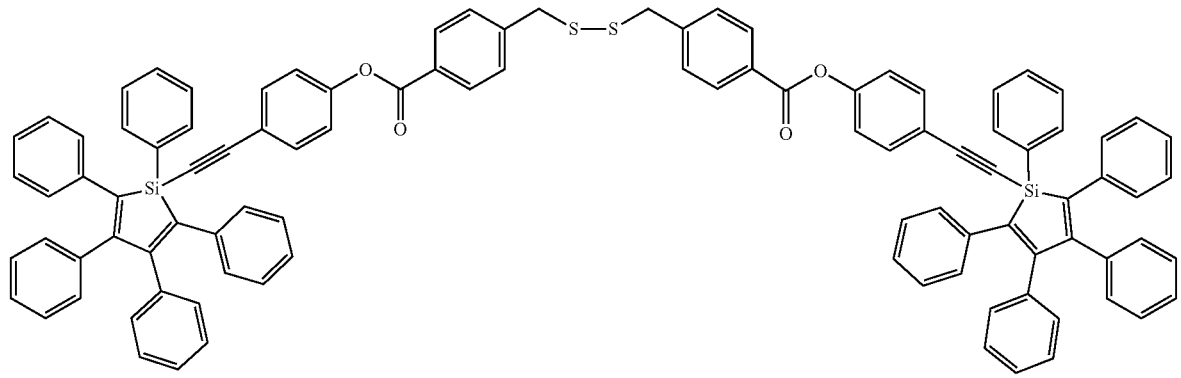

Example VI-3

To a 100 mL Schlenk reaction flask, 425 mg (1 mmol) of 1-methyl-1-alkynyl-2,3,4,5-tetraphenylsilole, 264 mg (1.2 mmol) of p-iodophenol, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/petroleum ether (1/1, V/V) as eluent. 400 mg of yellow solid product was obtained in a yield of 78%. The product had a NMR result as follow: $^1$H NMR (400 MHz, CDCl$_3$), δ(TMS, ppm): 7.15-6.85 (m, 24H), 0.22 (s, 3H); MS (MALDI-TOF): m/z calcd: 516.2 [M]$^+$, found: 516.2.

The reaction equation of the Example VI-3 was shown as follow:

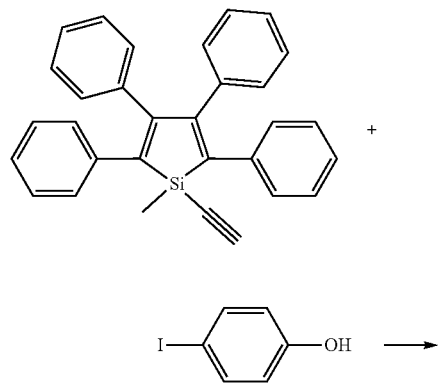

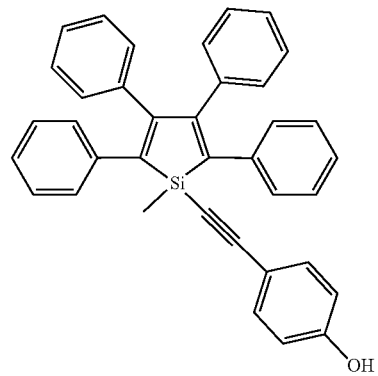

Example VI-4

To a 100 mL Schlenk reaction flask, 949 mg (2 mmol) of 1-(4-hydroxyphenylalkynyl)-1,2,3,4,5-pentaphenylsilole, 334 mg (1 mmol) of thiodipropionic acid, 630 mg (2.4 mmol) of triphenylphosphine and 30 mL of tetrahydrofuran were added. 418 mg (2.4 mmol) of diethyl azodicarboxylate was further added by slow dropping at 0° C. The reaction was carried out at room temperature for 18 hours. At the end of the reaction, the reaction mixture was filtered and the filtrate was dried. The product was separated and purified by column chromatography with a mixture of dichloromethane/petroleum ether (1/2, V/V) as eluent. 870 mg of yellow solid product was obtained in a yield of 74%. The product had a NMR result as follow: $^1$H NMR (400 MHz, CDCl$_3$), δ(TMS, ppm): 7.92 (m, 4H), 7.43 (m, 4H), 7.15-6.87 (m, 48H), 3.42 (m, 4H), 0.22 (s, 6H); MS (MALDI-TOF): m/z calcd: 1330.4 [M]$^+$, found: 1330.4.

The reaction equation of the Example VI-4 was shown as follow:

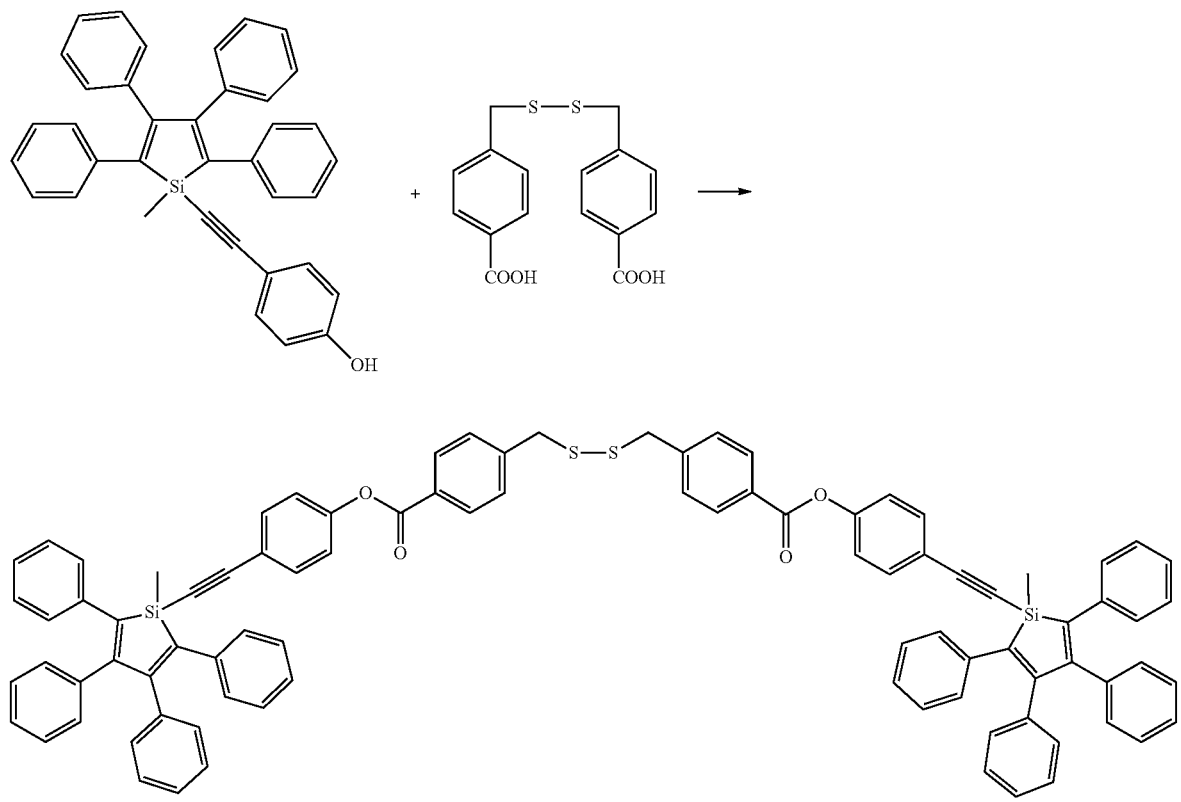

Example VI-5

145 g PAO10 base oil and 44.39 g octadecylamine were mixed in a reactor and heated to 60° C. 2.5 g bis(4-(1,2,3,4,5-pentaphenylsilolealkynyl))phenyl dithiodibenzyl benzate was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Example VI-6

145 g PAO10 base oil and 44.39 g octadecylamine were mixed in a reactor and heated to 60° C. 2.5 g bis(4-(1-methyl-2,3,4,5-tetraphenylsilolealkynyl))phenyl dithiodibenzyl benzate was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Example VI-7

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C., further adding 145 g PAO10 base oil, then cooled to about 100° C., and adding 2.5 g bis(4-(1,2,3,4,5-pentaphenylsilolealkynyl))phenyl dithiodibenzyl benzate. The mixture was ground to form a grease.

Comparative Example VI-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Tests were carried out to measure the performances of the greases obtained in the examples VI-5 to VI-7 and the comparative example VI-1 respectively. The tests covered the dropping point of the greases in a wide temperature range as measured according to GB/T3498, cone penetration of the grease and a petroleum grease as measured according to GB/T269, oxidation induction period of the grease as measured according to SH/T0719, extreme pressure performance of the grease as measured according to SH/T0202, anti-wear performance of the grease as measured according to SH/T0204 and steel mesh separation of the grease as measured according to SH/T0324. The results were shown in tables VI-1.

TABLE VI-1

| the grease | test results | | | |
|---|---|---|---|---|
| | Example VI-5 | Example VI-6 | Example VI-7 | Comparative example VI-1 |
| droping point/° C. | 284 | 283 | 284 | 282 |
| appearance | brown | brown | brown | brown |
| cone penetration/ (0.1 mm) | 262 | 263 | 263 | 260 |
| tests on a four ball tester | | | | |
| $P_B$/N | 785 | 785 | 618 | 490 |
| $P_D$/N | 2452 | 2452 | 2452 | 1961 |
| diameter of the wear spot/mm | 0.55 | 0.53 | 0.59 | 0.68 |
| steel mesh separation(100° C., 24 h)/% | 4.0 | 3.9 | 4.0 | 4.1 |
| illumination under UV light radiation | yellow fluorescence | yellow fluorescence | yellow fluorescence | No fluorescence |

The Seventh Embodiment

In the seventh embodiment in accordance with the present application, the silole derivative of formula (I) had a structure of formula (I-VII):

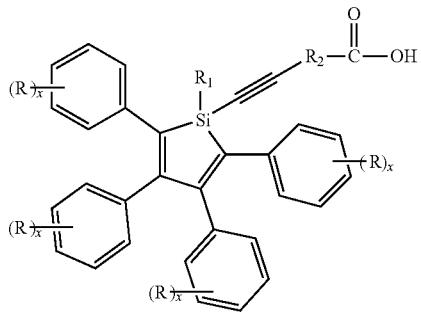

(I-VII)

in the formula (I-VII), each R was independently selected from the group consisting of hydrogen, and a linear or branched C1-6 alkyl; x was an integer between 0-5; $R_1$ was selected from the group consisting of hydrogen, a linear or branched C1-6 alkyl and a C6-10 aryl; $R_2$ was selected from the group consisting of a single bond, and a linear or branched C1-20 alkylene.

In the seventh embodiment in accordance with the present application, preferably, in the formula (I-VII), each R was independently selected from the group consisting of hydrogen, and a linear or branched C1-4 alkyl; x was an integer between 0-3; $R_1$ was selected from the group consisting of hydrogen, a linear or branched C1-4 alkyl and phenyl; $R_2$ was selected from the group consisting of a single bond, and a linear or branched C6-18 alkylene.

In the seventh embodiment in accordance with the present application, preferably, the silole compound of formula (II-VII) included one or more of the following compounds:

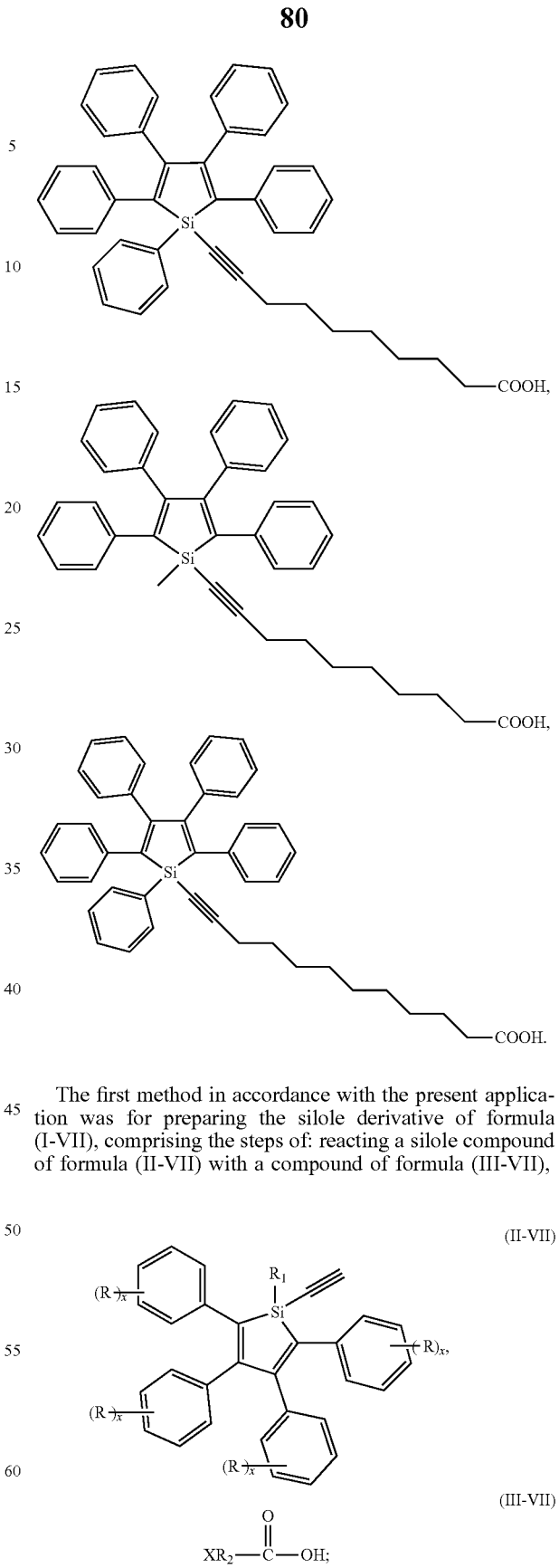

The first method in accordance with the present application was for preparing the silole derivative of formula (I-VII), comprising the steps of: reacting a silole compound of formula (II-VII) with a compound of formula (III-VII), in the formula (II-VII), each R was independently selected from the group consisting of hydrogen, and a linear or branched C1-6 alkyl; x was an integer between 0-5; $R_1$ was selected from the group consisting of hydrogen, a linear or branched C1-6 alkyl and a C6-10 aryl;

in the formula (III-VII), $R_2$ was selected from the group consisting of a single bond, and a linear or branched C1-20 alkylene; the group X was selected from the group consisting of F, Cl, Br, and I.

In the seventh embodiment in accordance with the present application, preferably, in the formula (II-VII), each R was independently selected from the group consisting of hydrogen, and a linear or branched C1-4 alkyl; x was an integer between 0-3; $R_1$ was selected from the group consisting of hydrogen, a linear or branched C1-4 alkyl and phenyl;

in the formula (III-VII), $R_2$ was selected from the group consisting of a single bond, and a linear or branched C6-18 alkylene; the group X was selected from the group consisting of Cl, Br, and I.

The suitable silole compound of formula (II-VII) included one or more of the following compounds:

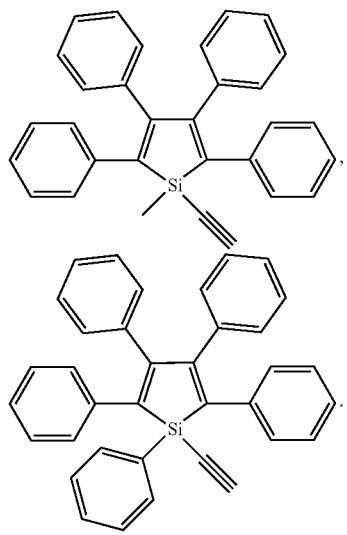

The suitable compound of formula (III-VII) included one or more of the following compounds:

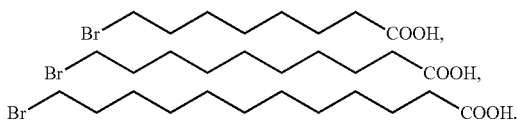

In the seventh embodiment in accordance with the present application, preferably, a catalyst was added into the above reaction. The type and amount of the catalyst were the same as mentioned in the first embodiment.

In the seventh embodiment in accordance with the present application, preferably, the molar ratio between the silole compound of formula (II-VII) and the compound of formula (III-VII) in the reaction was preferably 1:0.5-5, most preferably 1:0.8-1.2.

In the seventh embodiment in accordance with the present application, preferably, the reaction temperature was 0-50° C., preferably 15-35° C. The reaction time was 6-96 h, preferably 12-72 h.

In the seventh embodiment in accordance with the present application, preferably, a solvent was added into the above reaction. The solvent was preferably C1-C10 organic amine or furan; for example, methylamine, dimethylamine, trimethylamine, ethylamine, diethylamine, triethylamine, propylamine, dipropylamine, tripropylamine or tetrahydrofuran; most preferably, a mixture of C1-C10 organic amine and furan, wherein the ratio by volume between the two was 1:0.1-10. The solvent meight be removed by the method known in the art at the end of the reaction. There was not any special limitation on the method for removing the solvent. The removal method meight include distillation, evaporation and column chromatography. Preferably, column chromatography was used to separate and purify the silole derivatives. A mixture of alkyl halide and petroleum ether (preferably, a mixture of dichloromethane and petroleum ether) meight be used as eluent, wherein the volume ratio of alkyl halide to petroleum ether was preferably 1:0.5-5.

The sources of the materials used in the examples were listed as follows:

1-alkynyl-1,2,3,4,5-pentaphenylsilole, 1-methyl-1-alkynyl-2,3,4,5-tetraphenylsilole, 8-bromooctanoic acid, cuprous iodide, triphenylphosphine, palladium tetra(triphenylphosphine), octadecylamine, MDI, tetrahydrofuran, triethylamine, dichloromethane, petroleum ether and the like were agents in analytically pure obtained from J&K scientific Ltd., Beijing innoChem Science & Technology Co., Ltd. and Sigma-Aldrich; PAO10 base oil was obtained from Exxon Mobil Corporation.

Example VII-1

To a 100 mL Schlenk reaction flask, 487 mg (1 mmol) of 1-alkynyl-1,2,3,4,5-pentaphenylsilole, 268 mg (1.2 mmol) of 8-bromooctanoic acid, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/methanol (20/1, V/V) as eluent. 450 mg of yellow solid product was obtained in a yield of 72%. The product had a NMR result as follow: $^1$H NMR (400 MHz, CDCl$_3$), δ(TMS, ppm): 7.78 (m, 2H), 7.34 (m, 3H), 7.13-6.87 (m, 20H), 2.55 (m, 2H), 2.18 (m, 2H), 1.54 (m, 2H), 1.42 (m, 2H), 1.32-1.26 (m, 6H); MS (MALDI-TOF): m/z calcd: 628.3 [M]$^+$, found: 628.3.

The reaction equation of the Example VII-1 was shown as follow:

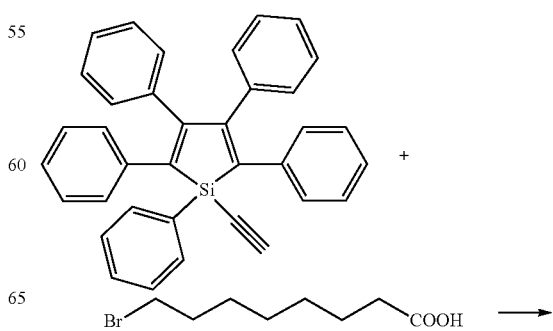

-continued

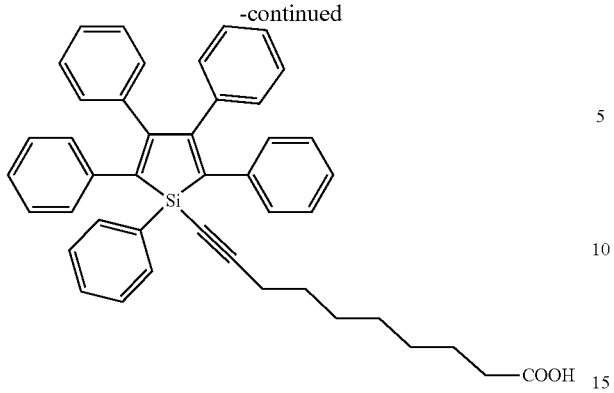

Example VII-2

To a 100 mL Schlenk reaction flask, 425 mg (1 mmol) of 1-methyl-1-alkynyl-2,3,4,5-tetraphenylsilole, 268 mg (1.2 mmol) of 8-bromooctanoic acid, 19 mg (0.1 mmol) of cuprous iodide, and 26 mg (0.1 mmol) of triphenylphosphine were added. Under the atmosphere of nitrogen, 23 mg (0.02 mmol) of palladium tetra(triphenylphosphine) and 30 mL of tetrahydrofuran/triethylamine (2/1, V/V) were further added. The reaction was carried out at room temperature for 48 hours. At the end of the reaction, the reaction mixture was filtered and the filtrate was dried. The product was separated and purified by column chromatography with a mixture of dichloromethane/methanol (20/1, V/V) as eluent. 390 mg of yellow solid product was obtained in a yield of 69%. The product had a NMR result as follow: $^1$H NMR (400 MHz, CDCl$_3$), δ(TMS, ppm): 7.14-6.85 (m, 20H), 2.56 (m, 2H), 2.22 (m, 2H), 1.55 (m, 2H), 1.38 (m, 2H), 1.33-1.26 (m, 6H), 0.22 (s, 3H); MS (MALDI-TOF): m/z calcd: 566.3 [M]$^+$, found: 566.3.

The reaction equation of the Example VII-2 was shown as follow:

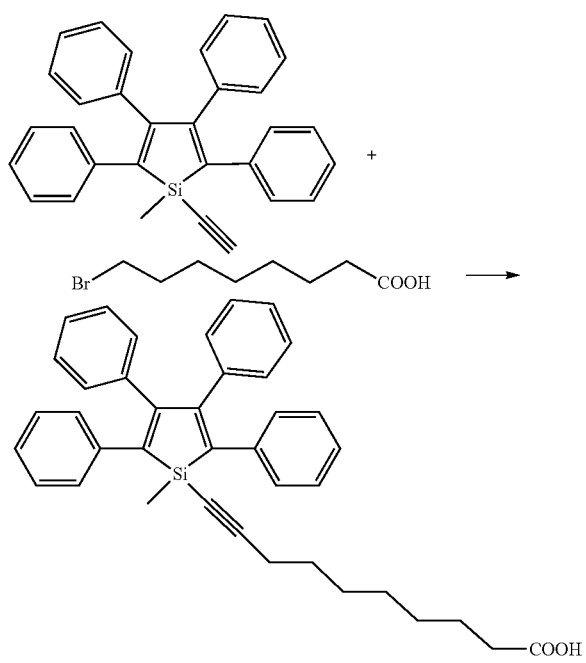

Example VII-3

145 g PAO10 base oil and 44.39 g octadecylamine were mixed in a reactor and heated to 60° C. 2.5 g 1-methyl-1-(9-hydroxynonynyl)-2,3,4,5-tetraphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., adding 10 g molybdenum dibutyldithiocarbamate, the mixture was ground to form a grease.

Example VII-4

145 g PAO10 base oil and 44.39 g octadecylamine were mixed in a reactor and heated to 60° C. 2.5 g 1-(9-hydroxynonynyl)-1,2,3,4,5-pentaphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., adding 10 g molybdenum dibutyldithiocarbamate, the mixture was ground to form a grease.

Example VII-5

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., adding 2.5 g 1-(9-hydroxynonynyl)-1,2,3,4,5-pentaphenylsilole and 10 g molybdenum dibutyldithiocarbamate, the mixture was ground to form a grease.

Comparative Example VII-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., adding 10 g molybdenum dibutyldithiocarbamate, the mixture was ground to form a grease.

Tests were carried out to measure the performances of the greases obtained in the examples VII-3 to VII-5 and the comparative example VII-1, respectively. The tests covered the dropping point of the greases in a wide temperature range as measured according to GB/T3498, cone penetration of the grease and a petroleum grease as measured according to GB/T269, copper corrosion of the grease as measured according to GB/T7326, and steel mesh separation of the grease as measured according to SH/T0324. The results were shown in table VII-1.

TABLE VII-1 test results

| the grease | Example VII-3 | Example VII-4 | Example VII-5 | Comparative example VII-1 |
|---|---|---|---|---|
| droping point/° C. | 283 | 283 | 282 | 282 |
| appearance | yellow | yellow | yellow | yellow |
| cone penetration/(0.1 mm) | 260 | 262 | 264 | 260 |
| copper corrosion (100° C., 24 h)/rank | 1b | 1b | 1c | 2b |
| mesh separation (100° C., 24 h)/% | 3.8 | 3.9 | 4.0 | 4.1 |
| illumination under UV light radiation | yellowish green fluorescence | yellowish green fluorescence | yellowish green fluorescence | No fluorescence |

The Eighth Embodiment

The eighth embodiment in accordance with the present application related to a lubricating grease composition comprising a silole derivative of formula (XI). More particular, the lubricating grease composition comprised the silole derivative of formula (XI), a thickener and a lubrication base oi, wherein the silole derivative of formula (XI) comprised 0.0005%-5%, preferably 0.001%-2% by weight of the total weight of the lubricating grease composition; the thickener comprised 5%-30%, preferably 10%-20% by weight of the total weight of the lubricating grease composition; and the lubricating base oil constituted the main part of the lubricating grease composition; and wherein the silole derivative of formula (XI) had the following structure:

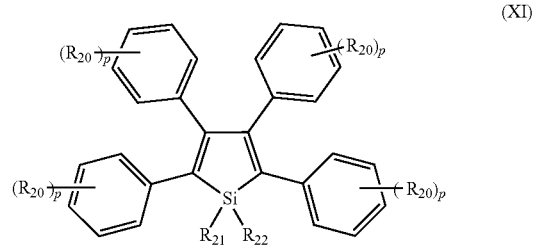
(XI)

wherein each $R_{20}$ was the same or different from each other and was independently selected from the group consisting of a linear or branched C1-6 alkyl (preferably, a linear or branched C1-4 alkyl); each p was the same or different from each other and was independently an integer between 0 and 5 (preferably, was 0, 1, 2, or 3); $R_{21}$ was selected from the group consisting of a linear or branched C1-6 alkyl and a C6-10 aryl (preferably, a linear or branched C1-4 alkyl, phenyl and naphthyl); $R_{22}$ was selected from the group consisting of a linear or branched C1-6 alkyl and a C6-10 aryl (preferably, a linear or branched C1-4 alkyl, phenyl and naphthyl).

Preferably, the silole derivative of formula (XI) included the following compounds.

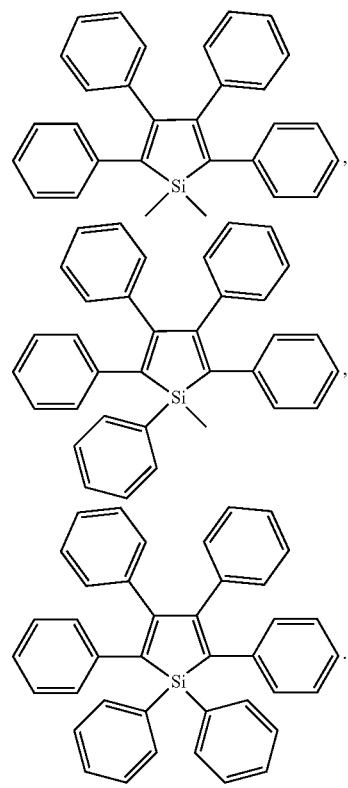

The sources of the materials used in the examples were listed as follows:

hexaphenylsilole, octadecylamine, MDI, 12-hydroxystearic acid, lithium hydroxide monohydrate, stearic acid, benzoic acid, aluminum isopropoxide trimer, tetrahydrofuran, triethylamine, dichloromethane, methanol, toluene and the like were agents in analytically pure obtained from J&K scientific Ltd., Beijing innoChem Science & Technology Co., Ltd. and Sigma-Aldrich; PAO10 base oil was obtained from Exxon Mobil Corporation.

Example VIII-1

145 g PAO10 base oil and 44.39 g octadecylamine were mixed in a reactor and heated to 60° C. 2.5 g hexaphenylsilole was dissolved in 25 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to about 100° C., the mixture was ground to form a grease.

Example VIII-2

300 g PAO10 base oil and 39.21 g 12-hydroxystearic acid were mixed in a reactor and heated to 85° C. 2.5 g hexaphenylsilole was dissolved in 25 g toluene and also added to the reactor. 6.06 g lithium hydroxide monohydrate was mixed with 40 g distilled water and heated to 95° C. After all lithium hydroxide was dissolved, the solution was also added to the reactor. The mixture was heated for dehydration, further heated to 210° C., and further adding 160 g PAO10 base oil. After cooling, the mixture was ground to form a grease.

Example VIII-3

200 g PAO10 base oil, 32.5 g stearic acid and 14 g benzoic acid were mixed in a reactor and heated to 90° C. 2.5 g hexaphenylsilole was dissolved in 25 g toluene and also added to the reactor. 100 g PAO10 base oil was mixed with 32 g aluminum isopropoxide trimer and heated. After all aluminum isopropoxide trimer was dissolved, the solution was also added to the reactor. The mixture was heated to 210° C. to react for 30 min, and further adding 150 g PAO10 base oil. After cooling, the mixture was ground to form a grease.

Example VIII-4

300 g PAO10 base oil and 39.21 g 12-hydroxystearic acid were mixed in a reactor and heated to 85° C. 6.06 g lithium hydroxide monohydrate was mixed with 40 g distilled water and heated to 95° C. After all lithium hydroxide was dissolved, the solution was also added to the reactor. The mixture was heated for dehydration, further heated to 210° C., and further adding 160 g PAO10 base oil. After cooling, adding 2.5 g hexaphenylsilole, the mixture was ground to form a grease.

Comparative Example VIII-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to 100° C., the mixture was ground to form a grease.

Comparative Example VIII-2

300 g PAO10 base oil and 39.21 g 12-hydroxystearic acid were mixed in a reactor and heated to 85° C. 6.06 g lithium hydroxide monohydrate was mixed with 40 g distilled water and heated to 95° C. After all lithium hydroxide was dissolved, the solution was also added to the reactor. The mixture was heated for dehydration, further heated to 210° C., and further adding 160 g PAO10 base oil. After cooling, the mixture was ground to form a grease.

Comparative Example VIII-3

200 g PAO10 base oil, 32.5 g stearic acid and 14 g benzoic acid were mixed in a reactor and heated to 90° C. 100 g PAO10 base oil was mixed with 32 g aluminum isopropoxide trimer and heated. After all aluminum isopropoxide trimer was dissolved, the solution was also added to the reactor. The mixture was heated to 210° C. to react for 30 min, and further adding 150 g PAGO base oil. After cooling, the mixture was ground to form a grease.

Tests were carried out to measure the performances of the greases obtained in the examples VIII-1 to VIII-4 and the comparative examples VIII-1 to VIII-3, respectively. The tests covered the dropping point of the greases in a wide temperature range as measured according to GB/T3498, cone penetration of the grease and a petroleum grease as measured according to GB/T269, anti-wear performance of the grease was measured according to SH/T0204, and steel mesh separation of the grease as measured according to SH/T0324. The results were shown in table VIII-1.

TABLE VIII-1

| | test results | | | | | | |
|---|---|---|---|---|---|---|---|
| test items | Ex. VIII-1 | Ex. VIII-2 | Ex. VIII-3 | Ex. VIII-4 | Comp. Ex. VIII-1 | Comp. Ex. VIII-2 | Comp. Ex. VIII-3 |
| droping point/° C. | 282 | 197 | 267 | 195 | 282 | 195 | 266 |
| appearance | brown | white | yellow | white | brown | white | yellow |
| cone penetration/(0.1 mm) | 258 | 268 | 262 | 269 | 260 | 270 | 268 |
| diameter of the wear spot/mm | 0.52 | 0.47 | 0.62 | 0.53 | 0.67 | 0.64 | 0.71 |
| mesh separation(100° C., 24 h)/% | 3.6 | 3.7 | 3.5 | 3.7 | 4.0 | 4.2 | 3.8 |
| illumination under UV light radiation | yellowish green fluorescence | yellowish green fluorescence | yellowish green fluorescence | yellowish green fluorescence | No fluorescence | No fluorescence | No fluorescence |

The Ninth Embodiment

The ninth embodiment in accordance with the present application related to a lubricating grease composition comprising a tetraphenyl ethylene compound. More particular, the lubricating grease composition comprised tetraphenyl ethylene or its derivatives, a thickener and a lubrication base oi, wherein tetraphenylethylene or its derivatives comprised 0.0005%-5%, preferably 0.001%-2% by weight of the total weight of the lubricating grease composition; the thickener comprised 5%-30%, preferably 10%-20% by weight of the total weight of the lubricating grease composition; and the lubricating base oil constituted the main part of the lubricating grease composition; and wherein tetraphenylethylene or its derivatives had the following structure:

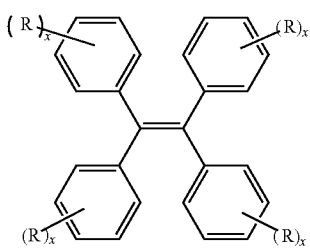

wherein each R was the same or different from each other and was independently selected from the group consisting of a linear or branched C1-6 alkyl (preferably, a linear or branched C1-4 alkyl); each x was the same or different from each other and was independently an integer between 0 and 5 (preferably, was 0, 1, 2, or 3).

Preferably, tetraphenylethylene or its derivatives included the following compounds.

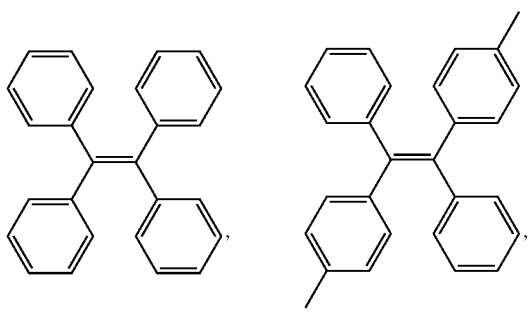

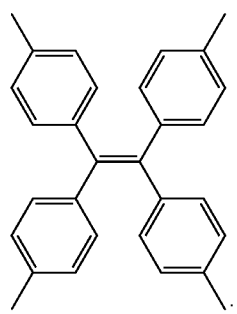

The sources of the materials used in the examples were listed as follows:
tetraphenylethylene, octadecylamine, MDI, stearic acid, benzoic acid, aluminum isopropoxide trimer, tetrahydrofuran, triethylamine, dichloromethane, methanol, toluene and the like were agents in analytically pure obtained from J&K scientific Ltd., Beijing innoChem Science & Technology Co., Ltd. and Sigma-Aldrich; PAO10 base oil was obtained from Exxon Mobil Corporation.

Example IX-1

145 g PAO10 base oil and 44.39 g octadecylamine were mixed in a reactor and heated to 60° C. 2.5 g tetraphenylethylene was dissolved in 5 g toluene and also added to the reactor. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to 100° C., the mixture was ground to form a grease.

Example IX-2

300 g PAO10 base oil and 39.21 g 12-hydroxystearic acid were mixed in a reactor and heated to 85° C. 2.5 g tetraphenylethylene was dissolved in 5 g toluene and also added to the reactor. 6.06 g lithium hydroxide monohydrate was mixed with 40 g distilled water and heated to 95° C. After all lithium hydroxide was dissolved, the solution was also added to the reactor. The mixture was heated for dehydration, further heated to 210° C., and further adding 160 g PAO10 base oil. After cooling, the mixture was ground to form a grease.

Example IX-3

200 g PAO10 base oil, 32.5 g stearic acid and 14 g benzoic acid were mixed in a reactor and heated to 90° C. 2.5 g tetraphenylethylene was dissolved in 5 g toluene and also added to the reactor. 100 g PAO10 base oil was mixed with 32 g aluminum isopropoxide trimer and heated. After all aluminum isopropoxide trimer was dissolved, the solution was also added to the reactor. The mixture was heated to 210° C. to react for 30 min, and further adding 150 g PAO10 base oil. After cooling, the mixture was ground to form a grease.

Example IX-4

300 g PAO10 base oil and 39.21 g 12-hydroxystearic acid were mixed in a reactor and heated to 85° C. 6.06 g lithium hydroxide monohydrate was mixed with 40 g distilled water and heated to 95° C. After all lithium hydroxide was dissolved, the solution was also added to the reactor. The mixture was heated for dehydration, further heated to 210° C., and further adding 160 g PAO10 base oil. After cooling, adding 2.5 g tetraphenylethylene, the mixture was ground to form a grease.

Example IX-5

300 g PAO10 base oil and 39.21 g 12-hydroxystearic acid were mixed in a reactor and heated to 85° C. 2.5 g tetraphenylethylene was added directly into the reactor. 6.06 g lithium hydroxide monohydrate was mixed with 40 g distilled water and heated to 95° C. After all lithium hydroxide was dissolved, the solution was also added to the reactor. The mixture was heated for dehydration, further heated to 210° C., and further adding 160 g PAO10 base oil. After cooling, the mixture was ground to form a grease.

Comparative Example IX-1

145 g PAO10 base oil and 44.39 g octadecylamine were mixed in a reactor and heated to 60° C. 145 g PAO10 base oil and 20.61 g MDI were mixed and heated to 60° C. After all MDI was dissolved, the solution was also added to the reactor. The mixture was heated to 80° C. to react for 30 min, further heated to 210° C. and further adding 145 g PAO10 base oil. After cooling to 100° C., the mixture was ground to form a grease.

Comparative Example IX-2

300 g PAO10 base oil and 39.21 g 12-hydroxystearic acid were mixed in a reactor and heated to 85° C. 6.06 g lithium hydroxide monohydrate was mixed with 40 g distilled water and heated to 95° C. After all lithium hydroxide was dissolved, the solution was also added to the reactor. The mixture was heated for dehydration, further heated to 210° C., and further adding 160 g PAO10 base oil. After cooling, the mixture was ground to form a grease.

Comparative Example IX-3

200 g PAO10 base oil, 32.5 g stearic acid and 14 g benzoic acid were mixed in a reactor and heated to 90° C. 100 g PAO10 base oil was mixed with 32 g aluminum isopropoxide trimer and heated. After all aluminum isopropoxide trimer was dissolved, the solution was also added to the reactor. The mixture was heated to 210° C. to react for 30 min, and further adding 150 g PAO10 base oil. After cooling, the mixture was ground to form a grease.

Tests were carried out to measure the performances of the greases obtained in the examples IX-1 to IX-5 and the comparative examples IX-1 to IX-3, respectively. The tests covered the dropping point of the greases in a wide temperature range as measured according to GB/T3498, cone penetration of the grease and a petroleum grease as measured according to GB/T269, anti-wear performance of the grease was measured according to SH/T0204, and steel mesh separation of the grease as measured according to SH/T0324. The results were shown in table IX-1.

We claim:

1. A silole derivative of formula (I):

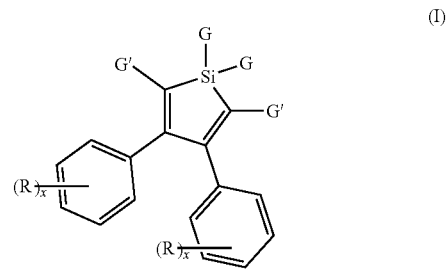

in the formula (I), each R is independently selected from the group consisting of hydrogen, and a linear or branched C1-6 alkyl; each x is independently an integer between 0 and 5;

each G is independently selected from the group consisting of hydrogen, a linear or branched C1-6 alkyl, an alkynyl of formula (I-1), an alkynyl of formula (I-2), an alkynyl of formula (I-3), an alkynyl of formula (I-4), and a group of formula (I-1');

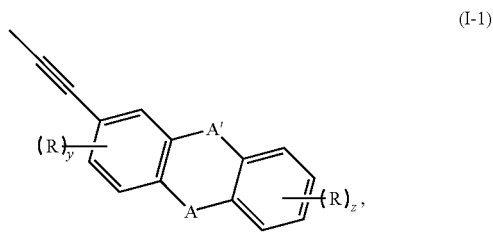

TABLE IX-1

| test items | \multicolumn{5}{c}{test results} | | | |
|---|---|---|---|---|---|---|---|---|
| | Ex. IX-1 | Ex. IX-2 | Ex. IX-3 | Ex. IX-4 | Ex. IX-5 | Comp. Ex. IX-1 | Comp. Ex. IX-2 | Comp. Ex. IX-3 |
| droping point/° C. | 282 | 196 | 266 | 282 | 281 | 282 | 195 | 266 |
| appearance | brown | white | yellow | brown | brown | brown | white | yellow |
| cone penetration/ (0.1 mm) | 262 | 272 | 264 | 264 | 261 | 260 | 270 | 268 |
| diameter of the wear spot/mm | 0.55 | 0.49 | 0.63 | 0.57 | 0.57 | 0.67 | 0.64 | 0.71 |
| mesh separation (100° C., 24 h)/% | 4.1 | 4.4 | 3.7 | 4.0 | 4.3 | 4.0 | 4.2 | 3.8 |
| illumination under UV light radiation | bluish green fluorescence | bluish green fluorescence | bluish green fluorescence | bluish green fluorescence | bluish green fluorescence | No fluorescence | No fluorescence | No fluorescence |

-continued

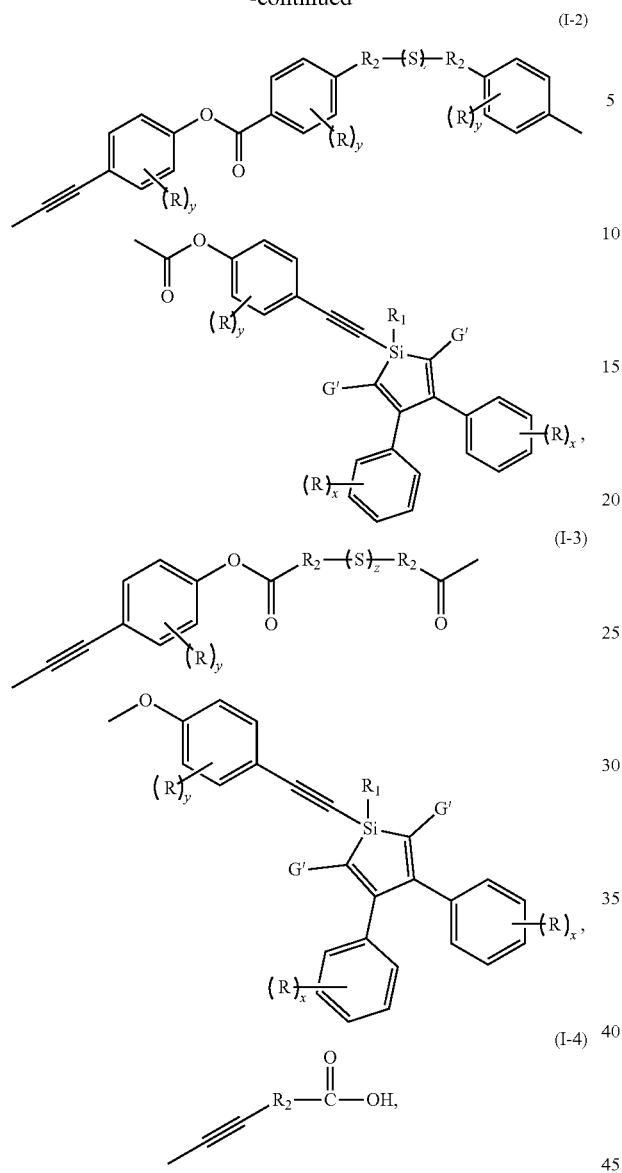

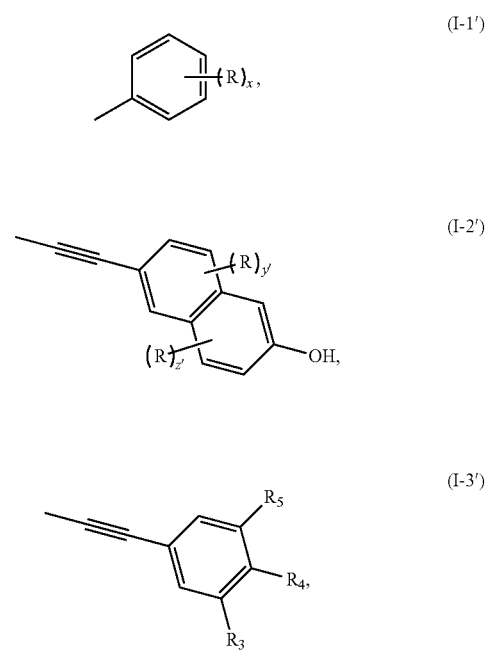

in the formula (I-1), formula (I-2), formula (I-3) and formula (I-4), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; and each z is independently an integer between 1 and 4;

in the formula (I-1), one of A and A' is NR, and the other is S, wherein R is selected from the group consisting of hydrogen, and a linear or branched C1-6 alkyl;

in the formula (I), formula (I-2) and formula (I-3), each G' is independently selected from the group consisting of hydrogen, a linear or branched C1-6 alkyl, a group of formula (I-1'), an alkynyl of formula (I-2'), and an alkynyl of formula (I-3');

in the formula (I-1') and formula (I-2'), each R is independently selected from the group consisting of hydrogen, and a linear or branched C1-6 alkyl; each x is independently an integer between 0-5; each y' is independently an integer between 0-3; each z' is independently an integer between 0-3;

in the formula (I-3'), $R_4$ is a group of formula (II-1), $R_3$ and $R_5$ are hydrogen; or $R_3$ and $R_5$ are a group of formula (II-3), $R_4$ is hydrogen;

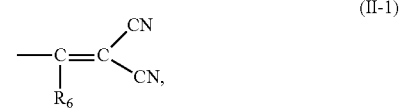

in the formula (II-1), $R_6$ is hydrogen, or a linear or branched C1-6 hydrocarbyl;

in the formula (II-3), $R_a$ is selected from the group consisting of hydrogen, and a linear or branched C1-20 alkyl; $R_b$ is selected from the group consisting of hydrogen, and a linear or branched C1-20 alkyl; and in the formula (I), at least one G is selected from the group consisting of an alkynyl group of formula (I-1), an alkynyl group of formula (I-2), an alkynyl group of formula (I-3), and an alkynyl group of formula (I-4), or at least one G' is selected from the group consisting of an alkynyl group of formula (I-2'), and an alkynyl group of formula (I-3').

2. The silole derivative of formula (I) according to claim 1, characterized by including the following compounds:
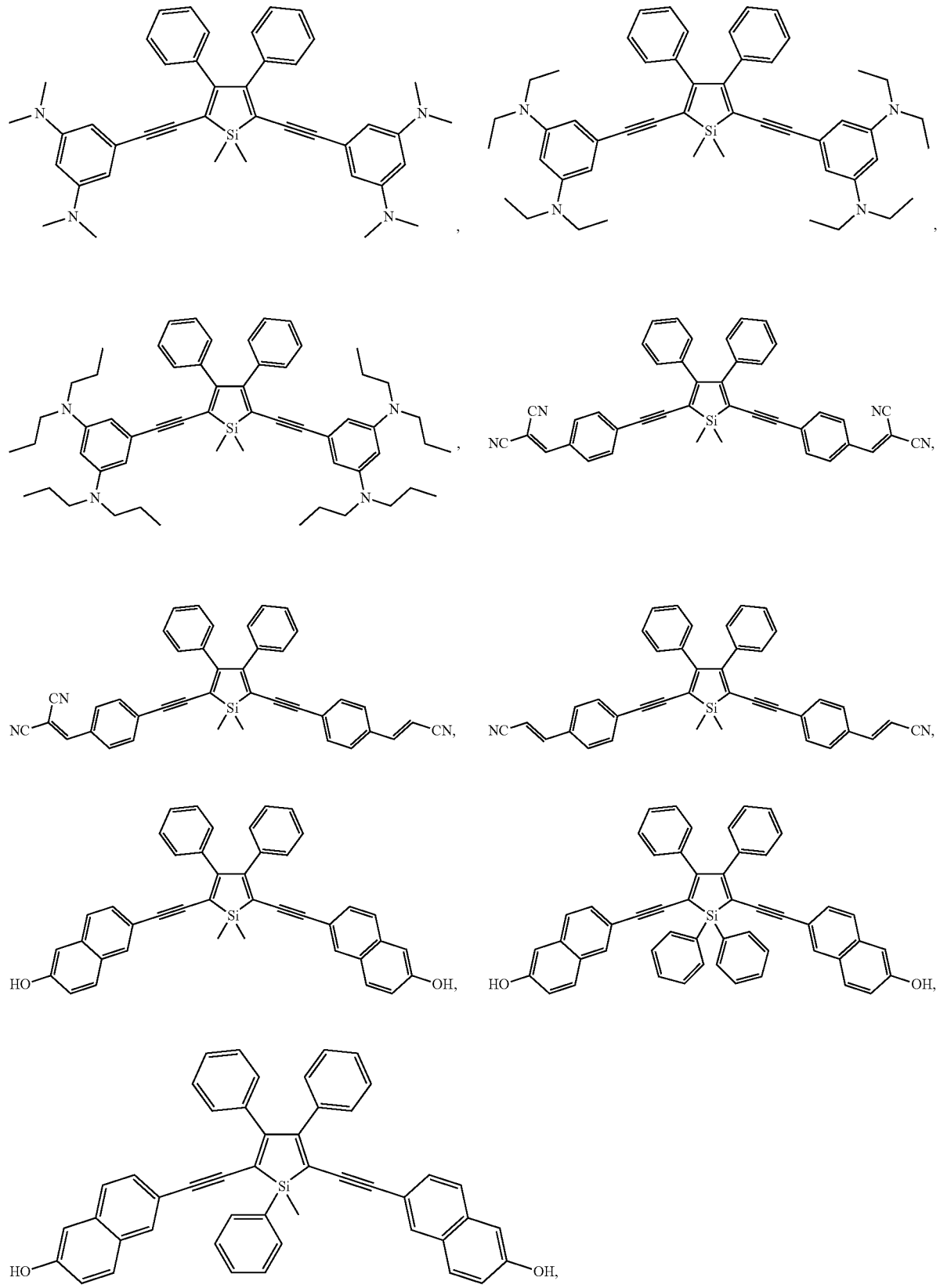

97
98
-continued
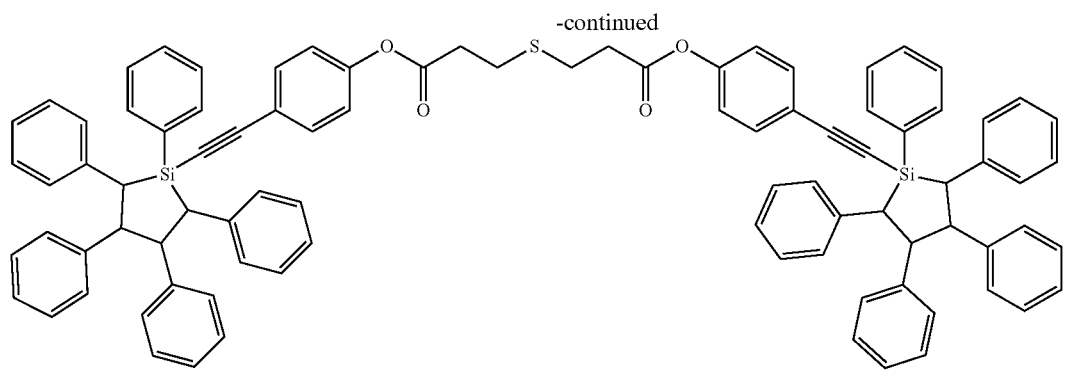
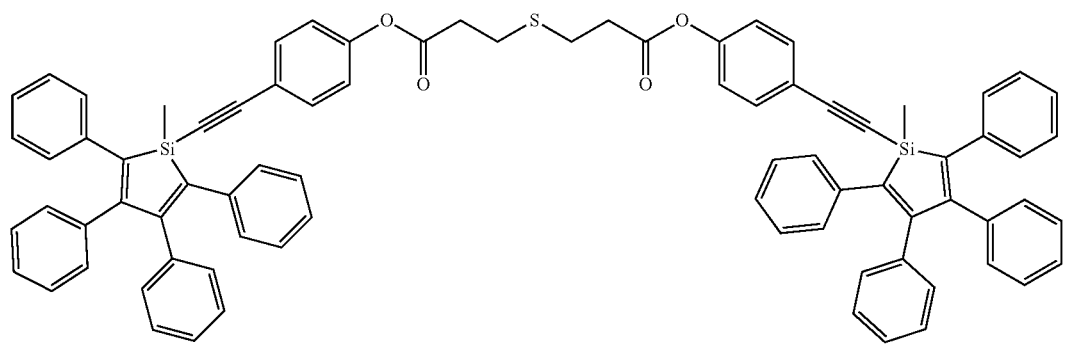
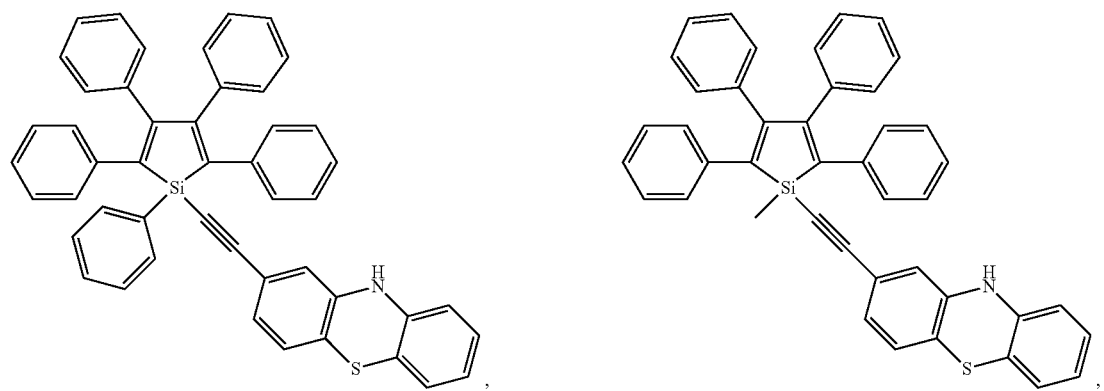
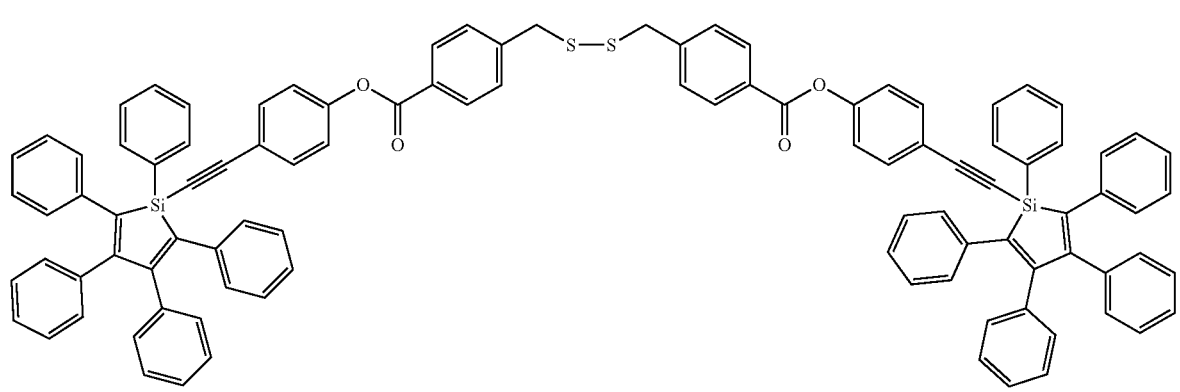

-continued
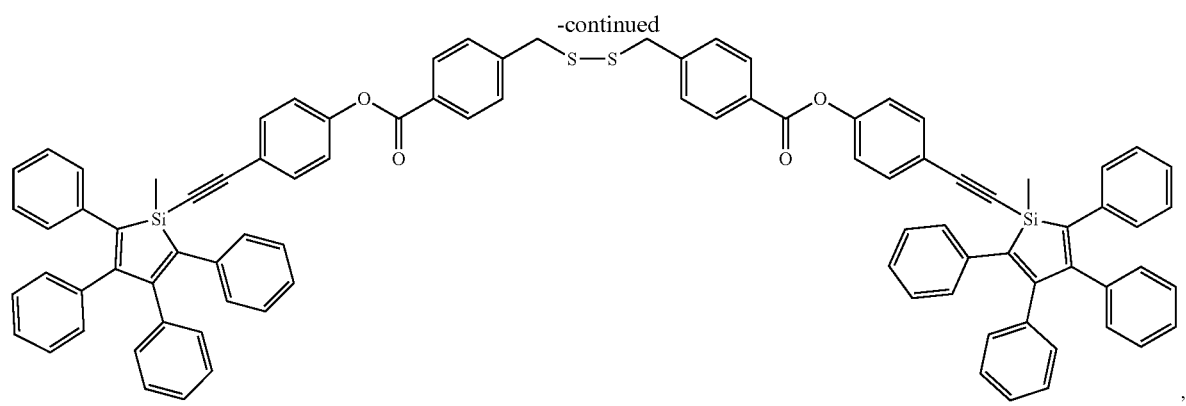
,
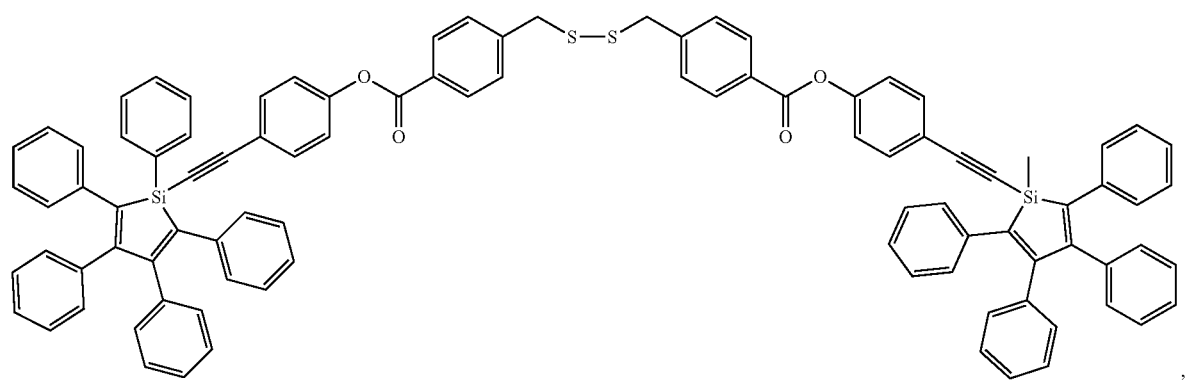
,
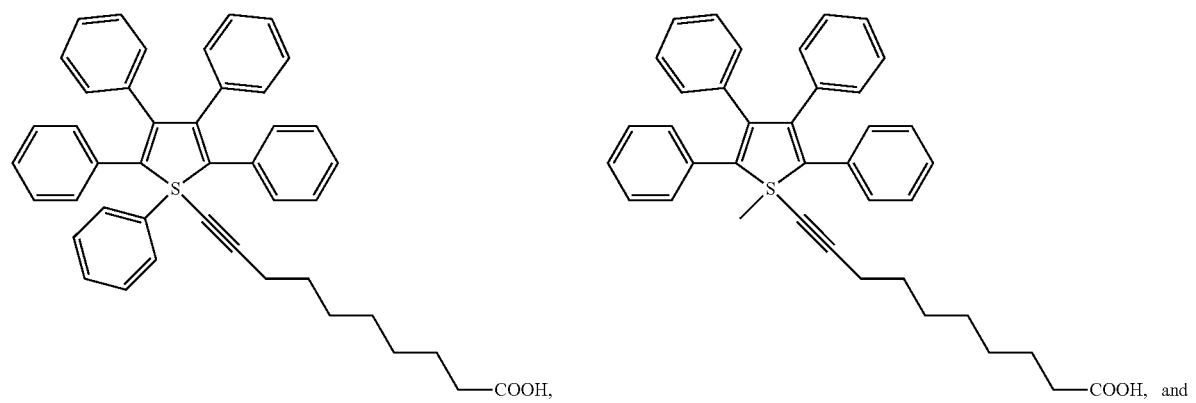
and
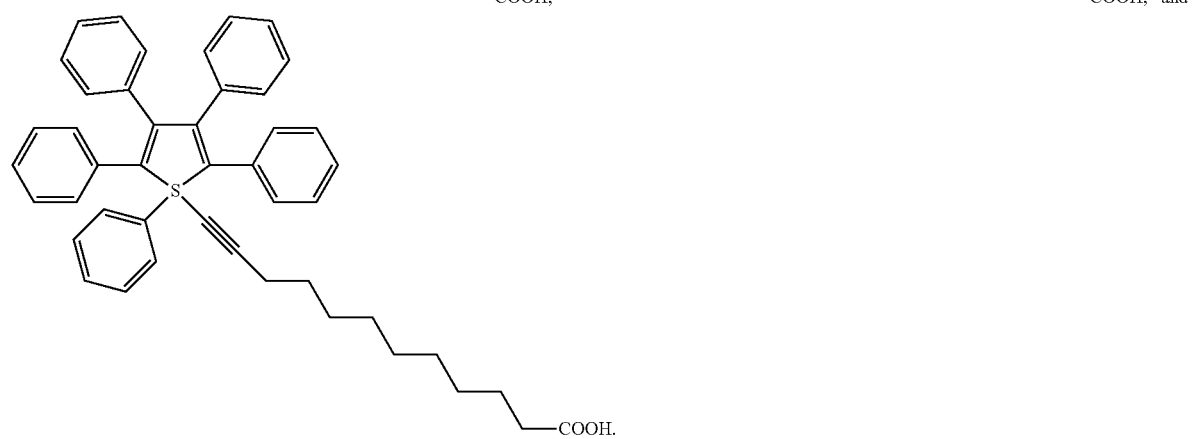

3. A method for preparing the silole derivative of formula (I) according to claim 1, including the steps of: reacting a silole compound of formula (III-1) with one or more alkyne compounds of formula (III-1'), (III-2'), (III-3'), (III-4'), (III-5') and (III-6'),

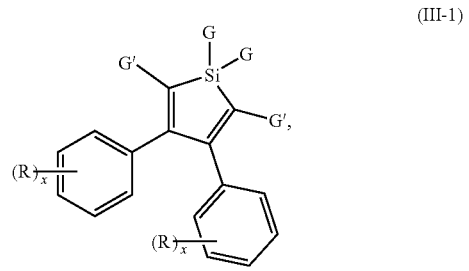
(III-1)

in the formula (III-1), each R is independently selected from the group consisting of hydrogen, and a linear or branched C1-6 alkyl; each x is independently an integer between 0 and 5; each G is independently selected from the group consisting of hydrogen, a linear or branched C1-6 alkyl, a group of formula (I-1') and the group X; and each G' is independently selected from the group consisting of hydrogen, a linear or branched C1-6 alkyl, a group of formula (I-1') and the group X;

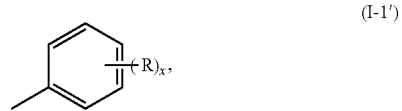
(I-1')

in the formula (I-1'), each R is independently selected from the group consisting of hydrogen, and a linear or branched C1-6 alkyl; and each x is independently an integer between 0 and 5;

the group X is selected from the group consisting of F, Cl, Br, I, and OH at least one of G and G' is the group X;

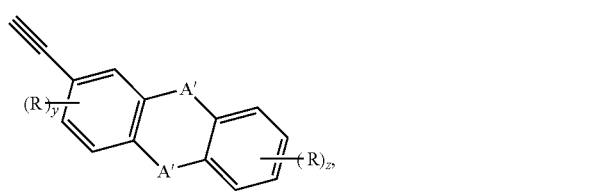
(III-1')

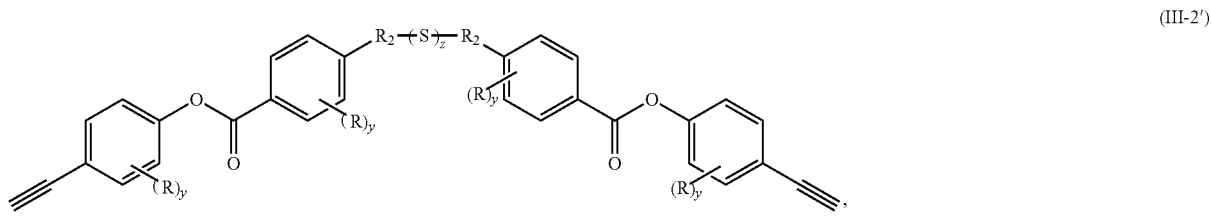
(III-2')

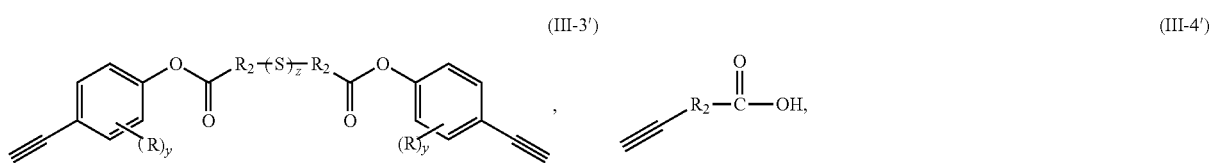
(III-3'), (III-4')

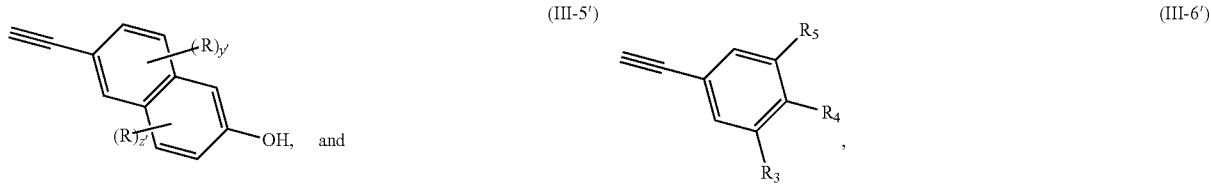
(III-5'), (III-6')

in the formula (III-1'), formula (III-2'), formula (III-3'), formula (III-4') and formula (III-5'), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; each z is independently an integer between 1 and 4; each y' is independently an integer between 0-3; and each z' is independently an integer between 0 and 3;

in the formula (III-1'), one of A and A' is NR, and the other is S, wherein R is selected from the group consisting of hydrogen, and a linear or branched C1-6 alkyl;

in the formula (III-6'), $R_4$ is a group of formula (II-1), $R_3$ and $R_5$ are hydrogen; or $R_3$ and $R_5$ are a group of formula (II-3), $R_4$ is hydrogen; or $R_3$ and $R_5$ are hydrogen, $R_4$ is a hydroxyl;

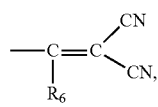
(II-1)

in the formula (II-1), $R_6$ is hydrogen, or a linear or branched C1-6 hydrocarbyl;

(II-3)

in the formula (II-3), $R_a$ is selected from the group consisting of hydrogen, and a linear or branched C1-20 alkyl; and $R_b$ is selected from the group consisting of hydrogen, and a linear or branched C1-20 alkyl.

4. The method according to claim 3, characterized in that, the molar ratio between the silole compound of formula (III-1) and the one or more alkyne compounds of formula (III-1'), (III-2'), (III-3'), (III-4'), (III-5') and (III-6') is 0.1-10:1, the reaction temperature is 0-50° C..

5. The method according to claim 3, characterized in that, a catalyst is added to the reaction of the silole compound of formula (III-1) with the one or more alkyne compounds of formula (III-1'), (III-2'), (III-3'), (III-4'), (III-5') and (III-6'); the catalyst is one or more of metal phosphine complexes, metal halides, hydrocarbyl phosphine compounds and azo compounds.

6. A method for preparing the silole derivative of formula (I) according to claim 1, including the steps of: reacting a silole compound of formula (III-1-1) with one or more compounds of formula (III-1'-1), (III-2'-1), (III-3'-1), (III-4'-1), (III-5'-1) and (III-6'-1),

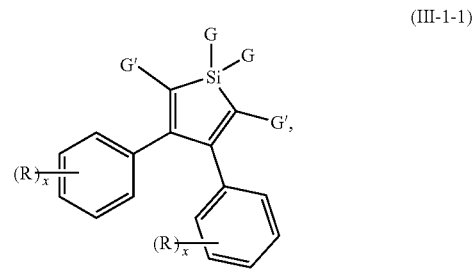
(III-1-1)

in the formula (III-1-1), each R is independently selected from the group consisting of hydrogen, and a linear or branched C1-6 alkyl; each x is independently an integer between 0 and 5; each G is independently selected from the group consisting of hydrogen, a linear or branched C1-6 alkyl, a group of formula (I-1') and ——— (i.e. —C≡CH ); and each G' is independently selected from the group consisting of hydrogen, a linear or branched C1-6 alkyl, a group of formula (I-1') and ———;

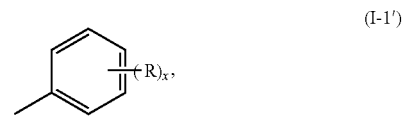
(I-1')

in the formula (I-1'), each R is independently selected from the group consisting of hydrogen, and a linear or branched C1-6 alkyl; and each x is independently an integer between 0 and 5;

at least one of G and G' is ———;

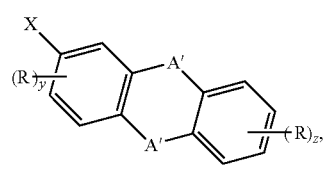
(III-1'-1)

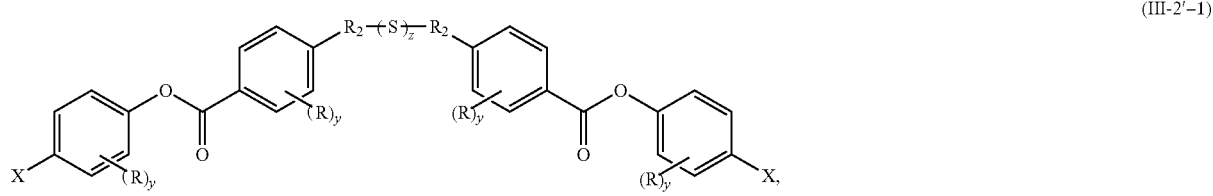
(III-2'-1)

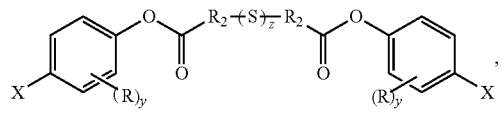 (III-3'-1)

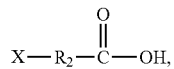 (III-4'-1)

 (III-5'-1)

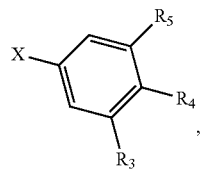 (III-6'-1)

the group X is selected from the group consisting of F, Cl, Br, I, and OH;

in the formula (III-1'-1), formula (III-2'-1), formula (III-3'-1), formula (III-4'-1) and formula (III-5'-1), each $R_1$ is independently selected from the group consisting of hydrogen, and a linear or branched C1-6 alkyl; each $R_2$ is independently selected from the group consisting of a liner or branched C1-6 alkylene; each R is independently selected from the group consisting of hydrogen, and a linear or branched C1-6 alkyl; each x is independently an integer between 0-5; each y is independently an integer between 0-4; each z is independently an integer between 1 and 4; each y' is independently an integer between 0-3; and each z' is independently an integer between 0 and 3;

in the formula (III-1'-1), one of A and A' is NR, and the other is S, wherein R is selected from the group consisting of hydrogen, and a linear or branched C1-6 alkyl;

in the formula (III-6'-1), $R_4$ is a group of formula (II-1), $R_3$ and $R_5$ are hydrogen; or $R_3$ and $R_5$ are a group of formula (II-3), $R_4$ is hydrogen; or $R_3$ and $R_5$ are hydrogen, $R_4$ is a hydroxyl;

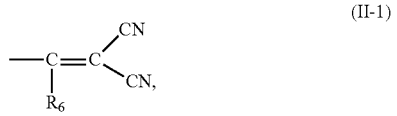 (II-1)

in the formula (II-1), $R_6$ is hydrogen, or a linear or branched C1-6 hydrocarbyl;

 (II-3)

in the formula (II-3), $R_a$ is selected from the group consisting of hydrogen, and a linear or branched C1-20 alkyl; and $R_b$ is selected from the group consisting of hydrogen, and a linear or branched C1-20 alkyl.

7. The method according to claim 6, characterized in that, the molar ratio between the silole compound of formula (III-1-1) and the one or more compounds of formula (III-1'-1), (III-2'-1), (III-3'-1), (III-4'-1), (III-5'-1) and (III-6'-1) in the reacting is 0.1-10:1.

8. The method according to claim 6, characterized in that, a catalyst is added to the reaction of the silole compound of formula (III-1-1) with the one or more compounds of formula (III-1'-1), (III-2'-1), (III-3'-1), (III-4'-1), (III-5'-1) and (III-6'-1); the catalyst is one or more of metal phosphine complexes, metal halides, hydrocarbyl phosphine compounds and azo compounds.

9. A lubricating grease composition comprising a luminescent material, a thickener and a lubricating base oil, wherein the luminescent material is a photoluminescent material comprises the silole derivative of claim 1.

10. The lubricating grease composition according to claim 9, wherein the luminescent material is 0.0005% 5%, by weight of the total weight of the lubricating grease composition and, the thickener is 5% 30% by weight of the total weight of the lubricating grease composition.

11. The lubricating grease composition according to claim 10, wherein the photoluminescent material is a photoluminescent material with aggregation-induced emission performance.

12. The lubricating grease composition according to claim 10, wherein the lubricating grease composition further comprises a tetraphenylethylene compound having the following structure:

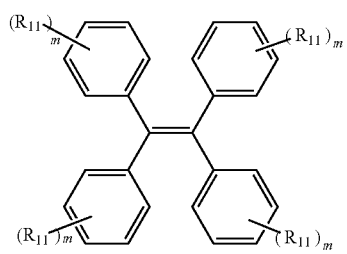

wherein each Ru is the same or different from each other, and is independently selected from the group consisting of a linear or branched C1-6 alkyl; each m is the same or different, and is independently an integer between 0-5.

13. The lubricating grease composition according to claim 12, wherein the tetraphenylethylene compound includes at least one of the following compounds:

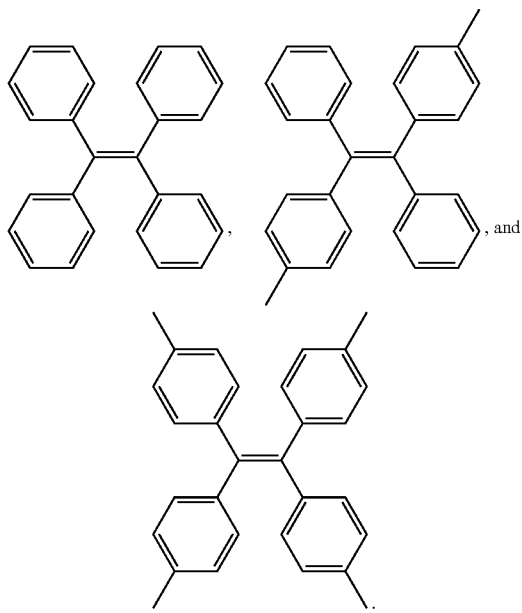

14. A method for preparing the lubricating grease composition according to claim 10, comprising the steps of: mixing the lubricating base oil, the thickener and the luminescent material to form a mixture; and grinding the mixture to form a grease.

15. The method according to claim 14, wherein the mixing step is carried out at 160-240° C. for 10-240 min.

16. The method according to claim 14, wherein the lubricating grease composition is a polyurea lubricating grease composition, a lithium-based lubricating grease composition or an aluminum composite-based basing lubricating grease composition.

17. The method according to claim 16, wherein the lubricating grease composition is a polyurea lubricating grease composition, and the method for preparing the polyurea lubricating grease composition includes the steps of: mixing part of the lubricating base oil, the photoluminescent material, amines and isocyanates; reacting at 65-95° C. for 10-60 min; at the end of the reaction, heating to 190-220° C. for high-temperature compounding, then adding the remained base oil, cooling to 60-120° C. and grinding to form a grease.

18. The method according to claim 17, wherein the amine is C2-C20 alkyl amines and/or C6-C20 aryl amines, and the isocyanate is C2-C20 isocyanate.

19. The method according to claim 16, wherein the lubricating grease composition is a lithium-based lubricating grease composition, and the method for preparing the lithium-based lubricating grease composition includes the steps of: mixing part of the lubricating base oil with a fatty acid in a reactor; heating to a temperature of 40-90° C.; adding the photoluminescent material and an aqueous solution of lithium hydroxide; heating for dehydration, then further heating to 190-220° C. for high-temperature compounding, adding the remained lubricating base oil, cooling to 60-120° C., and grinding to form a grease.

20. The method according to claim 19, wherein the fatty acid is C12-C20 fatty acids and/or C12-C20 hydroxy fatty acids.

21. The method according to claim 16, wherein the lubricating grease composition is an aluminum composite-based lubricating grease composition, and the method for preparing the aluminum composite-based lubricating grease composition includes the steps of: mixing part of the lubricating base oil, a fatty acid and an acid of low molecular weight in a reactor; heating to a temperature of 40-90° C.; adding the photoluminescent material; mixing the other part of lubricating base oil with aluminum alkoxide compound and heating to 40-100° C.; after aluminum alkoxide compound is completely dissolved, adding the obtained solution into the reactor, then heating to 190-220° C. for high-temperature compounding, adding the remained lubricating base oil, cooling to 60-120° C. and grinding to form a grease.

22. The method according to claim 21, wherein the fatty acid is C12-C20 fatty acids and/or C12-C20 hydroxy fatty acids, the acid of low molecular weight is C2-C11 organic acids, and the aluminum alcohol compound is selected from the group consisting of aluminum isopropoxide, aluminum isopropoxide dimer, and aluminum isopropoxide trimer.

23. The method according to claim 14, wherein the photoluminescent material is dissolved in an aromatic solvent.

* * * * *